United States Patent
Thompson et al.

(10) Patent No.: US 12,044,560 B1
(45) Date of Patent: Jul. 23, 2024

(54) HIGH PRESSURE MAGMETER AND METHOD OF ASSEMBLY

(71) Applicant: Thompson Equipment Company, Inc., Jefferson, LA (US)

(72) Inventors: Todd C. Thompson, New Orleans, LA (US); Thomas Meacham, Jr., Perkasie, PA (US)

(73) Assignee: THOMPSON EQUIPMENT COMPANY, INC., Jefferson, LA (US)

( * ) Notice: Subject to any disclaimer, the term of this patent is extended or adjusted under 35 U.S.C. 154(b) by 432 days.

(21) Appl. No.: 17/074,536

(22) Filed: Oct. 19, 2020

Related U.S. Application Data

(60) Provisional application No. 62/923,041, filed on Oct. 18, 2019.

(51) Int. Cl.
*G01F 1/58* (2006.01)

(52) U.S. Cl.
CPC ............... *G01F 1/584* (2013.01); *G01F 1/58* (2013.01)

(58) Field of Classification Search
CPC ....................................................... G01F 1/584
See application file for complete search history.

(56) References Cited

U.S. PATENT DOCUMENTS

| | | | |
|---|---|---|---|
| 3,750,468 A | 8/1973 | Grauer | |
| 4,530,234 A | 7/1985 | Cullick et al. | |
| 4,716,649 A | 1/1988 | Bittner et al. | |
| 4,773,275 A | 9/1988 | Kalinoski | |
| 4,781,536 A | 11/1988 | Hicks | |
| 5,925,830 A | 7/1999 | Schalk | |
| 6,269,530 B1 | 8/2001 | Armitage et al. | |
| 6,591,201 B1 | 7/2003 | Hyde | |
| 6,945,569 B1 * | 9/2005 | Diaz | F16L 19/025 285/388 |
| 7,549,319 B2 * | 6/2009 | Headrick | G01N 9/002 73/861.357 |
| 7,624,794 B2 | 12/2009 | Freedman et al. | |
| 7,637,169 B2 | 12/2009 | Shanahan et al. | |
| 7,997,355 B2 | 8/2011 | Vuyk, Jr. et al. | |
| 8,522,865 B2 * | 9/2013 | Atencio | E21B 43/25 137/15.01 |

(Continued)

FOREIGN PATENT DOCUMENTS

| | | |
|---|---|---|
| EP | 0660919 | 7/1995 |
| WO | 2009094156 | 7/2009 |

(Continued)

OTHER PUBLICATIONS

FT SeriesTurbine Flowmeters for Liquid, www.ftimeters.com, 2013.

(Continued)

*Primary Examiner* — Peter J Macchiarolo
*Assistant Examiner* — John M Royston
(74) *Attorney, Agent, or Firm* — Garvey, Smith & Nehrbass, Patent Attorneys, L.L.C.; Julie Rabalais Chauvin; Seth M. Nehrbass

(57) ABSTRACT

The present invention relates to magnetic flowmeters. More particularly, the present invention relates to a magnetic flowmeter designed for oil and gas exploration and production, including offshore fracking, onshore hydraulic fracturing, and onshore and offshore non-fracking applications that is capable of withstanding high pressures and a variety of corrosive slurries, acids, bases, and solvents.

20 Claims, 57 Drawing Sheets

(56) References Cited

U.S. PATENT DOCUMENTS

| | | |
|---|---|---|
| 8,915,146 B2 | 12/2014 | Kerrom et al. |
| 8,991,264 B2 | 3/2015 | Rogers et al. |
| 9,021,890 B2 | 5/2015 | Rogers |
| 9,377,333 B1 | 6/2016 | Webb et al. |
| 9,568,346 B2 | 2/2017 | Ramseyer et al. |
| 9,664,037 B2 | 5/2017 | Logan et al. |
| 10,969,260 B1 | 4/2021 | Thompson et al. |
| 2008/0035332 A1 | 2/2008 | Freedman et al. |
| 2009/0200084 A1 | 8/2009 | Vuyk, Jr. et al. |
| 2010/0024568 A1 | 2/2010 | Diederichs |
| 2010/0300213 A1* | 12/2010 | Fink .................. G01F 1/115 73/861.79 |
| 2016/0334316 A1 | 11/2016 | Cage et al. |
| 2017/0299414 A1 | 10/2017 | Alimonti et al. |
| 2018/0209228 A1 | 7/2018 | Hall et al. |
| 2019/0009232 A1 | 1/2019 | Yeung |

FOREIGN PATENT DOCUMENTS

| | | |
|---|---|---|
| WO | 2017039659 | 3/2017 |
| WO | 2018080592 | 5/2018 |

OTHER PUBLICATIONS

EL 500 Electromagnetic Flow Meter, www.ftimeters.com, 2019.
Signet 2100 Turbine Sensor Operating Instructions, www.gfsignet.com, 2015.
NUFLO Liquid Turbine Flow Meters, www.c-a-m.com/measurement, 2013.
Liquid & Gas Turbine Flow Meters for Industrial & Sanitary Applications, 2019.
Turbine Flow Meter Measures Hydraulic Fluids in Heavy Equipment Applications FTIMeters.com, 2010.
R&M Energy Systems, Yale Hammer Unions, www.rmenergy.co, 2004.

* cited by examiner

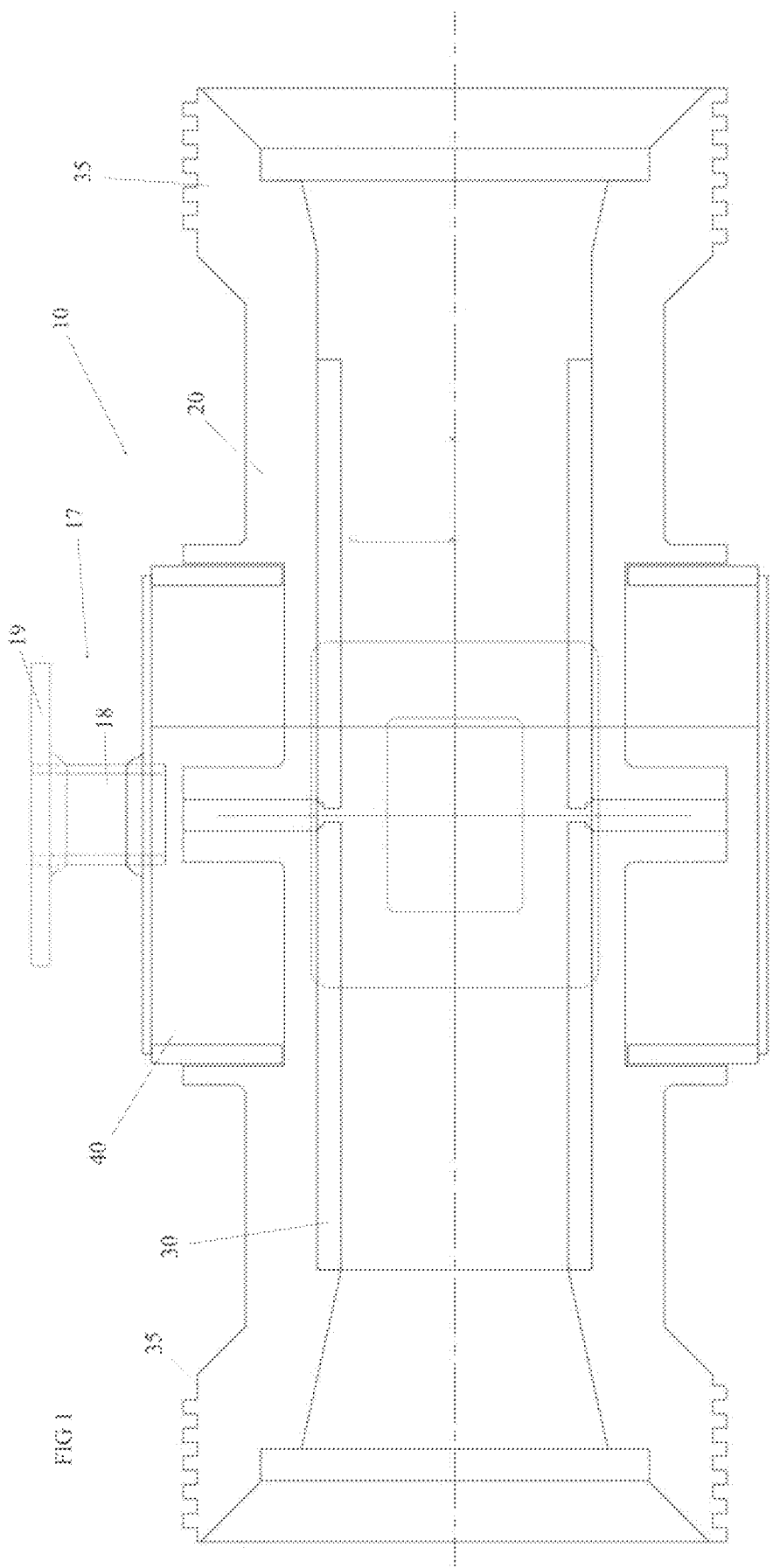

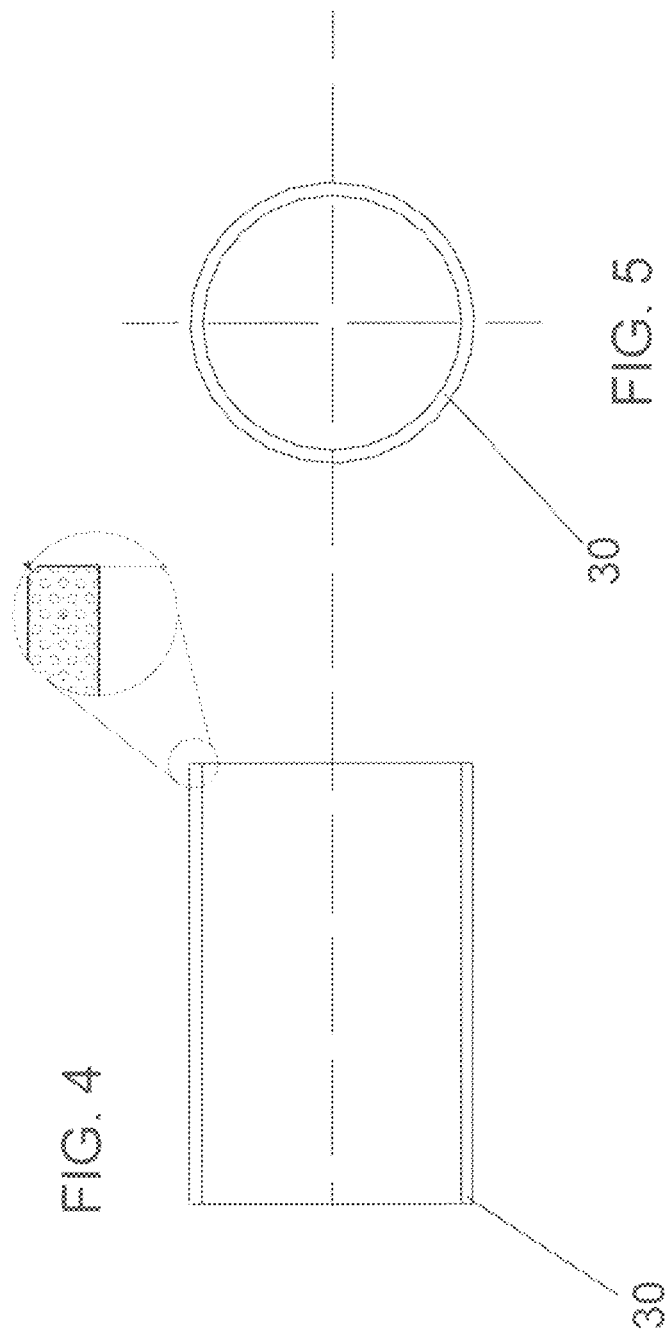

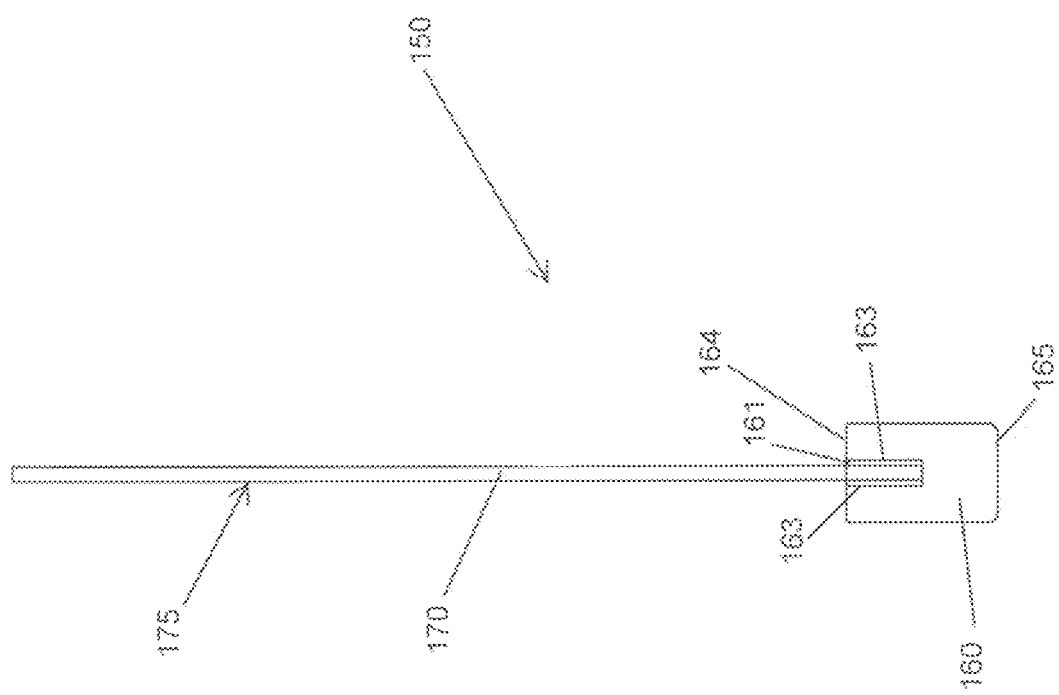

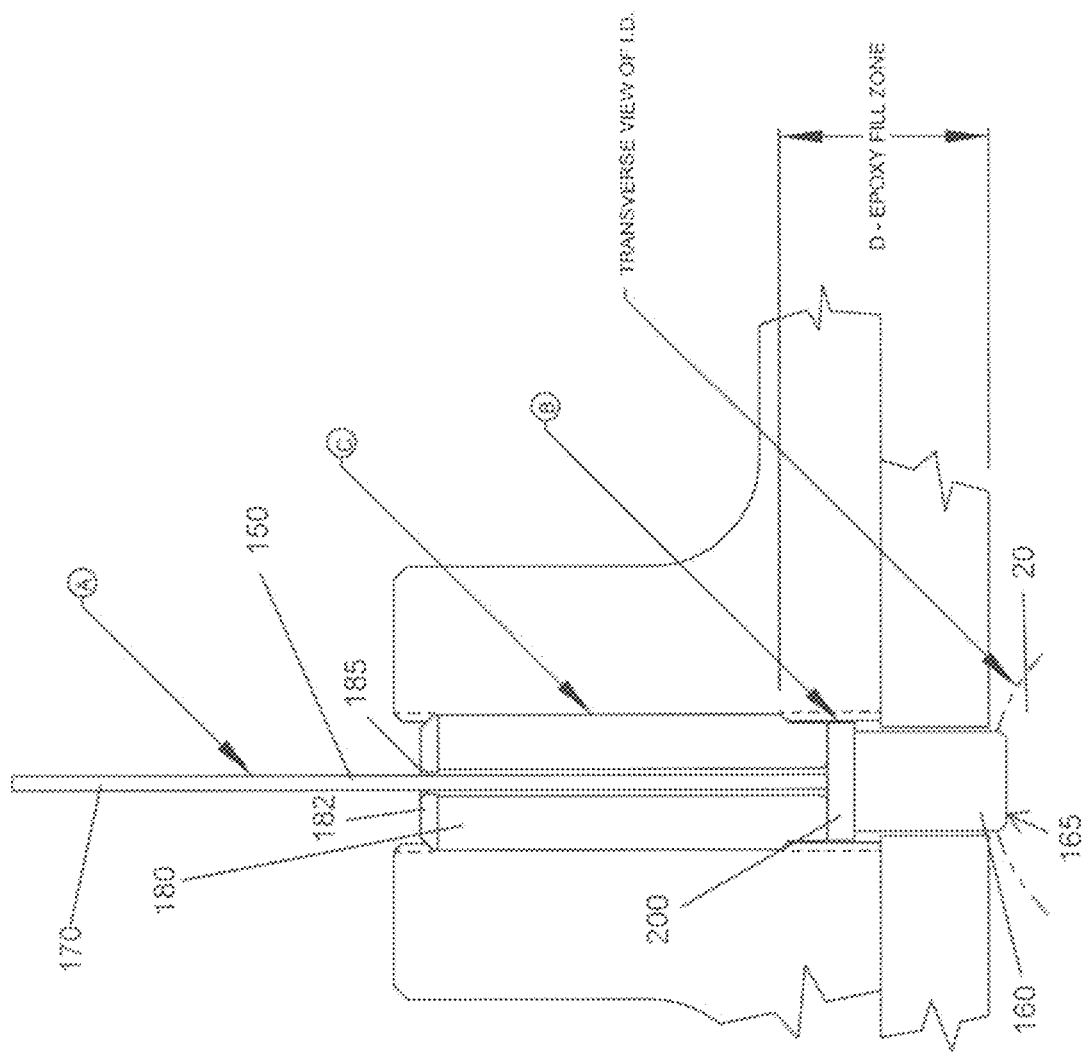

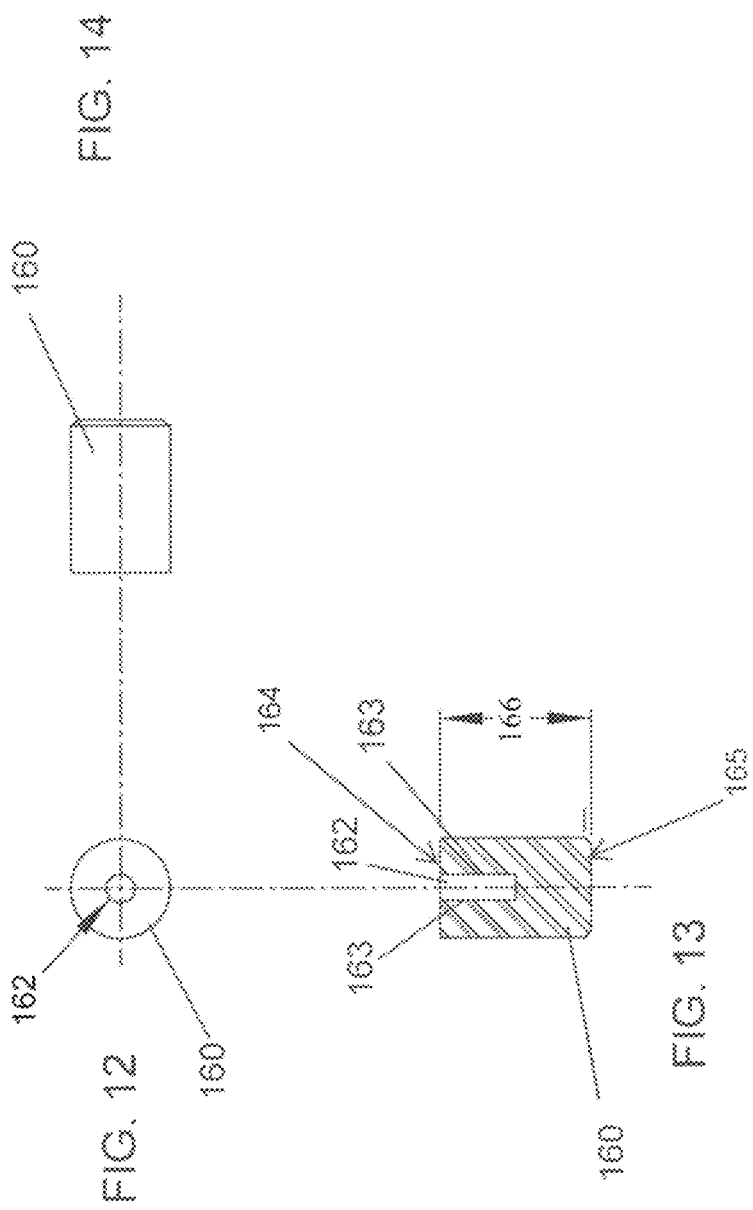

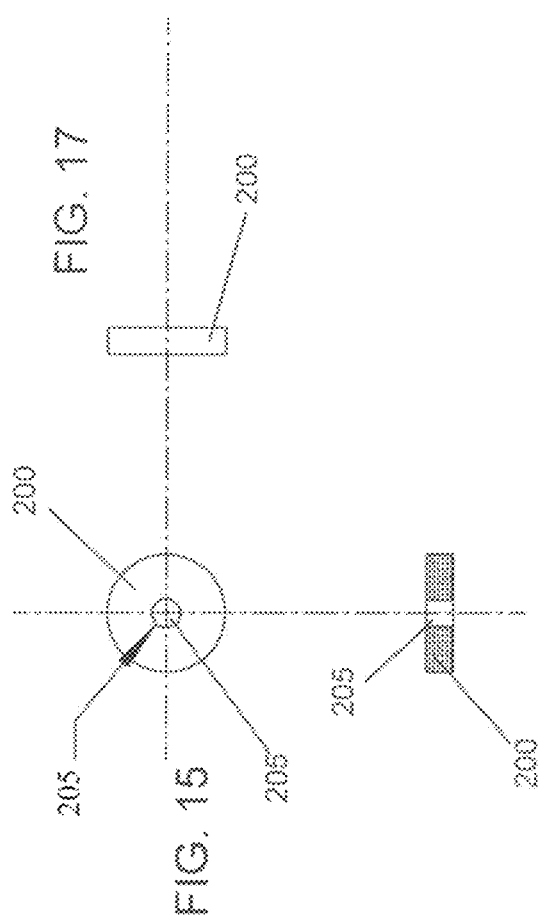

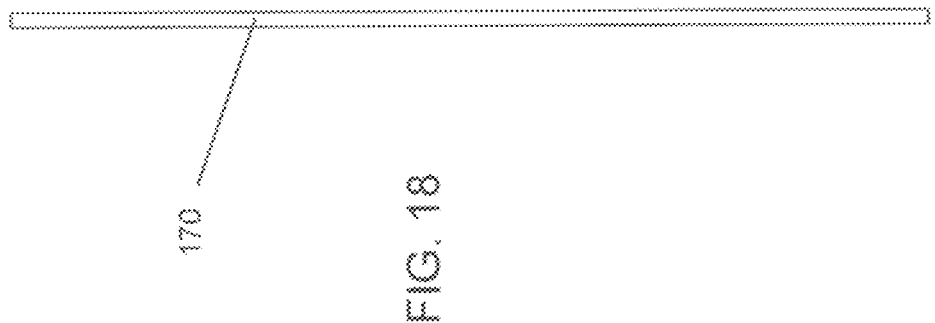

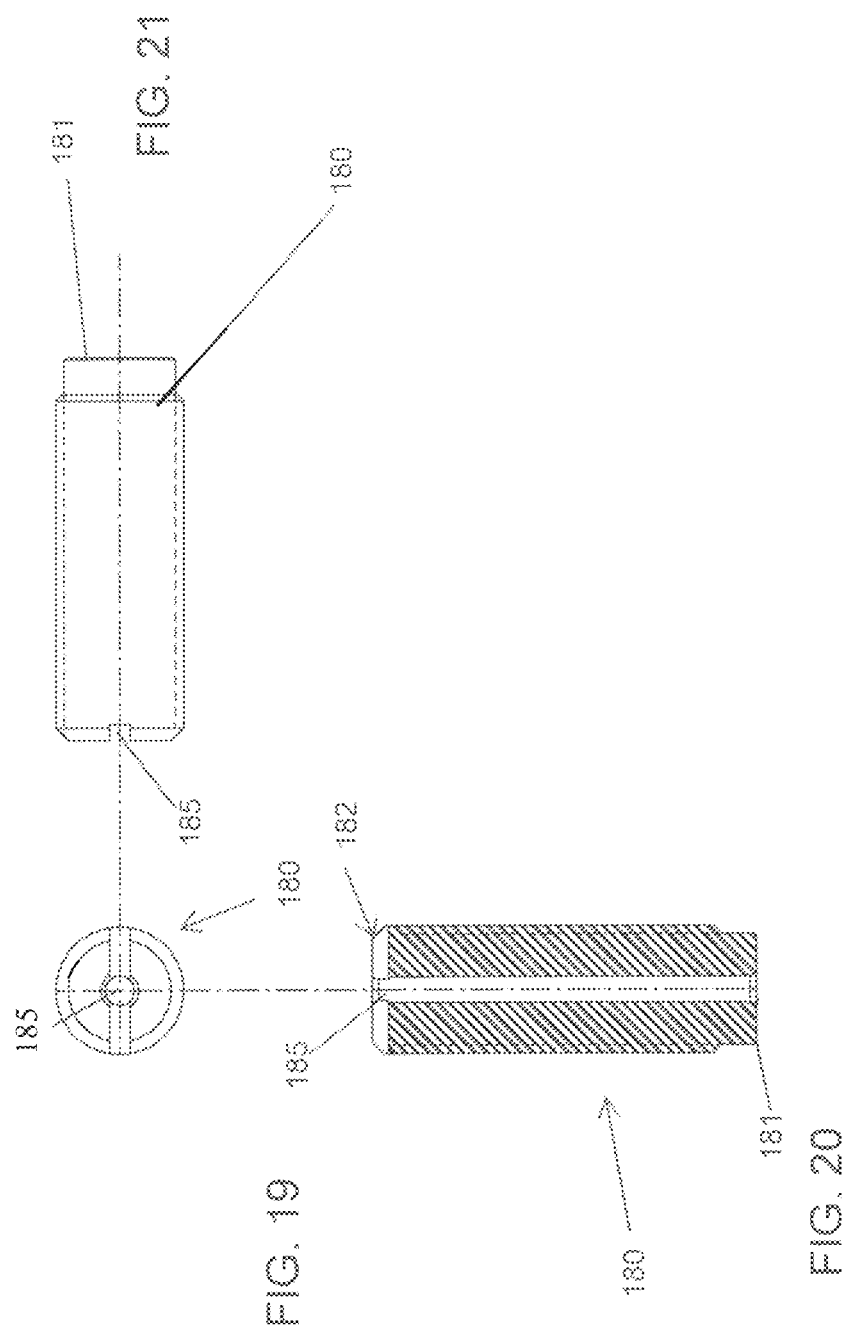

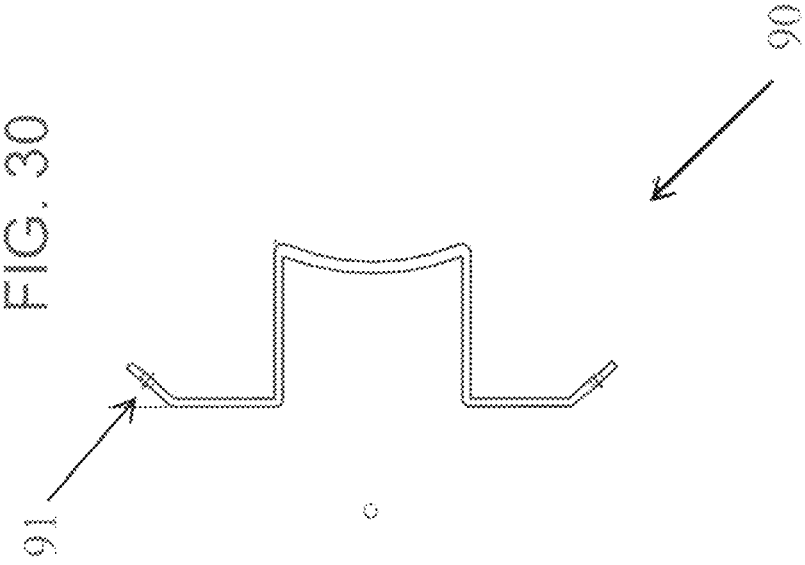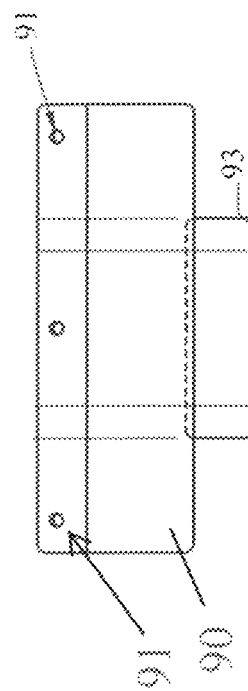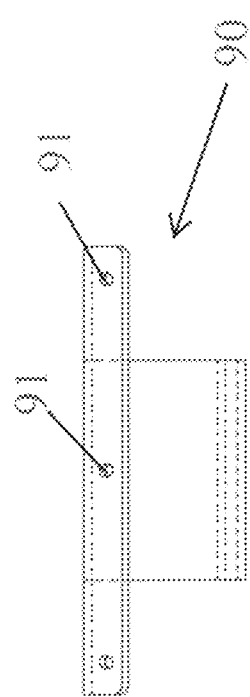

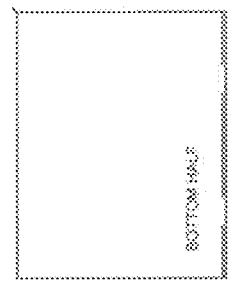
FIG. 34
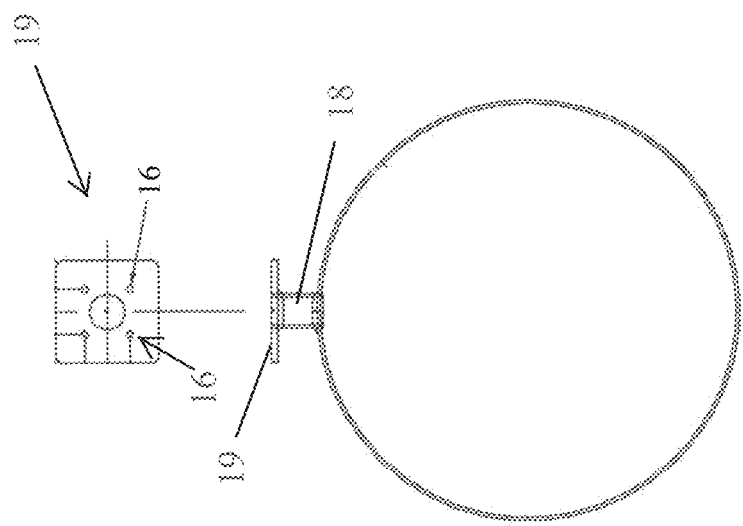
FIG. 32
FIG. 33
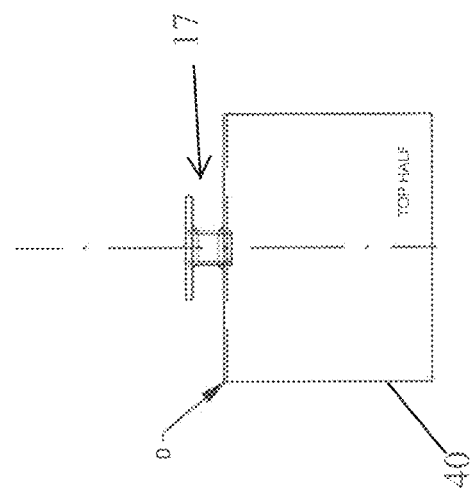
FIG. 31

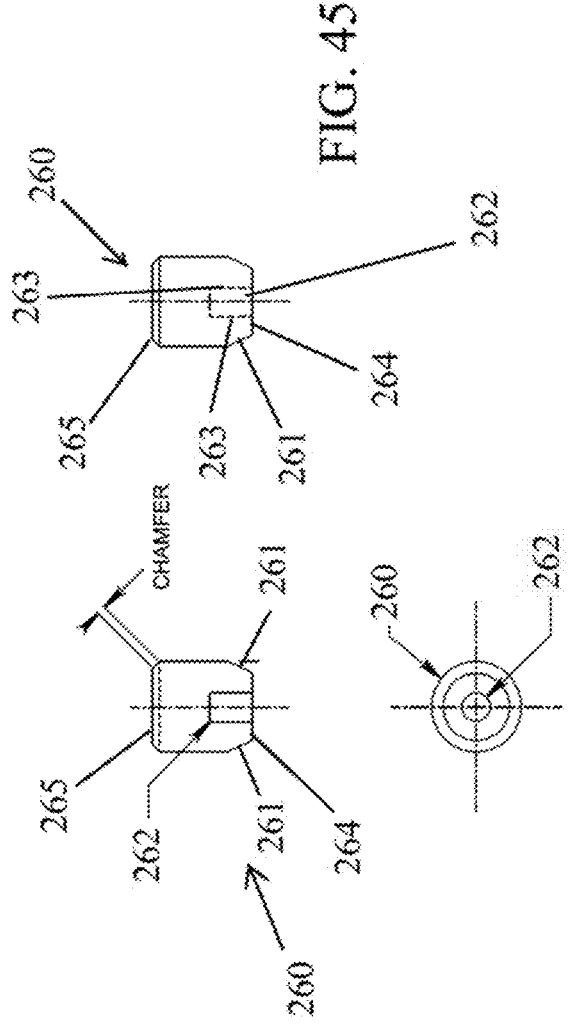

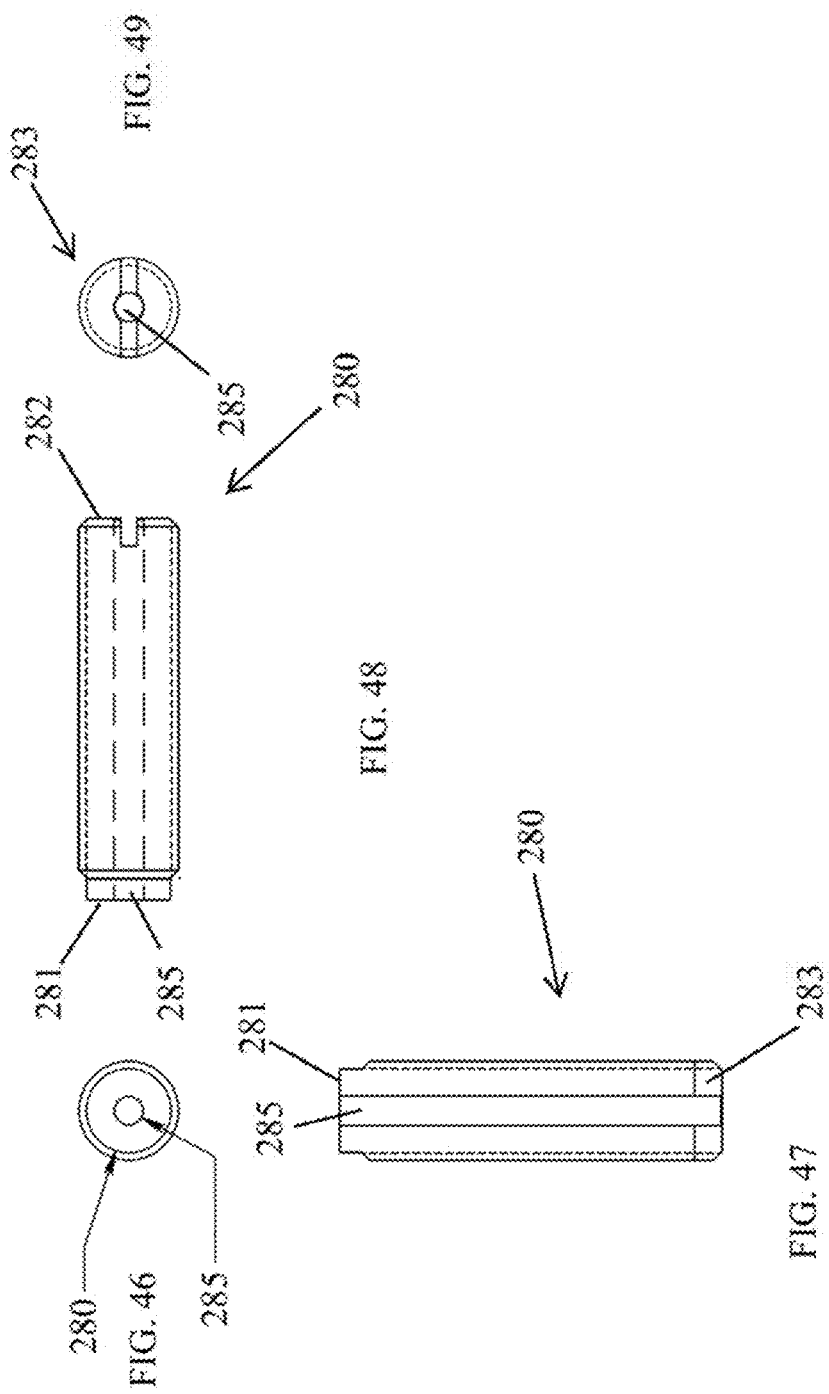

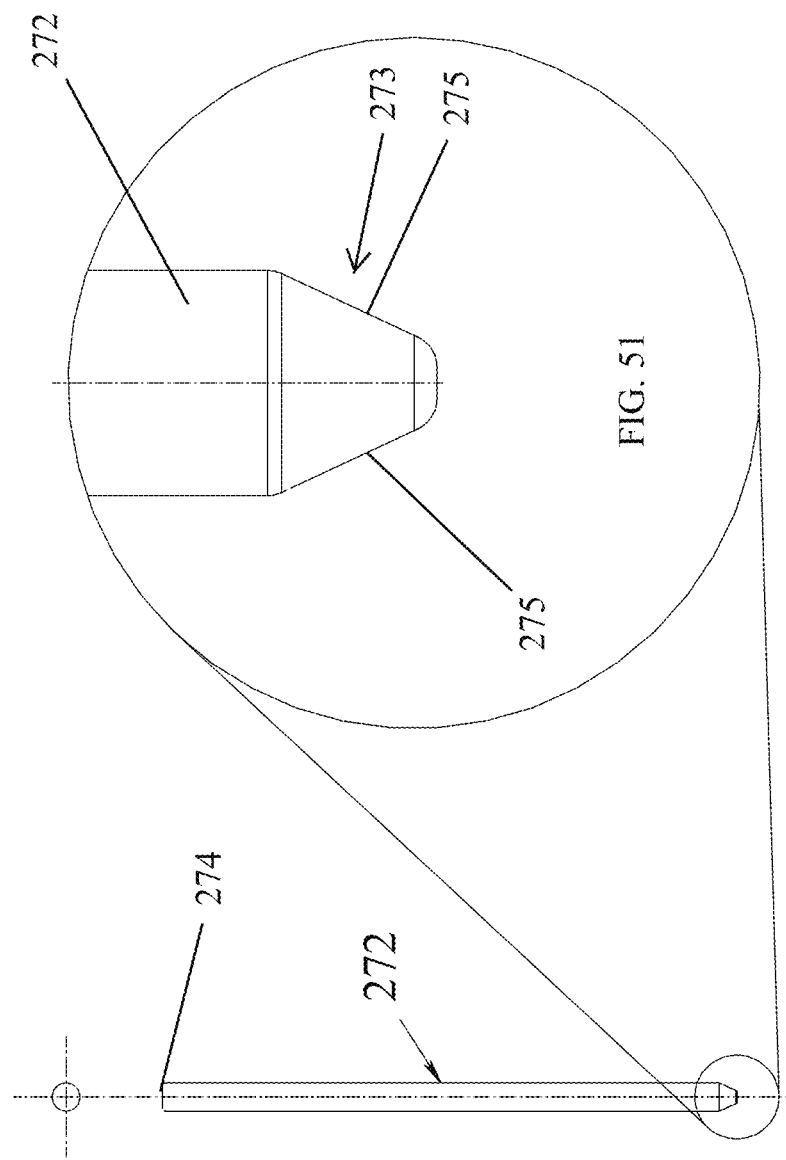

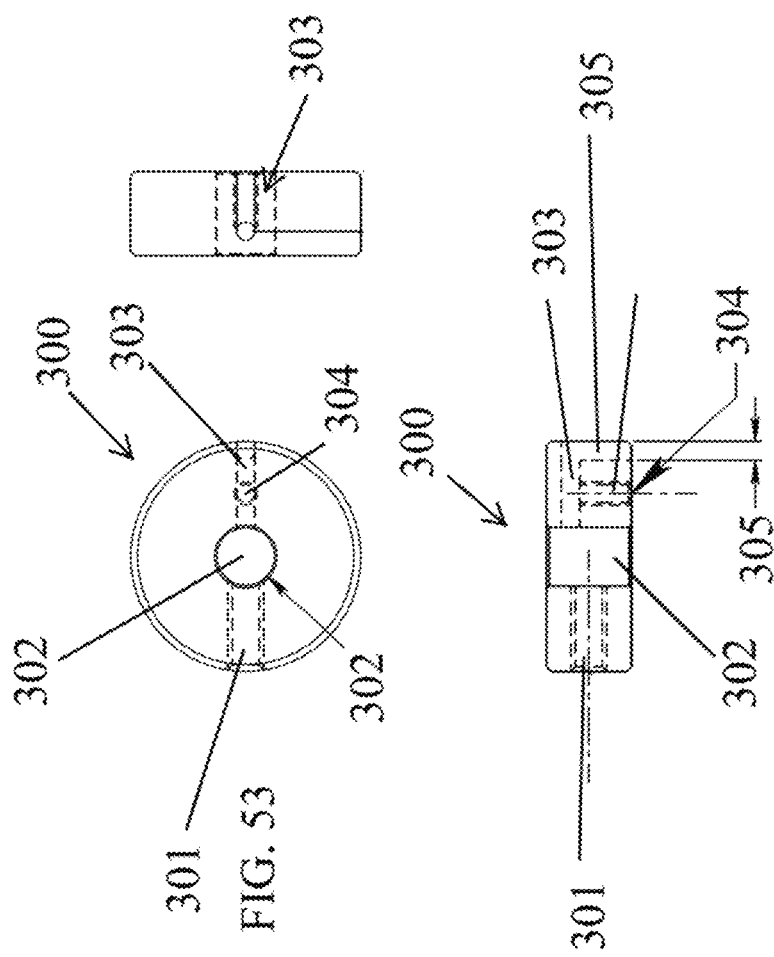

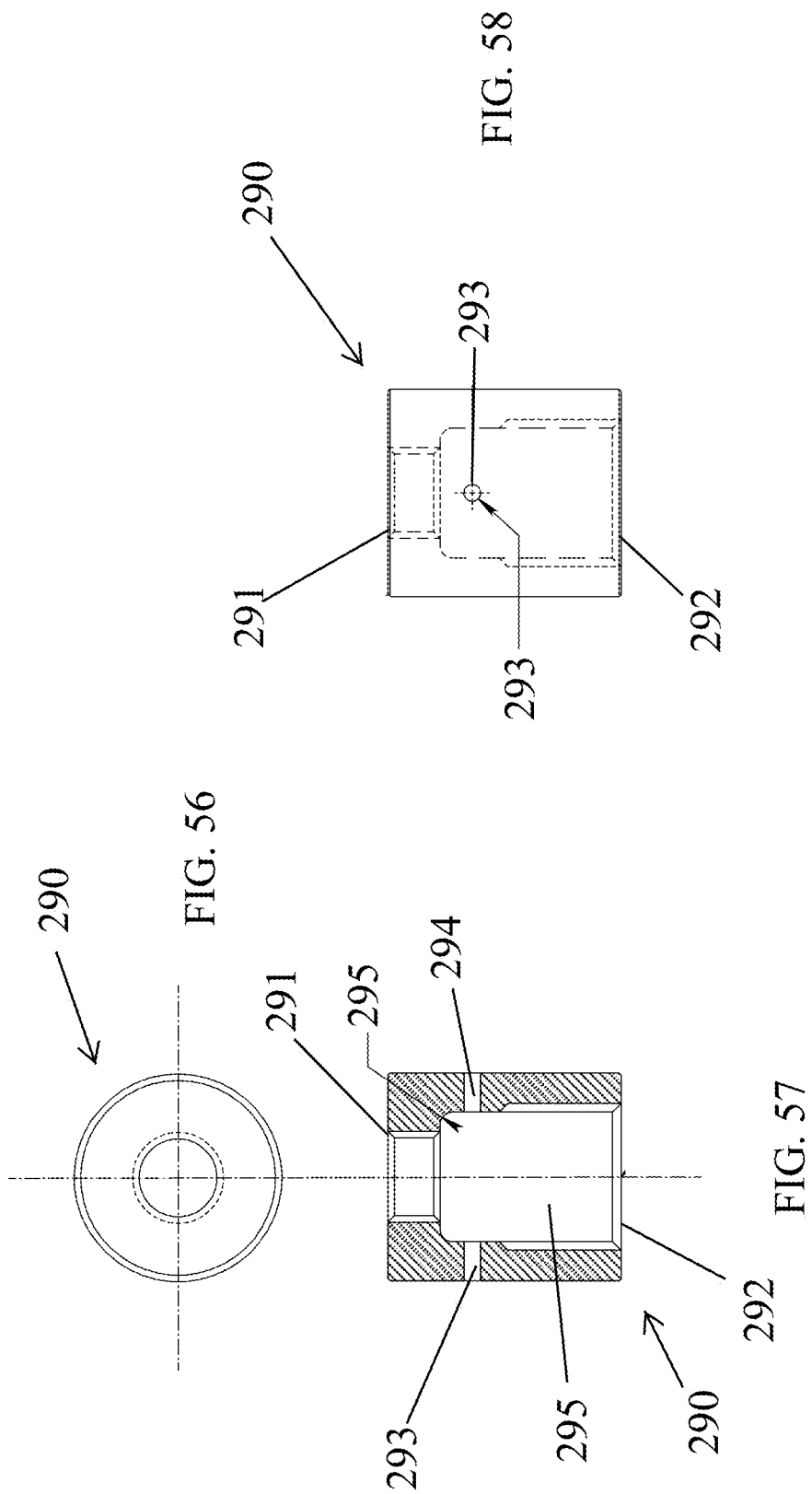

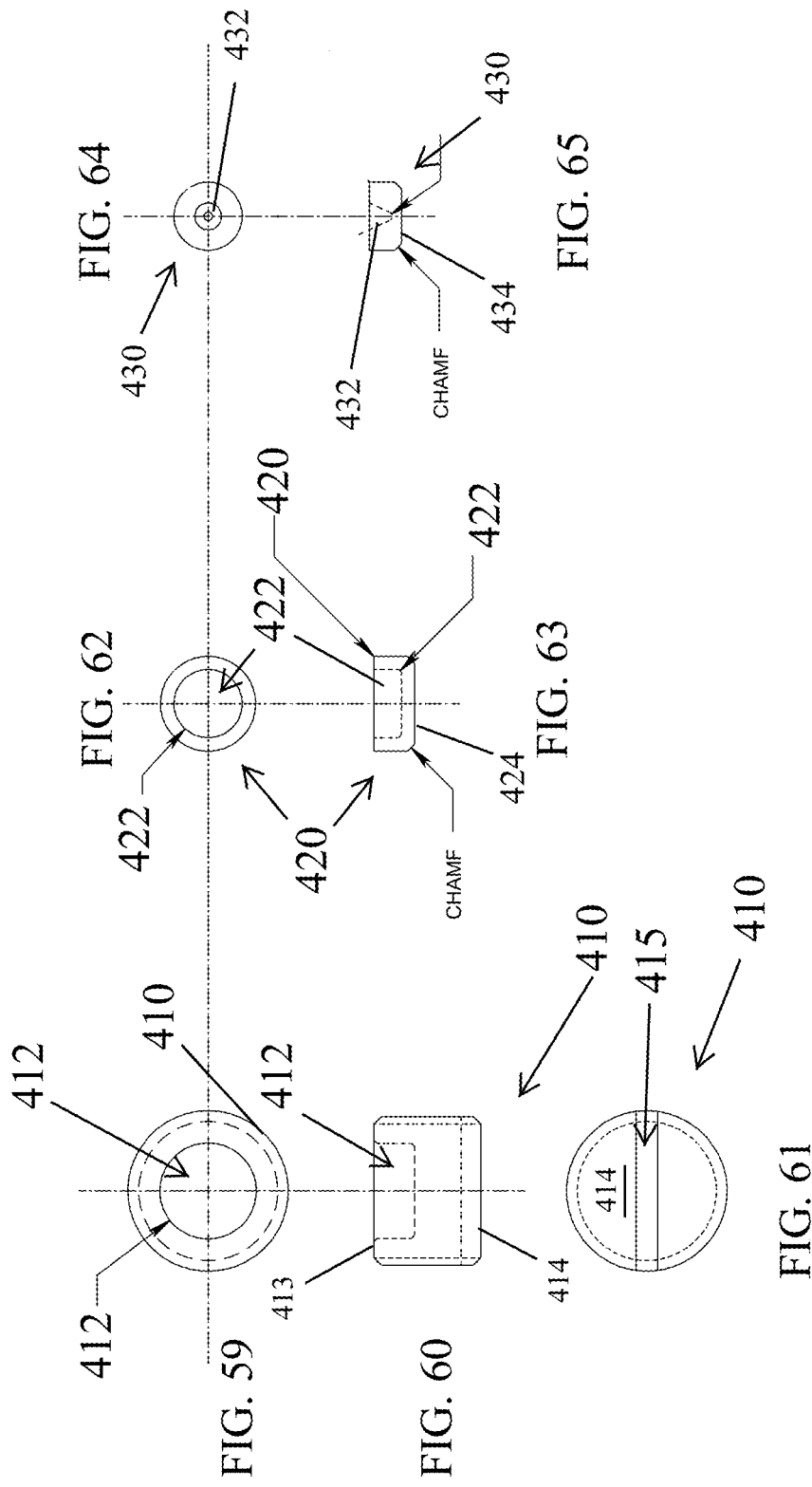

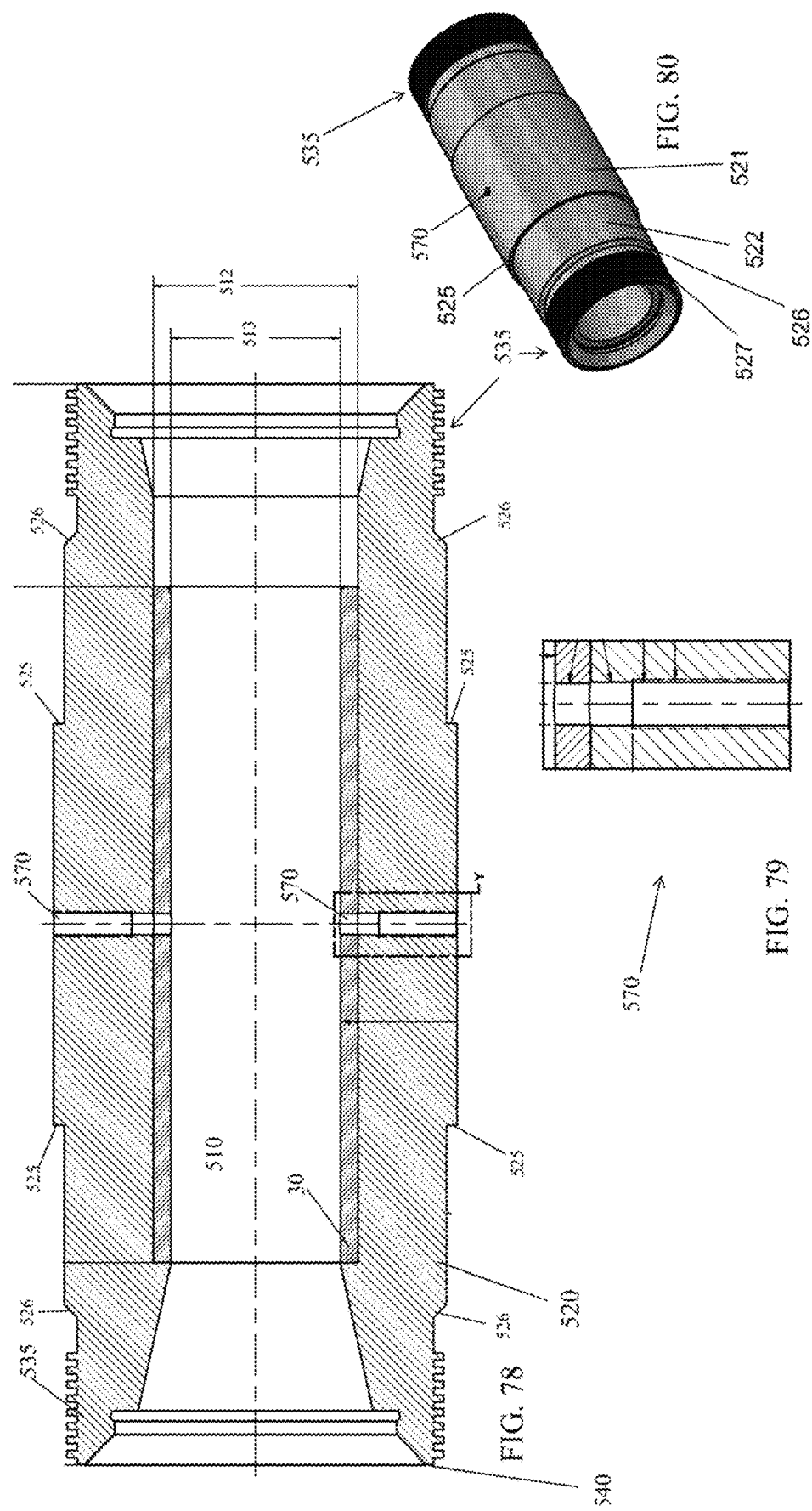

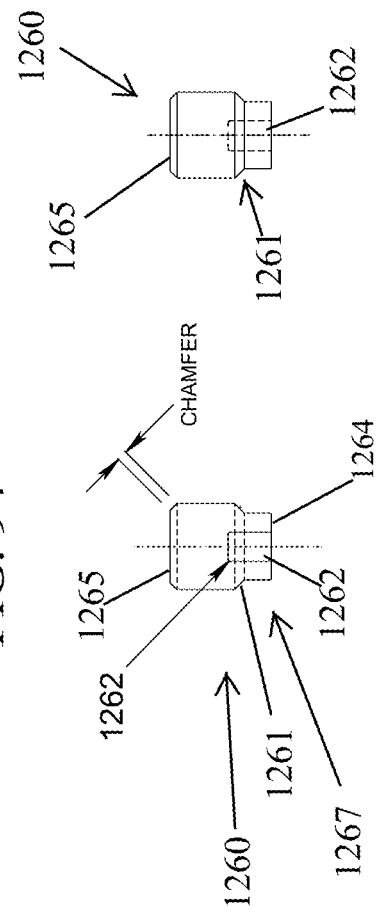
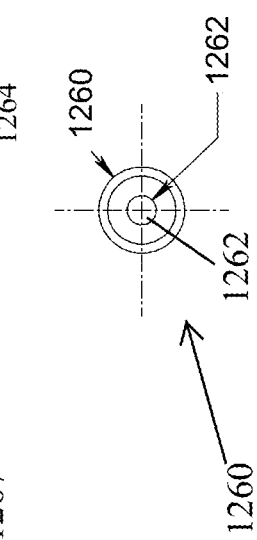
FIG. 94   FIG. 95   FIG. 96

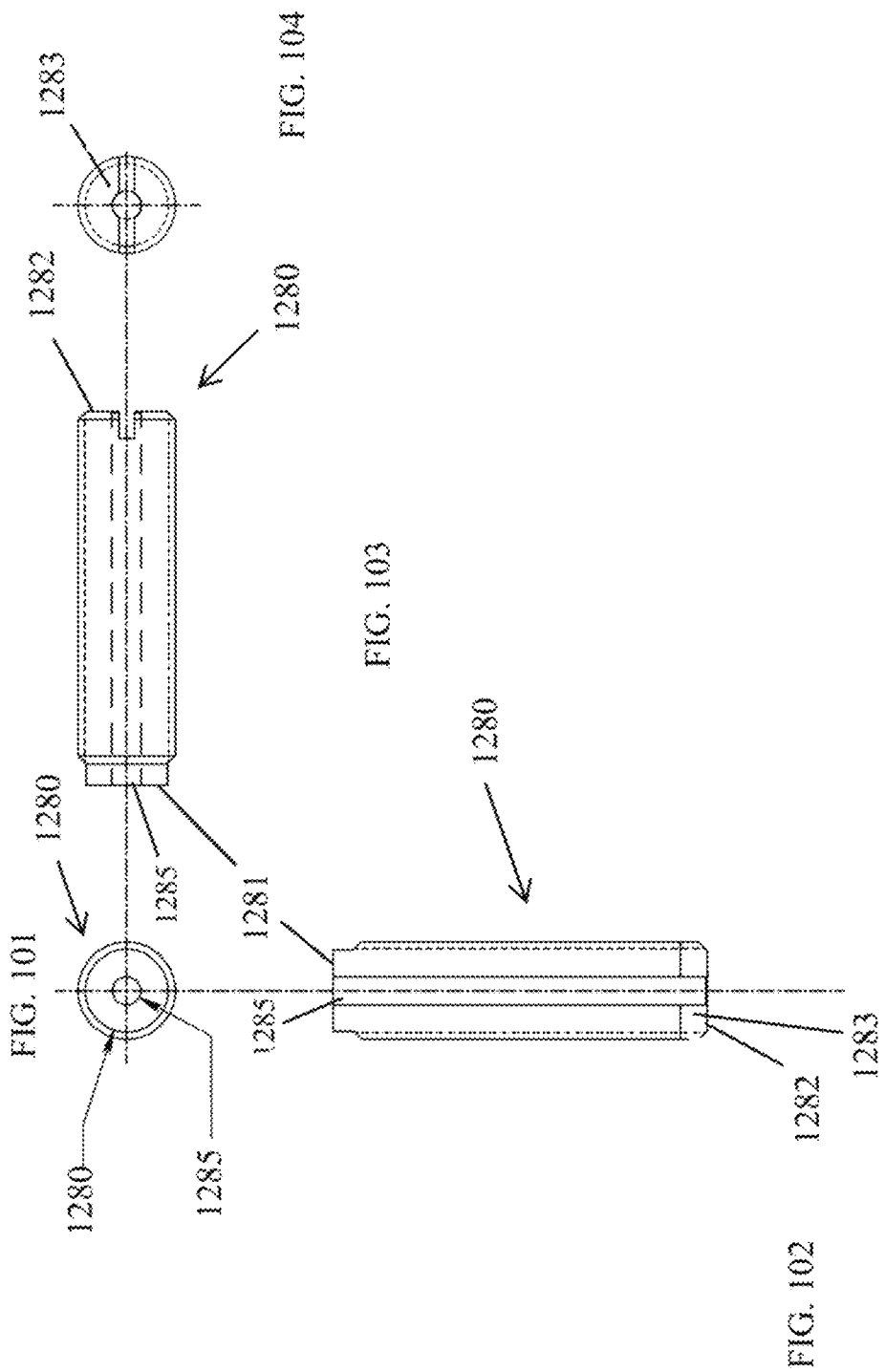

| FIG. # | STANDARD SERVICE CWP SUB | TEST NUT | PIPE SIZE (in.) 1 | 2 | 3 | 4 | 6 | 8 |
|---|---|---|---|---|---|---|---|---|
| 100 | 1,000 | 1,500 | | ⌂ | ⌂ | ⌂ | ⌂ | ⌂ |
| 200 | 2,000 | 3,000 | ⌂ | ⌂ | ⌂ | ⌂ | ⌂ | ⌂ |
| 206 | 2,000 | 3,000 | | ⌂ | ⌂ | ⌂ | | |
| 400 | 4,000 | 6,000 | | ⌂ | ⌂ | ⌂ | | |
| 602 | 6,000 | 9,000 | | ⌂ | ⌂ | ⌂ | | |
| 1002 | 10,000 | 15,000 | | ⌂ | ⌂ | ⌂ | | |
| 1502 | 15,000 | 22,500 | | ⌂ | ⌂ | ⌂ | | |

FIG. 106

HIGH PRESSURE MAGMETER AND METHOD OF ASSEMBLY

CROSS-REFERENCE TO RELATED APPLICATIONS

Incorporated herein by reference is U.S. Provisional Patent Application No. 62/923,041, filed 18 Oct. 2019, priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to magnetic flowmeters. More particularly, the present invention relates to magnetic flowmeters that are capable of measuring the flow rate of high pressure, conductive liquids or high pressure and abrasive liquids or high pressure or abrasive liquids and can be used in a variety of industries. Even more particularly, the present invention relates to magnetic flowmeters designed for onshore and offshore uses for the hydraulic fracturing industry that are capable of withstanding high pressures and a variety of corrosive slurries, acids, bases, and solvents.

2. General Background

Magnetic flowmeters, electromagnetic flowmeters, or Magmeters are commonly used for measuring volumetric flow rates of fluids containing particles (ions) that are organized by the magnetic field passed through the conductive fluid. Conductive fluids in process control industries including, but not limited to, water treatment facilities, chemical processing, pharmaceutical manufacturing, food and beverage production, and liquid hydrocarbon processing and extraction techniques.

Magnetic flowmeters functionally vary from other flow measurement technologies in that velocity flow is measured by application of Faraday's Law capitalizing upon electromagnetic interactions of charged particles within a fluid as it passes through a magnetic field orthogonal to the direction of flow. The magnetic field causes a separation of the charged particles within a cross section of the pipe. Once separated, the flow of charged particles are attached to the electrodes placed orthogonal to the magnetic field results in an electromotive force in the electrodes further resulting in a voltage differential between the electrodes. The flow rate is calculated as a function of the velocity times the cross sectional area per unit length of time.

The advantage of magnetic flowmeters over other forms of flowmeters is twofold. First, magnetic flowmeters can operate in erosive and/or corrosive environments. Second, magnetic flowmeters do not mechanically hinder flow and, therefore, do not cause pressure drops.

Magnetic flowmeters can vary functionally depending upon a variety of parameters. One parameter of particular interest is the material used for the inner lining of the flow tube. Depending upon the application, the materials used for lining can vary and can be rubber, polyurethane, polytetrafluoroethylene (PTFE), ethylene tetrafluoroethylene (ETFE), Perfluoroalkoxy alkanes (PFA), rubber, (such as neoprene), polyurethane, Linatex®, and ceramics, such as alumina ceramic Al2O3. While most liner materials are satisfactory for many fluids, the useful life is significantly shortened when the fluid is under extremely high temperatures and/or pressures or contains corrosive and/or erosive material. Under these circumstances, ceramics are often employed to prolong the useful life of the product. For example, in hydraulic fracturing, the primary magnetic flowmeter is subjected to extremely harsh chemicals and slurries. It is currently common practice to use alumina as the inner lining of a magnetic flowmeter. However, these materials are inferior/problematic because they wear out easily and corrode due to the harsh conditions in which they are used (e.g., high temperatures and/or pressures). In the present invention, the design of the electrode seal and the flow tube allow for the magmeter to withstand high pressures.

Traditionally, companies develop a flow measurement system comprising a Primary (flow tube with magnetic system and sensing electrode) and a Secondary (power supply with a synchronized measurement circuitry). If used in highly aggressive applications, the Primary will usually wear out long before the Secondary. (If used in more benign applications, the Secondary usually wears out before the Primary.) When a company is developing a flow measurement system, electrical approvals are sought to verify that the system conforms to the requirements outlined in the National Electric Code.

The present invention includes a Primary designed to work in severe applications with a Secondary. The resulting system will meet the requirements for operation in Hazardous areas designated as Class I Division 2 (a recognized industry requirement) when the Secondary meets this requirement.

The present invention is designed to be tolerant or configurable to the electrical properties of the mating Secondary and is designed to be reversely compatible with the mating Secondary (i.e., the present invention can be tailored to mate with the properties of different, specific Secondaries).

The present invention will be designed to Class I Division 2 Hazardous Location (as defined by the US National Electrical Code, Article 500) with Intrinsically Safe electrodes as a standalone device.

Various preferred embodiments of the present invention improve upon existing magnetic flowmeters. For example, the flowmeter of the present invention can be tailored for oil and gas exploration and production with a lining of preferably partially stabilized magnesium zirconia (MgPSZ) an abrasion resistant ceramic trim that exceeds the capabilities of alumina. The present invention can also be tailored for onshore and offshore uses in the fracking industry. The present invention is capable of withstanding high pressures and a variety of corrosive slurries, acids, bases, and solvents. Various preferred embodiments of the present invention include the shrink fit of the lining material into the bore of the meter that results in an abrasion resistant liner that is under compression from the shrink fit and is therefore, significantly more tolerant to temperature swings and impact.

The following possibly relevant US and Foreign Patents and Patent Application Publications are incorporated herein by reference:

U.S. Pat. Nos. 3,750,468; 4,781,536; 6,591,201; 7,624,794; 7,637,169; 7,997,355; 9,377,333; 9,664,037; EP 0 660

919; US 2008/0035332; US 2009/0200084; US 2016/0334316; US 2017/0299414; US 2018/0209228; US 2019/0009232; WO 2009/094156; WO 2017/039659; WO 2018/080592.

Incorporated herein by reference are our prior patent applications: U.S. provisional patent application No. 62/581,385; U.S. provisional patent application No. 62/616,946; and U.S. patent application Ser. No. 16/181,167.

BRIEF SUMMARY OF THE INVENTION

The present invention relates to magnetic flowmeters. More particularly, the present invention relates to a magnetic flowmeter designed for oil and gas exploration and production that is capable of withstanding high pressures and a variety of corrosive slurries, acids, bases, and solvents and can measure extremely abrasive slurries accurately in mining, dredging, fracking, and oil and gas exploration without measuring oil and gas.

The present invention includes a Primary designed to work in severe applications with a Secondary. Specifically, the present invention is designed to be tolerant or configurable to the electrical properties of the mating secondary. The present invention is unique in part in that the magnetic flow tube is designed to work with a variety of manufacturers' transmitters (secondary electronics that energize magnetic coil and receive the voltage from the magnetic flow tube electrodes, and display and/or transmit a signal that indicates the actual flow).

The present invention improves upon existing magnetic flowmeters because it is tailored for offshore uses in the fracking industry with a lining of preferably partially stabilized magnesium zirconia (MgPSZ) and an abrasion resistant ceramic trim that exceeds the capabilities of alumina or yttria zirconia. All magnetic flow meters have an insulating lining in the bore of the flow tube that prevents the charged particles, which generate the flow signal from shorting to ground by the flowing conductive fluid. A preferred embodiment of the present invention preferably has this type of insulating lining in the area of the magnetic field with preferably metal pipe in the remaining length of the bore. What is unique in part about the present invention is the aspect of electrically conductive pipe in part of the bore of the magmeter. In preferred embodiments of the present invention, the electrically conductive pipe could be either upstream, or downstream of the magnetic field, or both. One benefit of the present invention is that the electrically conductive pipe eliminates the need for grounding rings. Grounding of the magmeter to the flowing fluid is required to produce the differential voltage which is proportional to the fluid velocity which is used by the secondary processor to calculate the actual rate of flow.

In a preferred embodiment of the present invention, the single piece of partially stabilized magnesium zirconia ceramic liner is preferably mechanically affixed to the metal tube via heat shrink (no adhesives). The present invention is capable of withstanding high pressures and a variety of corrosive slurries, acids, bases, and solvents. A preferred embodiment of the present invention (also known as the high-pressure severe application meter or HP SAM) preferably has a ceramic liner and tungsten carbide electrodes. Other materials can be used for electrodes that would have equal or greater properties including a conductive variant of the MgPSZ.

In a preferred embodiment of the present invention, the ceramic liner does not extend the full length of the metal tube. This embodiment can preferably be used either for shorter or for longer lay length meters. The unlined portion of the tube can serve to ground the liquid, which improves upon other grounding techniques (such as ground rings on the end of the flange or ground electrodes on an internal circuit) because of increased contact area with the fluid. In various preferred embodiments of the present invention, there is a metal transition area before and after the ceramic liner that contacts the process fluid and allows for good electrical grounding.

In various preferred embodiments of the present invention, the ceramic liner extends the full length of the metal tube. In other various preferred embodiments, the ceramic liner extends substantially the full length of the metal tube, but not all the way to the next mating surface, which prevents the ceramic liner from being crushed at installation.

A preferred embodiment of the present invention has solid, polished tungsten carbide signal electrodes for low noise in slurries and superior wear resistance. In a preferred embodiment of the present invention, the Tungsten Carbide electrodes are magnetically permeable which assists the formation of ions on the electrode face. This characteristic improves the quality of the electrical (EMF) signal. An alternative embodiment of the present invention does not include the tungsten carbide electrodes.

The present invention's design is for flexibility using various combinations of liner materials, electrode material made from metals, ceramics and conductive polymers and electrodes recessed under the surface of the lining material, and other variables.

In various preferred embodiments, the present invention will work with a type of existing transmitter.

Various preferred embodiments of the present invention have a pipe size ranging from 1" to 8". More preferably, the pipe size of the present invention is 2", 3" or 4". Most preferably, the pipe size of the present invention is 3", a 3-inch internal diameter.

Various preferred embodiments of the present invention can provide a hammer union connection, such as one listed in FIG. 106 (within the 1502 row).

In various preferred embodiments of the present invention, the hammer union can be a 15,000 pound CWP hammer union. In a preferred embodiment of the present invention, the pipe size can be 3" and has a 4" FIG. 1502 hammer union connection. Various alternative embodiments of the present invention do not include hammer union connections, flanges, or hose of weld joint installations.

The present invention preferably includes a tube with electrically insulated lining, magnetic coils with magnetic return path, sensing electrodes, grounding, housing to protect from the elements, and a junction box for electrical termination.

Current design pressure of a preferred embodiment of the present invention is 15,000 psi with a 1.5× safety factor, so a preferred embodiment of the present invention is designed to withstand 22,500 psi. The range of pressure for various preferred embodiments of the present invention can be a full vacuum to around 15,000 psi, more preferably from around 6,000 psi to 12,000 psi.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 shows a side, cutaway view of a preferred embodiment of the present invention;

FIG. 4 shows a fragmentary side, cutaway view of a preferred embodiment of the apparatus of the present invention showing the liner;

FIG. 5 shows an end, cutaway view of a preferred embodiment of the liner of FIG. 4;

FIG. 10 is a partial elevation view of an embodiment of apparatus of the present invention, including the electrode;

FIG. 11 is a partial elevation view of an embodiment of the apparatus of the present invention, including an electrode installed in the lined flow tube;

FIGS. 12-14 show various fragmentary views of an embodiment of the apparatus of the present invention, including the electrode head;

FIGS. 15-17 show various fragmentary views of an embodiment of the apparatus of the present invention, including the electrode isolating insulating disk;

FIG. 18 is a fragmentary elevation view of an embodiment of the present invention, including the electrode wire;

FIGS. 19-21 show various fragmentary views of an embodiment of the apparatus of the present invention, including the electrode screw;

FIGS. 28-30 are fragmentary views of a preferred embodiment of the apparatus of the present invention, illustrating the armature plate;

FIGS. 31-34 show various views of a preferred embodiment of the housing or shell of the present invention;

FIGS. 43-45 show various views of an alternative embodiment of the electrode head of the present invention;

FIGS. 46-49 show various views of an alternative embodiment of the back up plug/backer/screw of the present invention;

FIGS. 50 and 51 show various views of an alternative embodiment of the electrode shaft of the present invention;

FIGS. 53-55 show various views of a preferred embodiment of the electrode retention collar of the present invention;

FIGS. 56-58 show various views of a preferred embodiment of the electrode shield of the present invention;

FIGS. 59-65 show various views of the parts of a preferred embodiment of the electrode adjustment screw of the present invention;

FIGS. 78 and 80 show various views of a preferred embodiment of the lined tube of the present invention;

FIG. 79 shows a close up view of an electrode thruhole of the alternative embodiment of the lined tube;

FIGS. 93-105 show a preferred embodiment of the electrode of the present invention and its components; and FIG. 106 shows various preferred embodiments of the present invention that can include a hammer union connection.

DETAILED DESCRIPTION OF THE INVENTION

Figure 3:
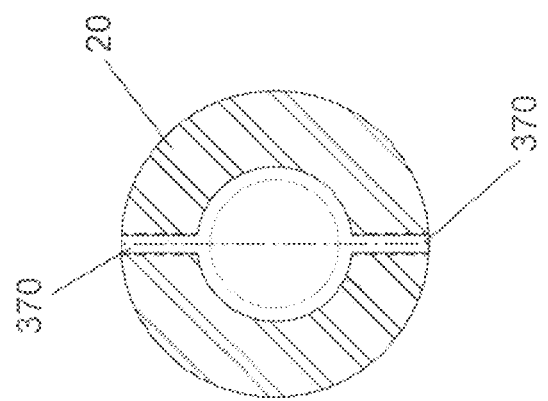
FIG. 3 shows an end, cutaway view of an alternative preferred embodiment of the present invention, including the flow tube.

The present invention has various embodiments comprising different combinations of liner material, electrode material, and other variables.

The present invention preferably includes a housing or shell, a tube, sensor, an electronics interface, lining, and electrode(s). More specifically, the present invention preferably includes a tube with electrically insulated lining, magnetic coils with magnetic return path, sensing electrodes, grounding, housing to protect from the elements, and a junction box for electrical termination.

In a preferred embodiment of the present invention, the sensor design component of the invention could be any one of the following and more preferably, is "T" in the table below:

| | |
|---|---|
| A | ABB - F&P - Kent Taylor |
| E | Endress Hauser |
| F | Foxboro 2800 |
| K | Krohne |
| R | Rosemount 8705/8787 |
| T | Thompson Equipment Company |
| Y | Yokogawa Admag |

In various preferred embodiments of the present invention, the electronics interface component (aka the Secondary) could be a Rosemount 8712 or a Secondary designed and developed by Thompson Equipment Company, Inc.

In a preferred embodiment of the present invention, the lay length of the present invention could be any one of the following and more preferably, is "C" in the table below:

| S | ISO 13359 Lay Length |
| C | Custom (Designates the lay length prior to ISO 13359) |

In a preferred embodiment of the present invention, the lining of the present invention is preferably partially stabilized magnesium zirconia.

FIG. 1 shows a preferred embodiment of the present invention designated generally by the numeral 10. Magmeter 10 includes flow tube or pipe 20 and liner 30 that lines tube 20. Magmeter 10 can measure flow in either direction (inlet to outlet or outlet to inlet) and can correctly indicate the direction of flow. In a preferred embodiment, liner 30 can be partially stabilized magnesium zirconia (MgPSZ), which is an abrasion resistant ceramic trim that exceeds the capabilities of alumina or yttria zirconia. Liner 30 can be seen in FIGS. 4 and 5. Housing magnetic or shell 40 surrounds a section of tube 20. Attached to the top of housing or shell 40 is mounting element 17, which includes pipe or neck 18 and plate 19. Plate 19 sits atop pipe or neck 18 and can be welded to pipe or neck 18 (e.g., by a ⅛-inch continuous fillet weld). Pipe 18 can be a 1-inch IPS steel pipe schedule 40×2.25 long. Housing 40 can be seen in more detail in FIGS. 31-34. Tube 20 can be high strength stainless steel that can be machined from a single piece of Nitronic 50 (which is a special stainless steel variant with the following specifications: density of 0.285 lb/in$^3$, tensile strength of 100 ksi, yield strength of 55 ksi, elongation of 35%, and hardness of 293). Nitronic 50 has the following useful properties:

Ultimate tensile strength: 100 ksi minimum to withstand working pressures of 6,000-22,500 psi
Meets NACE MR0175/ISO 15156-3 and MR0103
Low Magnetic Permeability
Excellent corrosion resistance.

Figure 40:
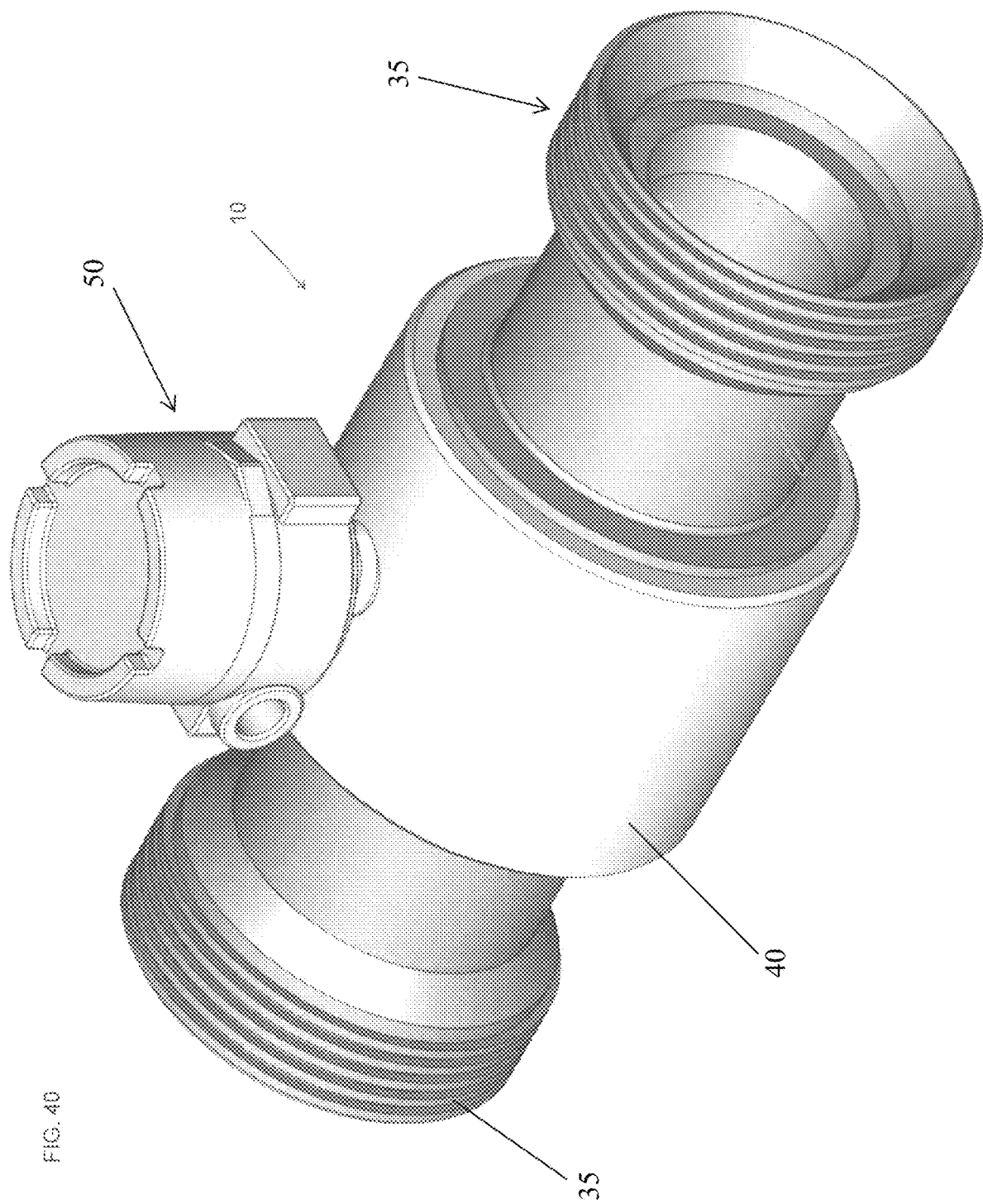
FIG. 40 shows a preferred embodiment of the magmeter of the present invention.

FIG. 40 shows a preferred embodiment of the present invention including magmeter 10.

The present invention provides a method of lining flow tube 20 with liner 30 can include the following: lining includes a shrink fit that involves a tight tolerance on the inner diameter of tube 20 and outer diameter of liner 30. Tube 20 is heated to a temperature of around 700° F., preferably for several hours until the tube 20 is fully and evenly heated. The tube 20 is removed from the oven and liner 30 is dropped into tube 20. As the metal cools, it contracts around the ceramic, compressing it and increasing its strength.

Figure 2:
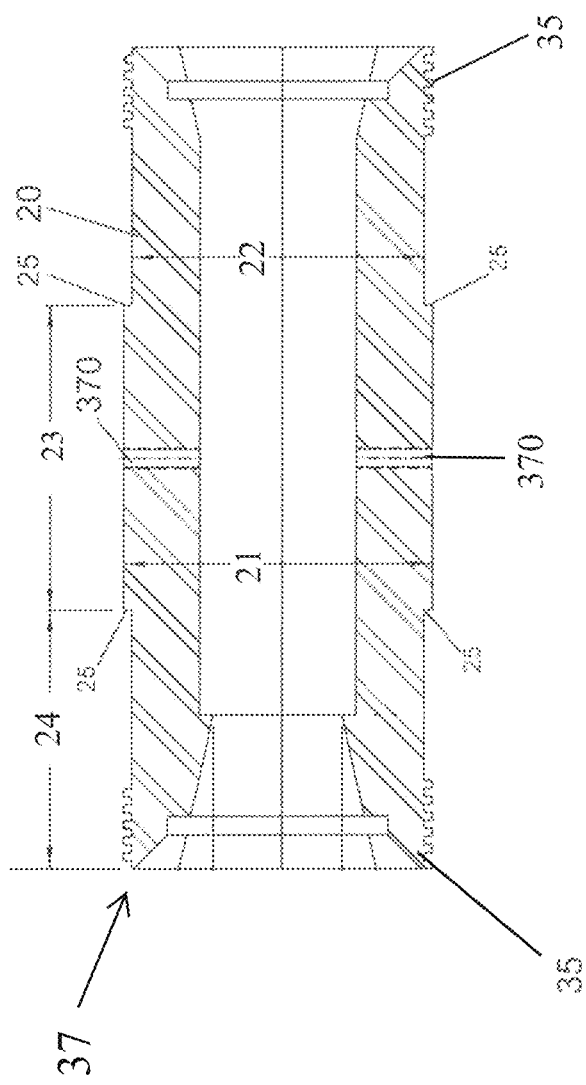
FIG. 2 shows a side, cutaway view of an alternative preferred embodiment of the present invention, including the flow tube.
Figure 6:
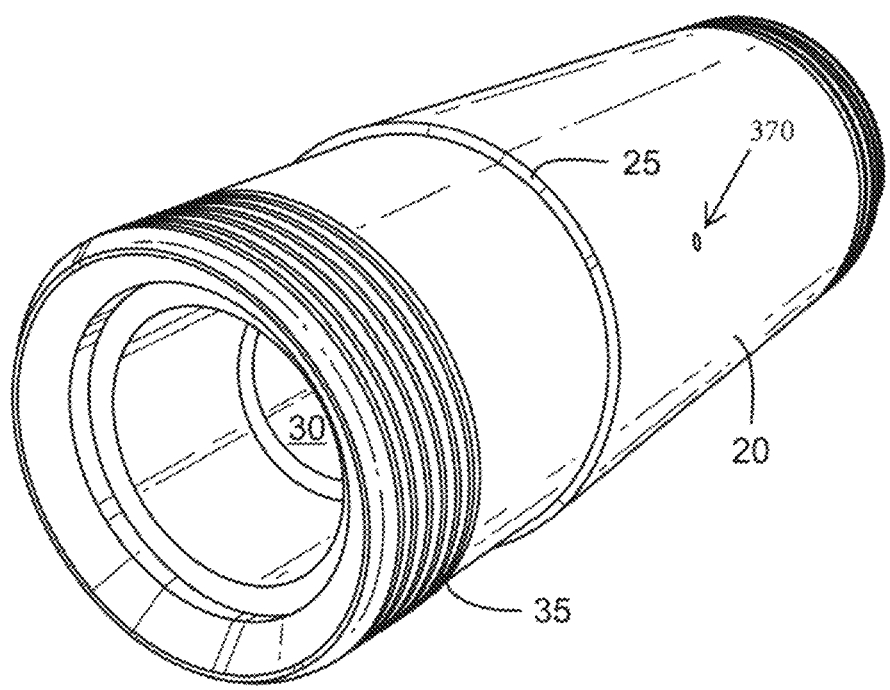
FIG. 6 is a perspective view of a preferred embodiment of the present invention.
Figure 7:
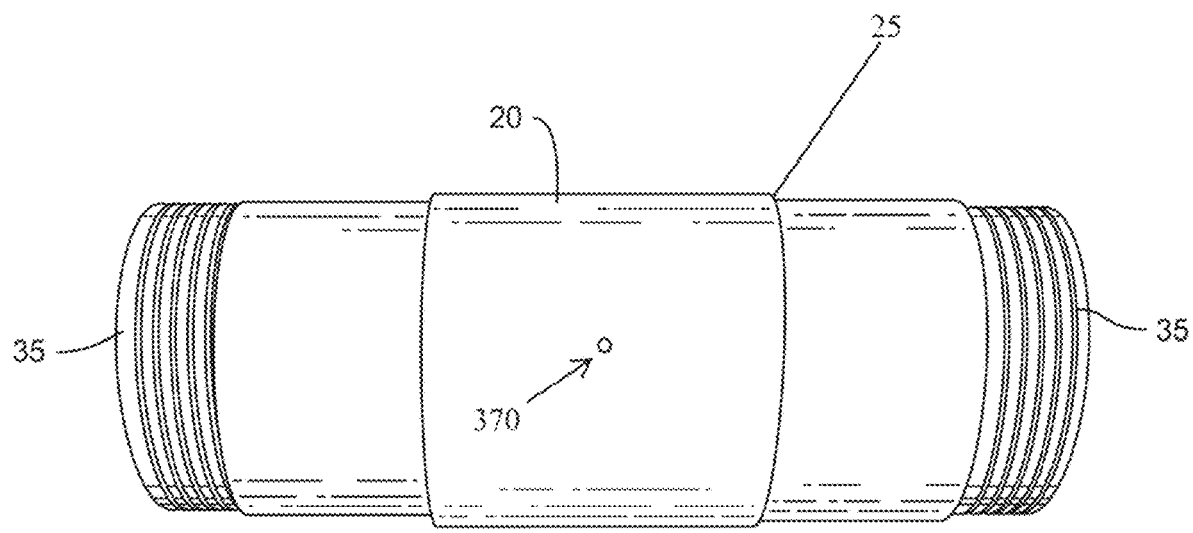
FIG. 7 is a side elevation view of a preferred embodiment of the apparatus of the present invention.
Figure 37:
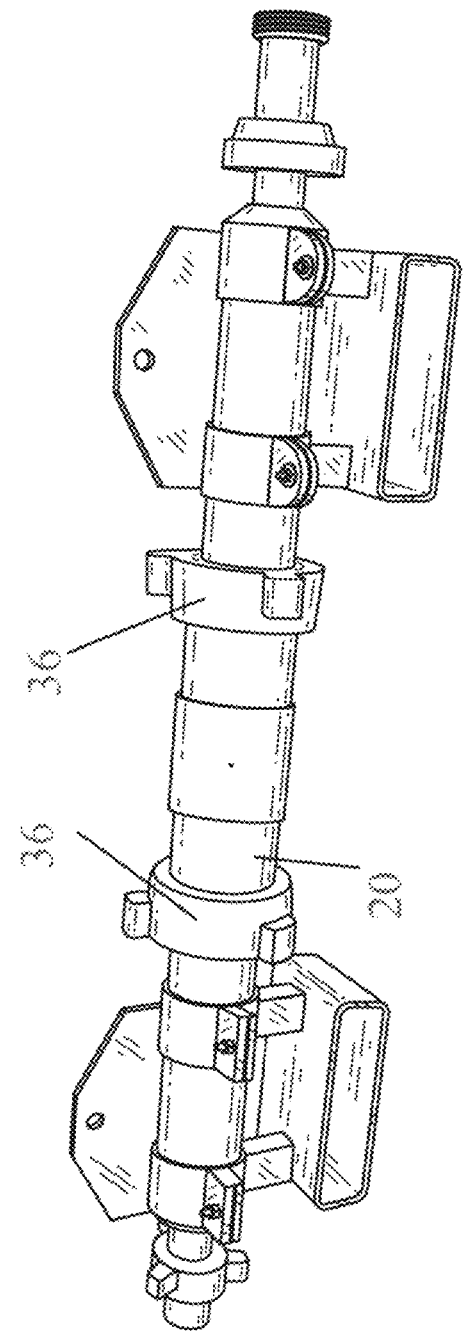
FIG. 37 shows a preferred embodiment of the present invention, specifically, the lined tube with electrodes installed and with the hammer unions connected on each end.
Figure 38:
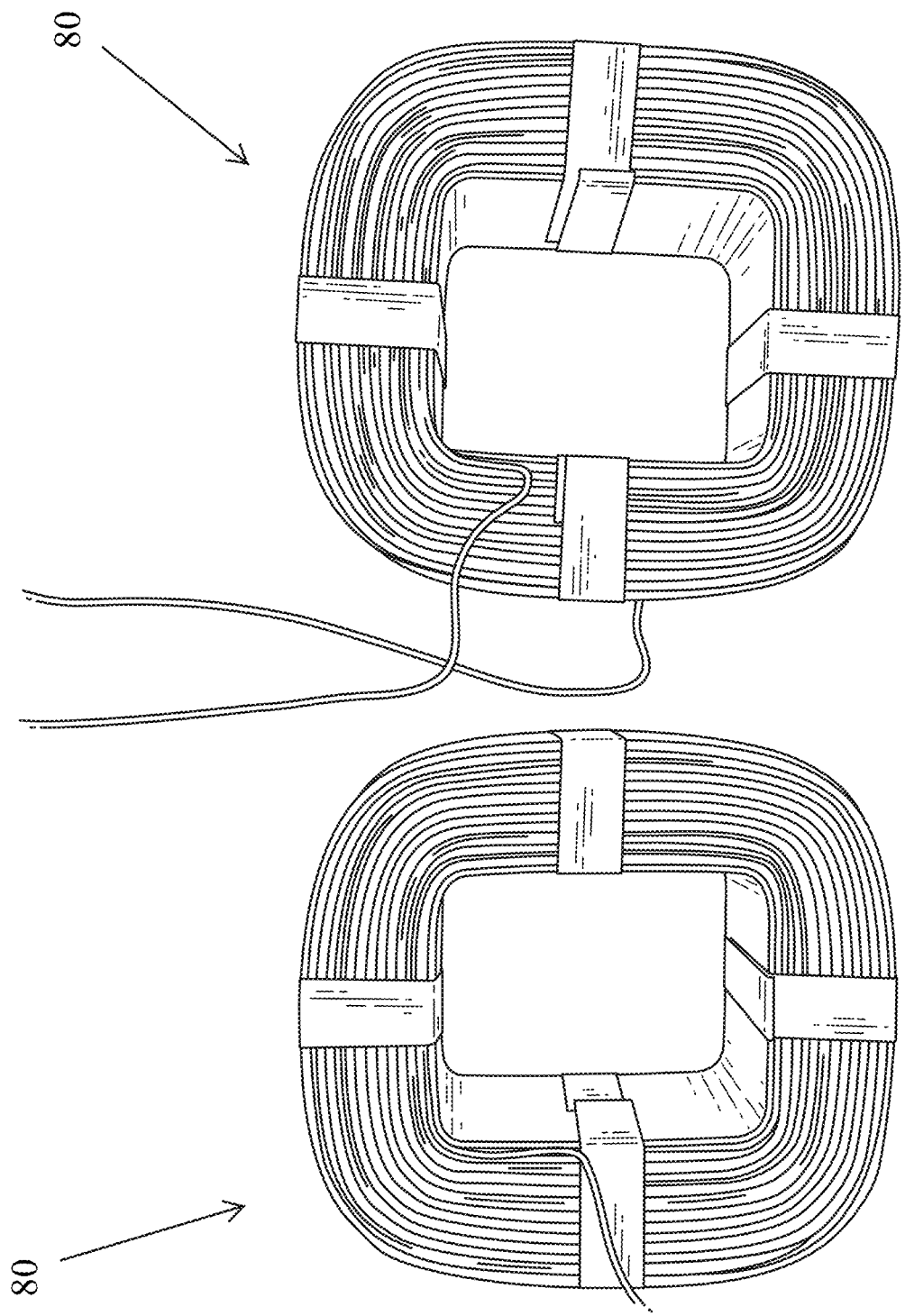
FIGS. 38 and 39 show a preferred embodiment of the magnetic coils of the present invention.
Figure 39:
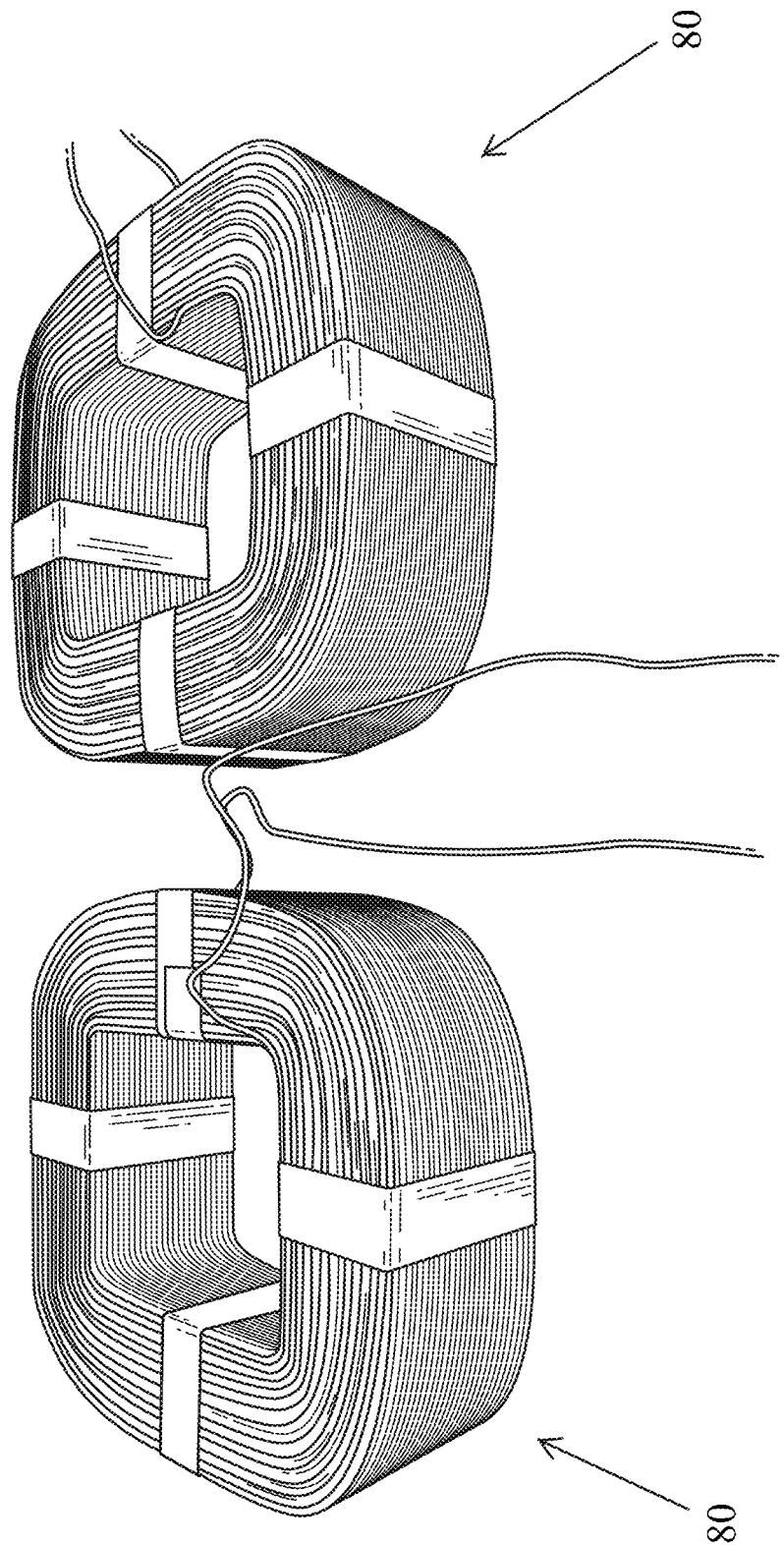

As shown in FIGS. 1 and 2, in a preferred embodiment of the present invention, each end of tube 20 has threaded connections 35. A winged type hammer union, preferably a male hammer union, more preferably, a model 1502 male hammer union, is connected to each end of tube 20 at threaded connection 35. In a preferred embodiment of the present invention, threads of threaded connection 35 can be preferably generally parallel. FIG. 37 shows hammer unions 36 connected to each end of tube 20.

Flow tube 20 can be made from Nitronic 50, more specifically, Nitronic 50 Anneal 1950 bar. Tube 20 can have a length of preferably about 12-24 inches, more preferably about 17-21 inches, and most preferably about 19 inches. An alternative embodiment of the present invention could include 1" diameter plus connections, 3" meter 9" long.

Figure 36:
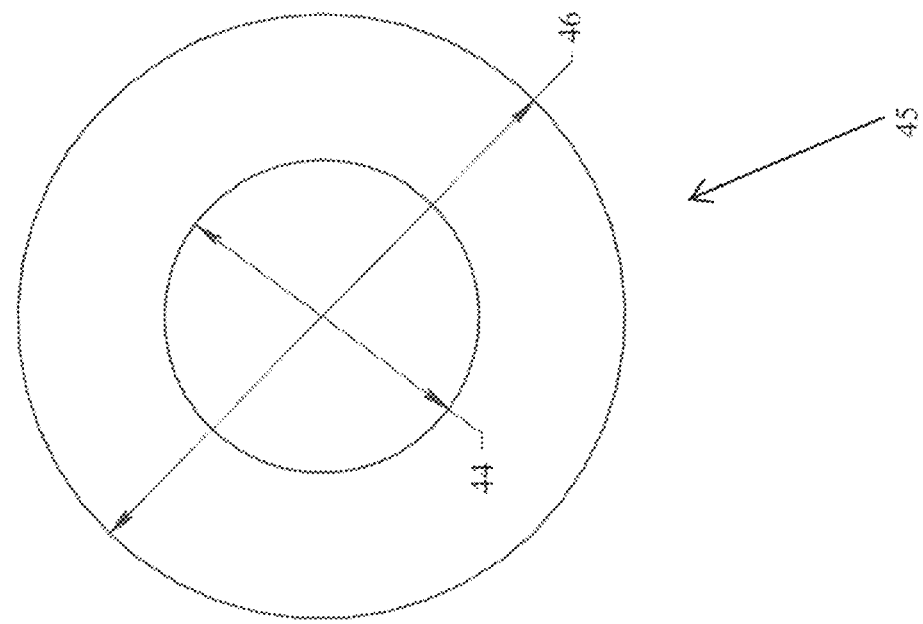
FIGS. 35 and 36 show various views of a preferred embodiment of the housing rings of the present invention.
Figure 35:
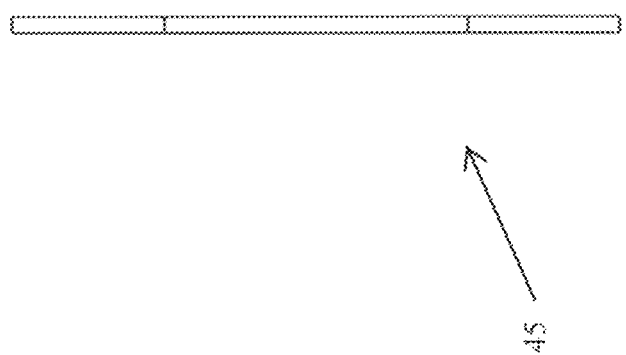

Tube 20 can have 2 different outer diameters: a first, larger diameter 21 that is preferably located in the middle portion of tube and serves the purpose of keeping stress below the maximum allowable in the area of holes for electrodes. Larger diameter 21 is preferably kept as small as possible to allow for the magnetic field to pass through the tube. The smaller diameter has to allow for the housing rings 45 (seen, for example, in FIGS. 35-36) to be placed on the tube for welding. Rings 45 can have an inner diameter 44 and an outer diameter 46 (as shown in FIG. 36). Inner diameter is preferably about 7.25 inches, and outer diameter 46 is preferably about 14 inches. In an alternative embodiment, tube 20 can have substantially the same diameter throughout tube 20.

Tube 20 preferably has exterior shoulders or ridges 25 (see FIG. 2), which is where first diameter 21 meets second diameter 22. Ridges 25 can define the length 23 of first diameter 21 in tube 20. Ridges 25 also can define how long (length 24) second diameter 22 extends from shoulders 25 to the end 27 of tube 20. In a preferred embodiment of the present invention, length 23 of first diameter 21 is preferably about 4-12 inches, more preferably about 5-9 inches, and most preferably about 7.125 inches. In a preferred embodiment of the present invention, length 24 (from shoulders 25 to end 37 of tube 20) of second diameter 22 is preferably about 4-12 inches, more preferably about 5-9 inches, and most preferably about 6 inches. In a preferred embodiment, the distance between each end 27 of tube 20 to shoulders 25 can be about the same, but it does not have to be the same.

Figure 8:
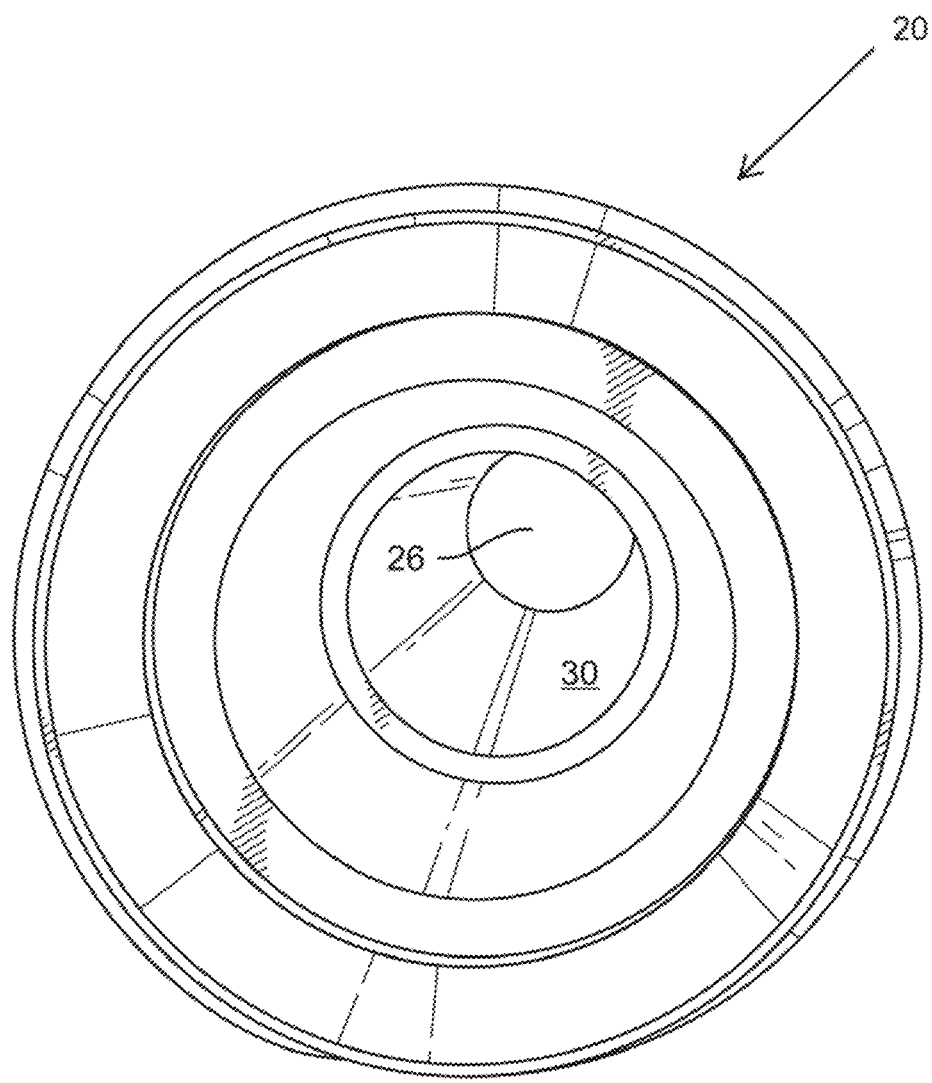
FIGS. 8 and 9 show end views of a preferred embodiment of the present invention, including the flow tube and the liner.
Figure 9:
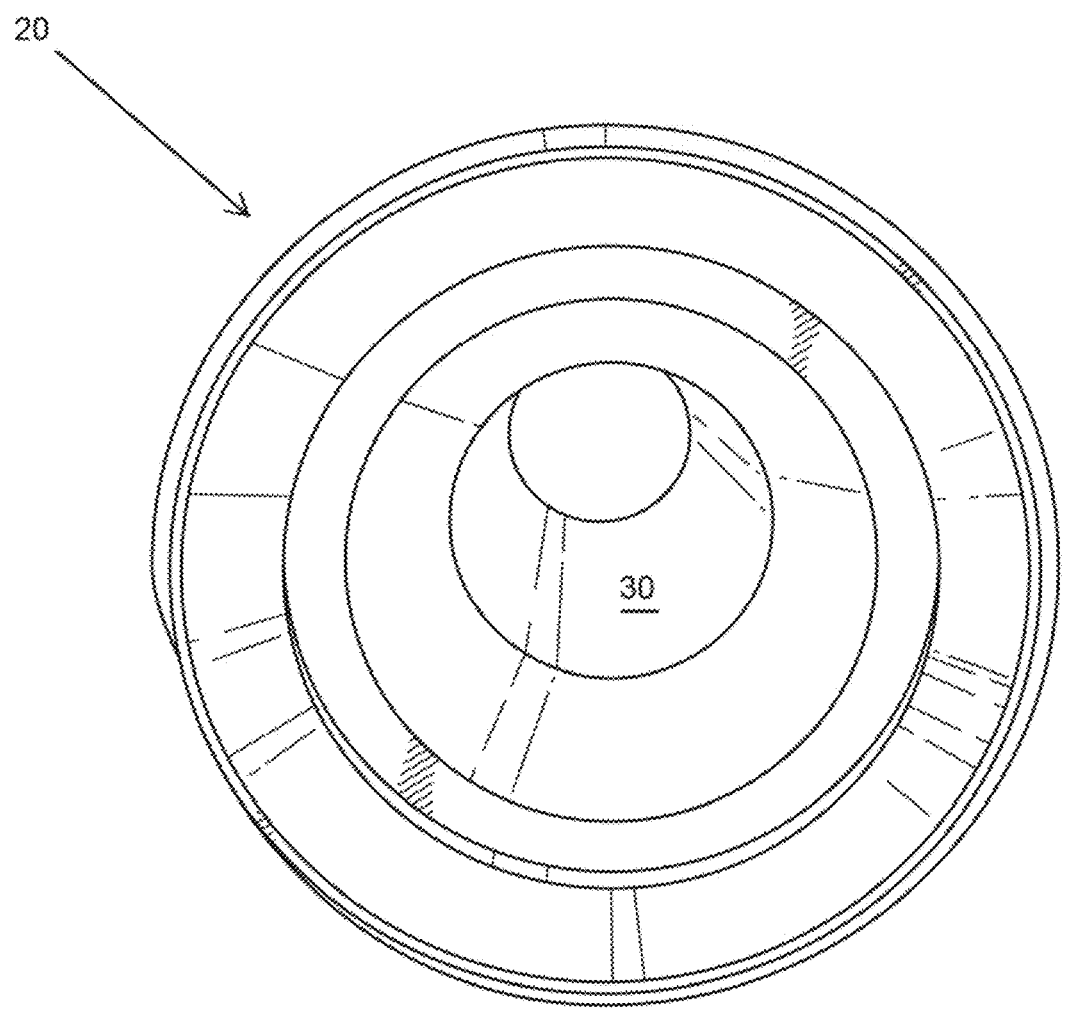
Figure 22:
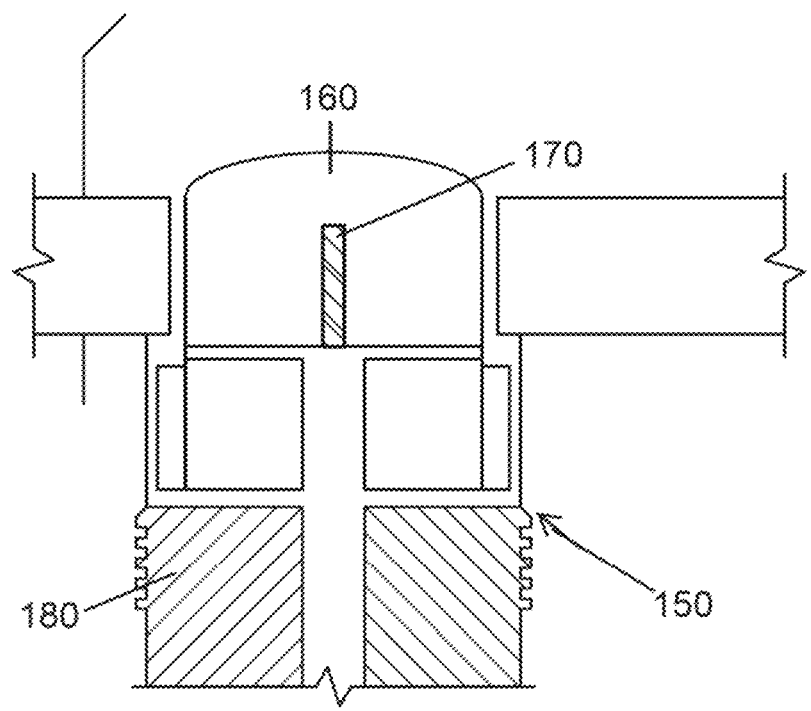
FIGS. 22-24 show various views of an embodiment of an electrode installed in the lined flow tube of the present invention.
Figure 23:
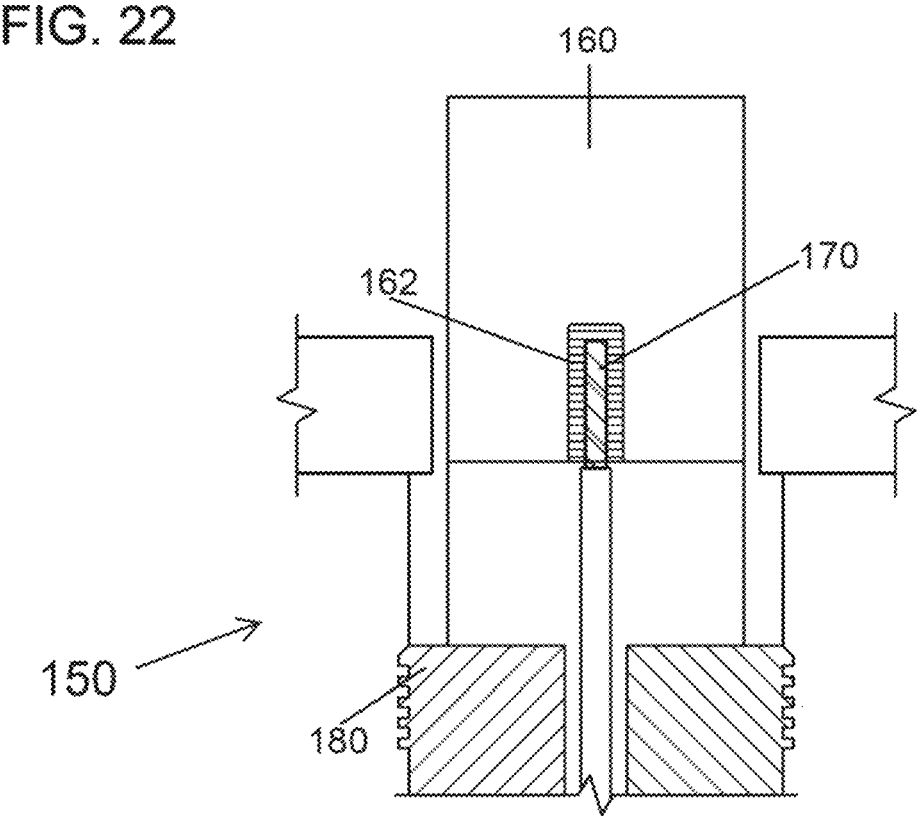

FIGS. 2 and 3 also show electrode receptacle thruholes 370. Electrode thruholes 370 are located about in the middle (lengthwise) of tube 20 as seen in FIG. 2. Thruholes 370 can have a diameter of preferably about 0.1-1 inch, more preferably about 0.15-0.5 inches, and most preferably, about 0.28 inches. Thruholes 370 can have a length of preferably about 1-8 inches, more preferably about 2-5 inches, and most preferably, about 3.6 inches. First outer diameter 21 can be preferably about 7.2 inches. Second outer diameter 22 can preferably be about 6.8 inches. FIG. 2 shows FIGS. 6-9 show tube 20. Liner 30 can be seen in FIGS. 4 and 5. Threaded connections 35 can be seen in FIGS. 1, 6 and 7. FIGS. 8 and 9 also show central bore 26 of tube 20.

FIGS. 31, 33 and 34 show shell 40. FIG. 31 shows top half of shell 40, and FIG. 34 shows the bottom half of shell 40. The length of shell 40 is about 7.5 inches. Shell 40 preferably has an inner diameter of about 14 inches. The top of shell 40 can have a ⅛ inch CRS Steel Plate. The bottom of shell 40 can have a ⅛ inch CRS Steel Plate. Attached to the top of shell 40 is a mounting element 17, as shown in FIGS. 31 and 33, that junction box 50 will attach to. Mounting element 17 includes neck 18 and plate 19 that sits atop neck 18 and is welded to neck 18 preferably by a ⅛ inch continuous fillet weld. Neck 18 is preferably a 1 inch IPS steel pipe schedule 40×2.25 long. Plate 19 is shown in detail in FIG. 32 and is preferably a CRS Plate ¼ inch thick and 2.75 inches by 2.75 inches. Plate 19 preferably has openings 16. In a preferred embodiment, plate 19 has 4 openings 16 that are spaced about 1.75 inches apart and allow for plate 19 to be drilled to the top of neck 18. Shell 40 can go around flow tube 20 or flow tube 520.

Figure 25:
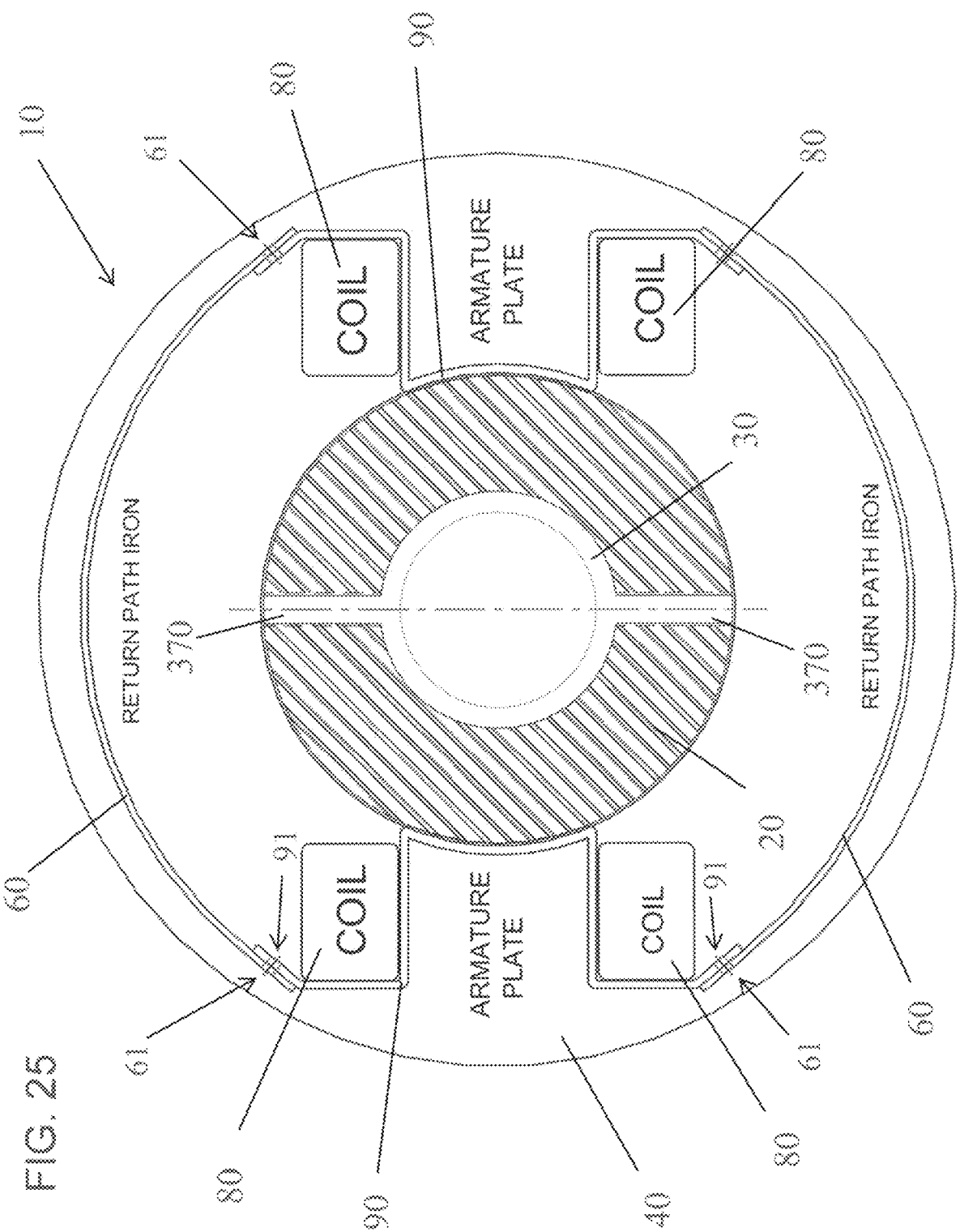
FIG. 25 shows a preferred embodiment of the magmeter of the present invention, specifically, a cross section of the meter at the electrode plane with the layout of the magnetic system including the coils, armature plates, and electromagnetic return path irons.

FIG. 25 shows a cross-sectional view of a preferred embodiment of the high pressure magmeter of present invention, designated generally by the numeral 10. FIG. 25 shows the interface of electromagnetic return path iron 60, coils 80, armature plates 90, and tube 20. Tube in FIG. 25 can also be 520, and thruholes in FIG. 25 can also be 570. A preferred method of installation of these components includes: fitting armature 90 into the middle of the coil, the holes 93 in armature 90 allow two threaded studs welded to the outside of the tube 20, 520 to pass through. The radius on that part of the armature 90 allows the armature 90 to sit snuggly on the tube 20, 520. A bolt tightened on the threaded studs secures the armature 90 fitted with the coil. Holes 91 tapped to accept a machine screw) allow for the return iron 60 (sheets of flexible metal) to be affixed to the armature 90 (corresponding holes are punched in the return iron pieces 60) and bent around the tube 20, 520 to meet up with the same holes on the other armature.

Figure 27:
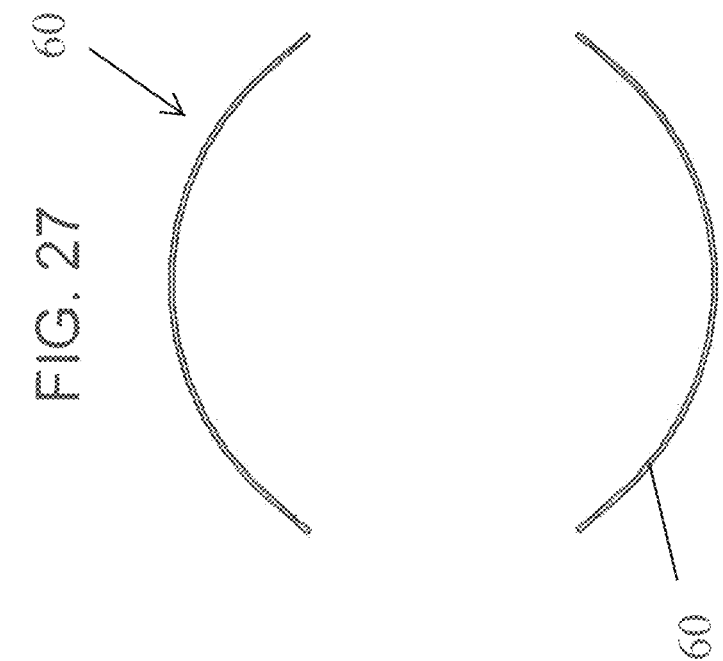
FIGS. 26 and 27 are fragmentary views of a preferred embodiment of the apparatus of the present invention, illustrating the electromagnetic field return path irons.
Figure 26:
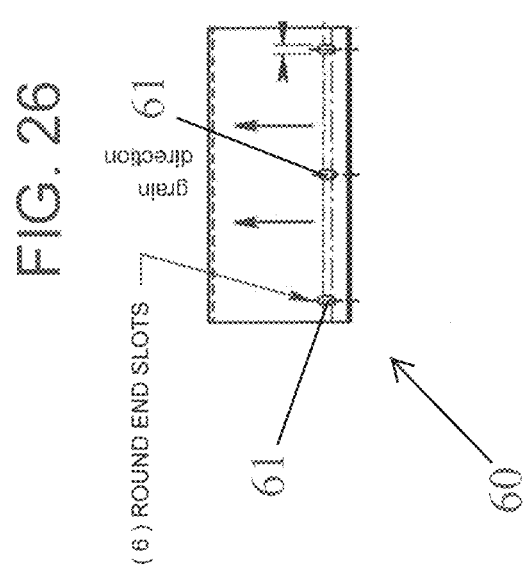

FIGS. 26 and 27 show various views of return path iron 60. Return path iron 60 is preferably about 0.014 inches thick, full processed grain-oriented silicon steel (GS0140 066 C02), annealed. Return path iron 60 preferably has slots or openings 61 (shown in FIG. 26, for example) that allow for a connection to armature plate 90.

FIGS. 28-30 show various views of armature plate 90. Armature plate 90 is preferably about 0.125 inches thick and a 1020 CR steel sheet. Plate 90 has openings 91 which allow for a connection to return path iron 60 (as shown in FIG. 28, for example). Plate 90 has openings 93 (as shown in FIG. 28, for example) that allow for a connection to tube 20.

FIG. 10 shows a preferred embodiment of assembled electrode 150. Electrode 150 includes wire 170 and head 160. A preferred embodiment of electrode wire 170 is seen in FIG. 18. As seen in FIG. 10, there is preferably about a 90-degree angle between electrode wire 170 and head 160. Head 160 can have opening receptacle 162 that can fit a portion of the length of wire 170. In a preferred embodiment, head 160 is solid WC (as opposed to a WC coating). When a portion of wire 170 is inserted into receptacle 162, there can be a gap 161 between wire 170 and receptacle wall 163. A preferred method of assembly of electrode 150 includes 1) locating wire 170 into head receptacle 162, 2) fixture or spot welding to maintain, preferably a 90 degree/perpendicular orientation of wire 170 to head 160 preferably within a 2° tolerance, 3) applying a filler metal, such as a silver based Zink free filler metal, such as, Silvaloy brazing alloy to gap 161 (a preferred method of assembly could include any alloy or conductive adhesive), 4) furnace brazing the alloy, 5) cleaning up any alloy migration, and 6) coating wire 170 with coating 175, wherein coating 175 can be enamel, such as Glyptal 1201 insulating enamel, and 7) letting the coating dry for about 24 hours or most preferably 10 microns of Aluminum Oxide coating. Furnace brazing the alloy, as mentioned in step 4 above, will occur at a certain temperature and for an amount of time, as recommended by the alloy's manufacturer.

Figure 24:
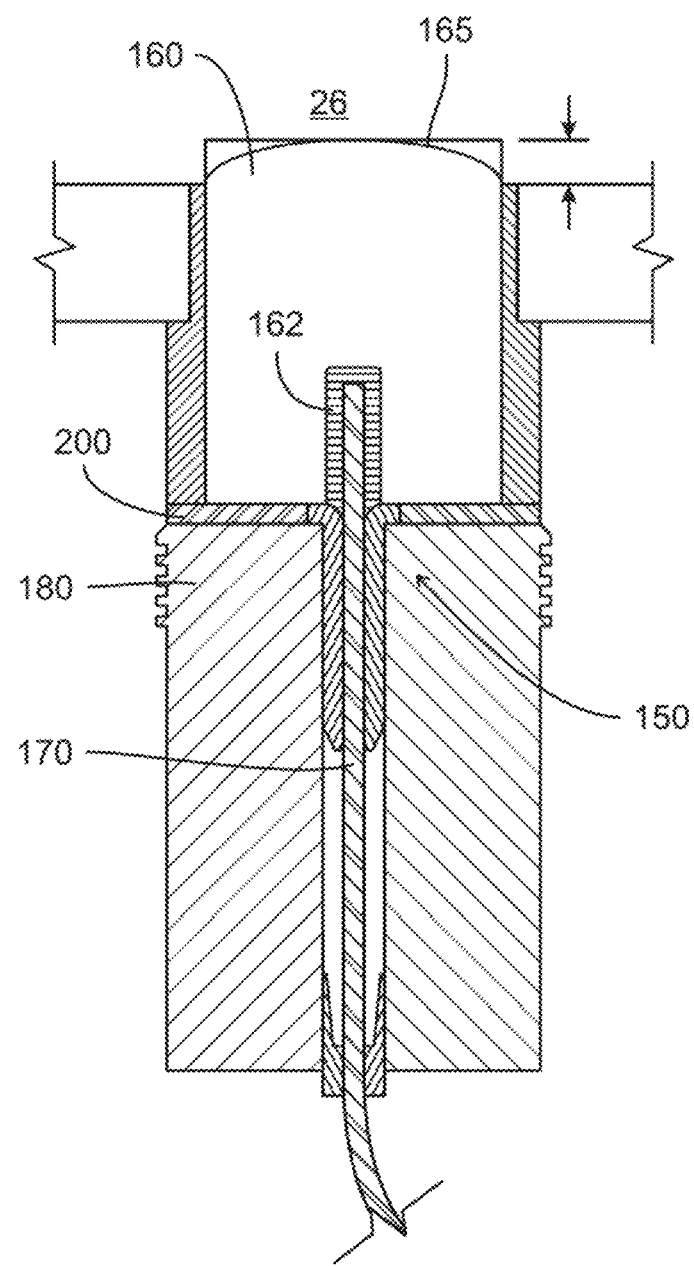

FIG. 11 shows a preferred embodiment of an electrode 150 (which in a preferred embodiment includes electrode wire 170 and electrode head 160) assembled/installed into tube 20. Head 160 is the wetted part that is sensing the induced voltage. Prior to installation into tube 20, electrode 150 has preferably been assembled as enumerated above and as seen in FIG. 10. A preferred method of the assembly procedure of electrode 150 into tube 20 is as follows: 1) inserting electrode 150 so that a portion (bottom 165) of head 160 extends into the cavity of tube 20, 2) filling the ceramic zone preferably with epoxy preferably using a precision dispenser, 3) inserting spacer 200 so that it is preferably flush with the top 164 of head 160, 4) inserting screw 180 until the head 181 of screw 180 is preferably generally flush with spacer 200, 5) inserting Teflon (PTFE) rod tool that is generally sized to fit bore 185 (the insertion of the Teflon (PTFE) tool can set the electrode depth), 6) aligning flats with electrode 150, and 7) screwing in screw 180 until electrode head 160 is generally snug against the Teflon (PTFE) rod tool. In a preferred method of the assembly procedure of electrode 150, the Teflon rod tool keeps the epoxy from draining out during electrode insertion. In a preferred embodiment of this method of assembly, with the tool inserted, the electrode depth is generally set and this moves the remaining epoxy into the threaded area, preferably located in the interior surface of electrode thruholes 370. In a preferred embodiment, the epoxy used is preferably epoxy Eccobond 104 or 3M DP 125. FIG. 24 also shows a preferred embodiment of electrode 150, including backup plug 180, which preferably shoulders the pressure and keeps electrode 150 from shooting out of the side of the meter.

FIGS. 12-14 show various views of electrode head 160. FIG. 13 shows opening 162 in head 160, where opening 162 has receptacle walls 163. Electrode head 160 can be generally cylindrically shaped and can be industrial grade tungsten carbide K10 (or different designation) with a maximum 10% cobalt binder. Electrode head 160 can be preferably about 0.1-0.5 inches long, more preferably about 0.2-0.4 inches long, and most preferably, about 0.35 inches long. Length 166 of head 160 is shown in FIG. 13. In a preferred embodiment of the present invention, the length of opening 162 is about half the length of head 160. Electrode head 160 can be preferably ultrasonically cleaned after manufacture. In a preferred embodiment of the present invention, the diameter of head 160 is about 0.1-0.5 inches, more preferably about 0.2-0.4 inches, and most preferably about 0.23 inches. The diameter of opening 162 can be about 0.03-0.3 inches, more preferably about 0.05-0.1 inches, and most preferably about 0.066 inches. Opening 162 is located at one end (the top 164) of head 160 with a chamfer located at the opposing end (bottom 165) of head 160. In a preferred embodiment, opening 162 is sized and shaped to accommodate and fit the diameter of electrode wire 170 and a part of the length of wire 170.

FIGS. 15-17 show disk or spacer 200. Disk 200 can be generally circular in shape and can be made of Izory® or magnesia partially stabilized zirconia (Mg-PSZ). The center of disk 200 has opening 205, which is generally circular in shape. Opening 205 is sized and shaped to accommodate and fit electrode wire 170. The diameter of spacer 200 can be preferably about 0.1-0.5 inches, more preferably about 0.2-0.4 inches, and most preferably about 0.27 inches. The diameter of opening 205 can be about 0.03-0.3 inches, more preferably about 0.05-0.1 inches, and most preferably about 0.066 inches. In a preferred embodiment, the thickness of spacer 200 is preferably about 0.03-0.3 inches, more preferably about 0.05-0.1 inches, and most preferably about 0.06 inches.

FIG. 18 shows electrode wire 170, which can be made of Beryllium Copper C13700, and preferably has a diameter of about 0.01-1.5 inches, more preferably about 0.04 inches –1 inch, and most preferably, about 0.060 inches/1.5 millimeters (mm). In a preferred embodiment, the length of wire 170 is about 1-5 inches, more preferably about 1.5-4 inches, and most preferably about 2.1 inches.

FIGS. 19-21 show electrode screw 180, which can be generally cylindrically shaped and can be a 309 stainless steel bar. Electrode screw 180 preferably has an opening or bore 185 that can extend substantially through the length of screw 180. In a preferred embodiment, opening 185 is sized and shaped to accommodate and fit electrode wire 170. In a preferred embodiment, the length of screw 180 is preferably about 0.3-3 inches, more preferably about 0.5-1.5 inches, and most preferably, about 0.93 inches. In a preferred embodiment, each end 181, 182 of screw 180 can have a chamfer.

Figure 41:
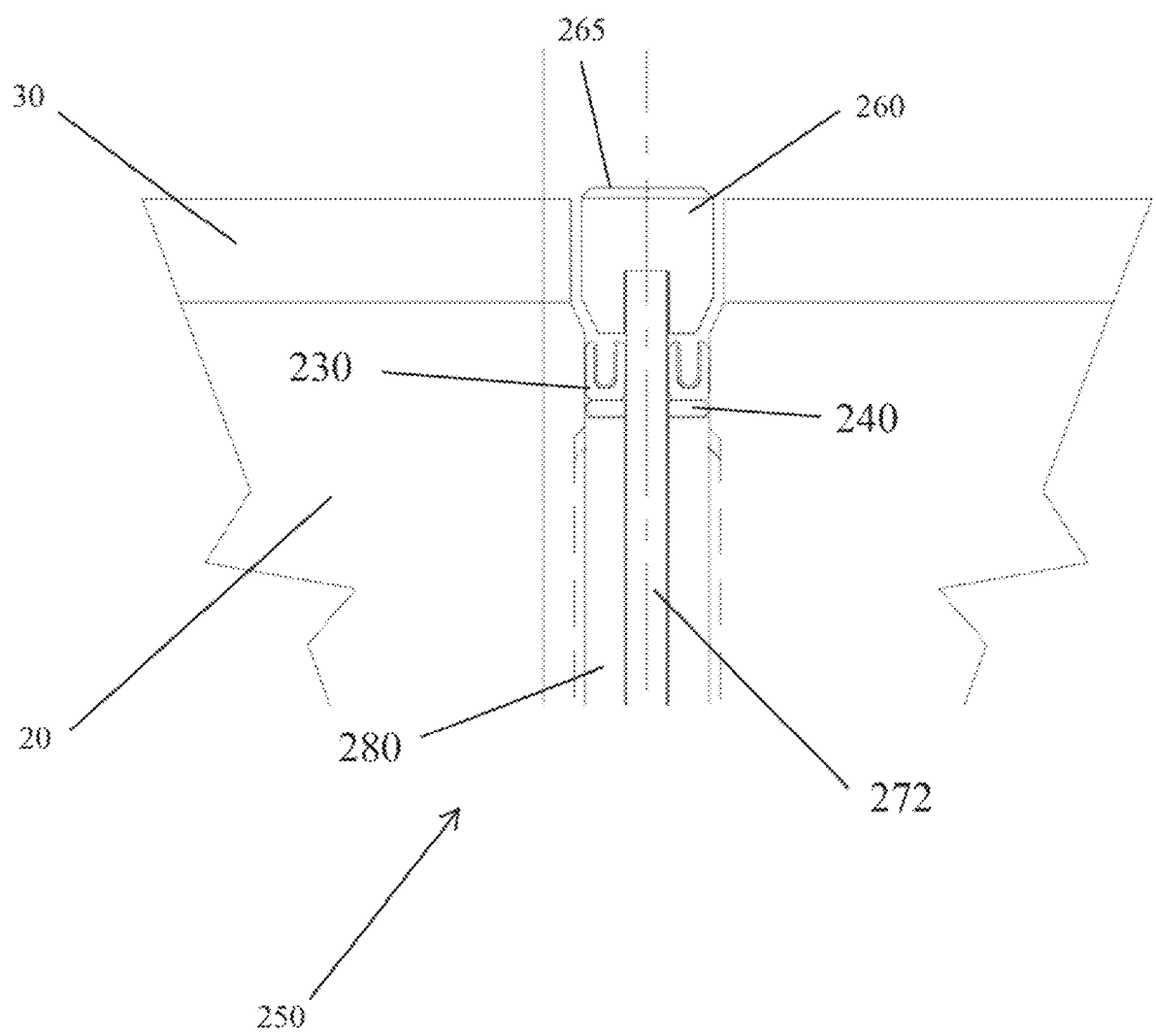
FIG. 41 is a partial, cutaway view of an alternative embodiment of the electrode of the present invention.
Figure 42:
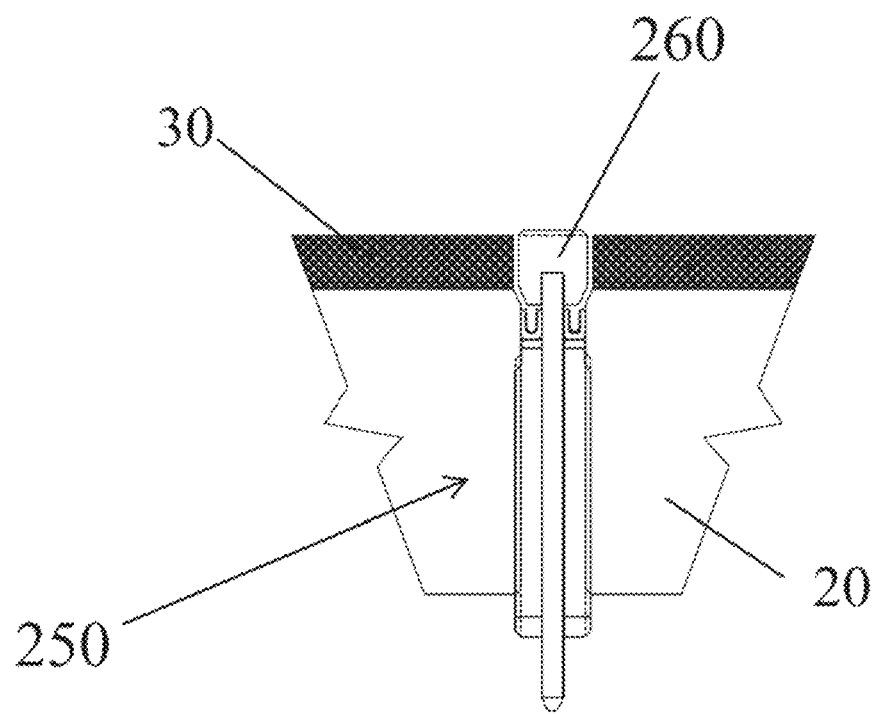
FIG. 42 shows an alternative embodiment of the electrode installed in the flow tube of the present invention.

FIG. 41 shows a partial view of an alternative embodiment of the electrode of the present invention designated generally by the numeral 250. FIG. 42 shows another view of an alternative embodiment of the electrode, designated generally by the numeral 250. This alternative embodiment of the electrode of the present invention can be used without epoxy, and the electrode and seal can be removed and replaced. FIGS. 41 and 42 show assembled electrode 250 installed in thruhole 370. Electrode 250 includes head 260 assembled with shaft 272. Seal 233 and ring 240 surround shaft 272, and shaft 272 is inserted into plug 280. Tip 265 of head 260 extends slightly into bore 26 of tube 20. Tube 20 has liner 30 installed.

FIG. 42 shows an alternative preferred embodiment of the electrode of the present invention designated generally by the numeral 250.

FIGS. 43-77 show preferred embodiments of the alternative electrode design of the present invention and its various components.

FIGS. 43-45 shows various views of electrode head 260. Electrode head 260 can be industrial grade tungsten carbide K10 (or different designation) with a nominal 10% cobalt binder. Electrode head 260 can be ultrasonically cleaned after manufacture. FIGS. 43-45 show opening 262 in electrode head 260. Opening 262 has receptacle walls 263 and is sized and shaped to accommodate and fit the diameter of electrode shaft 272 and a part of the length of shaft 272. Opening 262 can be located at one end (the top 264) of head 260 with a chamfer located at the opposing end (bottom 265) of head 260. The chamfer at end 265 of head 260 is preferably about 0.04 inches. Electrode head 260 can be cylindrically shaped, but can have slight angled portions 261 near end 264. Electrode head 260 can be about 0.2-0.5 inches long, more preferably about 0.037-0.048 inches long, and most preferably, about 0.439 inches long. The length of opening 262 can be about half the length of head 260. In a preferred embodiment of the present invention, the angle of each angled portion 261 is about 25° sloping inward toward opening 262. The length of each angled portion 261 is about ¼ of the length of electrode head 260, with a most preferable length of about 0.109 inches. The diameter of head 260 is about 0.375 inches. The diameter of opening 262 can be about 0.125 inches.

FIGS. 46-49 show electrode screw or backup plug 280, which can be generally cylindrically shaped and can be a 309 stainless steel bar. Electrode screw 280 preferably has two opposed ends 281, 282 and opening or bore 285 that can extend substantially through the length of screw 280. Portion 283 of screw 280 is slotted and is sized and shaped to fit and accommodate the head or tip of a screwdriver. Screw 280 is preferably 7/16-20 UNF 3A. In a preferred embodiment, opening 285 is sized and shaped to accommodate and fit electrode shaft 272. In a preferred embodiment, the length of screw 280 is preferably about 1.67-1.7 inches, more preferably about 1.675-1.69 inches, and most preferably, about 1.679 inches. In a preferred embodiment, bore 285 preferably has a diameter of about 0.06-0.15 inches, more preferably about 0.110-0.135 inches, and most preferably, a diameter of about 0.127 inches. In a preferred embodiment, plug or screw 280 preferably has an outer diameter of about 0.370-0.374 inches, more preferably a diameter of about 0.372 inches.

FIG. 50 shows electrode shaft 272 that has end 274 and tip 273. End 274 is sized and shaped to fit into opening 262 of electrode head 260. FIG. 51 shows a close up of tip 273. Electrode shaft 272 is preferably a 304 Stainless Steel Rod, Full Hard UNS S30400. Shaft 272 can have a length of about 2.5-2.75 inches, more preferably about 2.52-2.62 inches, and most preferably, about 2.544 inches. In a preferred embodiment, tip 273 has angled or tapered edges 275 and has a generally rounded triangular shape (FIG. 51), which is sized and shaped to fit into cup 432 of electrode adjustment screw. In a preferred embodiment, tip is designed with about a 25 degree angle, which allows tip 273 to fit through seal 233 without damaging seal plus withstand force under load. In a preferred embodiment, tip 273 preferably has a length of about 0.09-0.11 inches, more preferably about 0.092-0.100 inches, and most preferably, a length of about 0.094 inches. In a preferred embodiment, shaft 272 preferably has a diameter of about 0.123-0.125 inches, more preferably about 0.1235-0.1245 inches, and most preferably, a diameter of about 0.124 inches.

Figure 52:
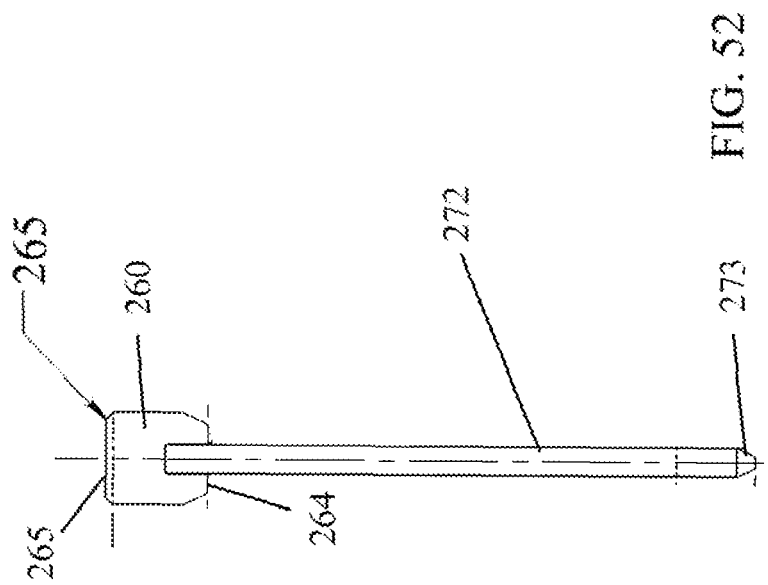
FIG. 52 shows an alternative embodiment of the electrode head and shaft of the present invention.

FIG. 52 shows electrode shaft 272 assembled with head 260 with an angle of preferably about 90 degrees between shaft 272 and head 260. FIG. 52 shows shaft end 274 within opening 262 of head 260. A preferred method of assembly of shaft 272 with head 260 includes 1) a fixture or spot welding to maintain, preferably a 90 degree/perpendicular orientation of shaft 272 to head 260 preferably within a +/−1° tolerance, 3) applying a filler metal, preferably a silver based filler metal, more preferably, Silvaloy 560 brazing alloy to shaft end 274 (a preferred method of assembly could include any alloy or conductive adhesive), 4) furnace brazing the alloy, 5) cleaning up any alloy migration, and 6) coating head 260 and shaft 272, wherein the coating is preferably alcadyne flourinox coating and is preferably 10 μm thick, and 7) letting the coating dry for about 24 hours. The alcadyne coating can be thicker than 10 μm and can range from about 10-50 μm.

FIGS. 53-55 show various views of a collar, designated generally by the numeral 300. Collar 300 can be 316 stainless steel. Collar 300 has several openings or bores including main bore 302 (which is sized and shaped to accommodate shaft 272 or 1272), first lateral bore 301 (which is sized and shaped to accept a set screw to hold collar 300 to shaft 272 or 1272; set screw is preferably an M2 set screw 1300, shown, for example, in FIG. 105), second lateral bore 303 (which is sized and shaped to accommodate and fit the electrode wire) and interior bore 304 (which is sized and shaped to accept a set screw used to hold the electrode wire; said set screw is preferably an M1.5 set screw). Collar 300 can have a diameter of about 0.400-0.550 inches, more preferably about 0.450-0.525 inches, and most preferably, about 0.505 inches. Central opening or bore 302 has a diameter of about 0.125-0.150 inches, more preferably about 0.125-0.131 inches, and most preferably, a diameter of about 0.128 inches. Central bore 302 can be sized and shaped to accommodate and fit electrode shaft 272 correctly with a minimal gap. First lateral bore 301 is sized and shaped to accommodate a set screw 1300 to hold electrode shaft 272 in place. Shaft 272 can be adjusted to protrude into the flow path at the proper length, and the set screw holds the shaft 272 in place. Second lateral bore 303 is sized and shaped to accommodate electrode wire. Interior bore 304 is sized and shaped to allow for a set screw 1350 (shown in FIG. 105, for example) to hold the electrode wire in place. As shown in FIG. 54, space 305 allows for an area for electrode wire to reside in without getting nicked or pinched. FIG. 55 shows the groove and hole for electrode wire. FIG. 55 shows the creation of bore 303.

FIGS. 56-58 show various views of a preferred embodiment of the UHP, designated generally by the numeral 290. Shield 290 can be fashioned from a 304 stainless steel bar. In a preferred embodiment, shield 290 can be about 0.800-1.500 inches long, more preferably about 1.00-1.500 inches long, and most preferably about 1.125 inches long. In a preferred embodiment, shield 290 has head 291 and end 292 with central opening 295 preferably extending from head 291 to end 292. In a preferred embodiment, head 291 and end 292 can each have a chamfer. In a preferred embodiment on the present invention, each chamfer is preferably about $\frac{1}{32}$". In a preferred embodiment, shield 290 has first lateral opening or bore 293 that is generally perpendicular to central opening 295 and extends through opening 295. In a preferred embodiment, shield 290 has second lateral opening or bore 294. Lateral bore 293 is preferably sized and shaped to accommodate and fit a screwdriver tip. In a preferred embodiment, screwdriver end is placed in hole 293 to engage the set screw on collar 300 and hold the electrode wire/shaft. Hole 293 is sized and shaped to accommodate an Allen wrench to tighten the M2 set screw into collar 300. Bore 294 is the hole through which the shielded electrode wire passes, then goes into collar 300, then a set screw is tightened onto the wire from a screwdriver engaged from opening 295. Lateral bore 293 preferably as a diameter of about 0.07-0.150 inches, more preferably of about 0.08-0.12 inches, and most preferably of about 0.08 inches. Lateral opening 293 is sized and shaped to accommodate a set screw and is also sized and shaped to accommodate the electrode wire. Lateral bore 293 can be located most preferably about 0.716 inches from end 292. Lateral location of opening 293 aligns with collar 300 that is pressed to close the gap against isolating disk 1200.

FIGS. 59-65 show various views of the components of an unassembled electrode adjustment screw 400. Electrode adjustment screw 400 includes screw 410, insulator 420, and cup 430. Screw 410 is preferably threaded on the outside. Screw 410 has receptacle or opening 412 that can be sized and shaped to accommodate and fit insulator 420. Screw 410 has head 413 and end 414. Head 413 has a chamfer, more preferably a $\frac{1}{32}$" chamfer, and end 414 also preferably has a chamfer, more preferably, a $\frac{1}{32}$" chamfer. In a preferred embodiment, screw 410 is preferably a ¾-16 UNF and preferably is 304 stainless steel bar (UNS30400). Screw 410 has a height of preferably about 0.4-1.25 inches, more preferably about 0.45-0.62 inches, and most preferably about 0.5 inches. Height of screw 410 helps to hold the force generated from the internal pressure on electrode shaft 272, 1272. In a preferred embodiment, the diameter of opening 412 is preferably clearance for 420 about 0.45 inches. In a preferred embodiment, end 414 of screw 410 has slot 415 that preferably extends substantially the entire diameter of screw 410. In a preferred embodiment, slot 415 is preferably about 0.06-0.15 inches wide, more preferably about 0.08-0.12 inches wide, and most preferably, about 0.1 inches wide. Insulator 420 preferably has opening or receptacle 422 that is preferably sized and shaped to accommodate cup 430. Insulator 420 can have end 424 that preferably has a chamfer of about $\frac{1}{32}$". In a preferred embodiment, insulator 420 is preferably made of non-conductive material to prevent grounding of electrode signal. Insulator 420 is preferably fashioned from a G10-FR4 Rod, but can also be fashioned from G11-FR5 or other suitable alternatives. Insulator 420 preferably has a diameter of about 0.40-0.55 inches, more preferably about 0.42-0.45 inches, and most preferably about 0.444 inches. Opening 422 preferably has a diameter of about 0.30-0.40 inches, more preferably of about 0.31-0.32 inches, and most preferably of about 0.319 inches. Insulator 420 has a height of about 0.191 inches. In a preferred embodiment, cup 430 preferably has opening or receptacle 432 that is preferably angled and generally conical in shape. In a preferred embodiment, opening 432 is preferably sized and shaped to accommodate tip 273 of electrode shaft 272. Cup 430 preferably has end 434 that can have a chamfer of about $\frac{1}{32}$". Cup 430 preferably has a diameter of about 0.25-0.32 inches, more preferably of about 0.30-0.32 inches, and most preferably about 0.319 inches. Cup 430 preferably has a height or thickness of about 0.14-0.20 inches, more preferably of about 0.145-0.16 inches, and most preferably about 0.150 inches. A preferred method of assembly of electrode adjustment screw 400 includes 1) placing 1 dot of adhesive in receptacle 422, 2) inserting cup 430 into receptacle 422 of insulator 420, 3) placing 1 dot of adhesive in receptacle 412, 4) inserting insulator 420 (which has cup 430 inserted into receptacle 422) into receptacle 412. A preferred adhesive used in a preferred method of assembly of electrode adjustment screw 400 is 3M Scotch Weld Adhesive CA8 Clear (or other suitable equivalent).

Figure 67:
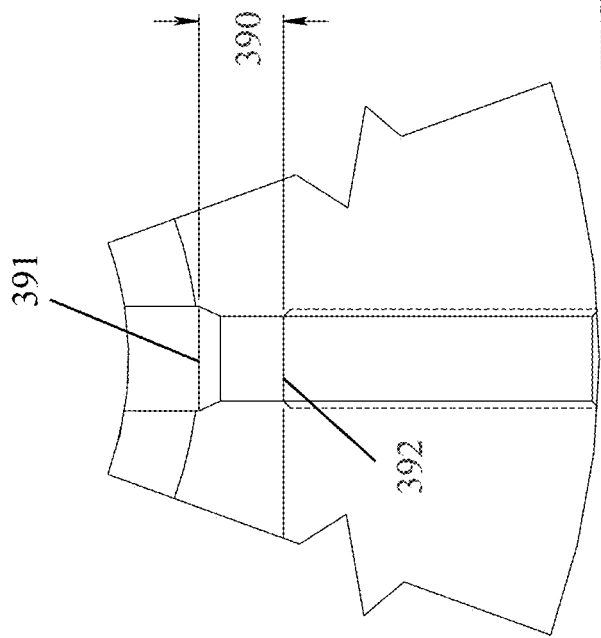
FIGS. 66 and 67 show various views of alternative embodiments of electrode receptacle thruholes in flow tube, and creation thereof, of the present invention.
Figure 66:
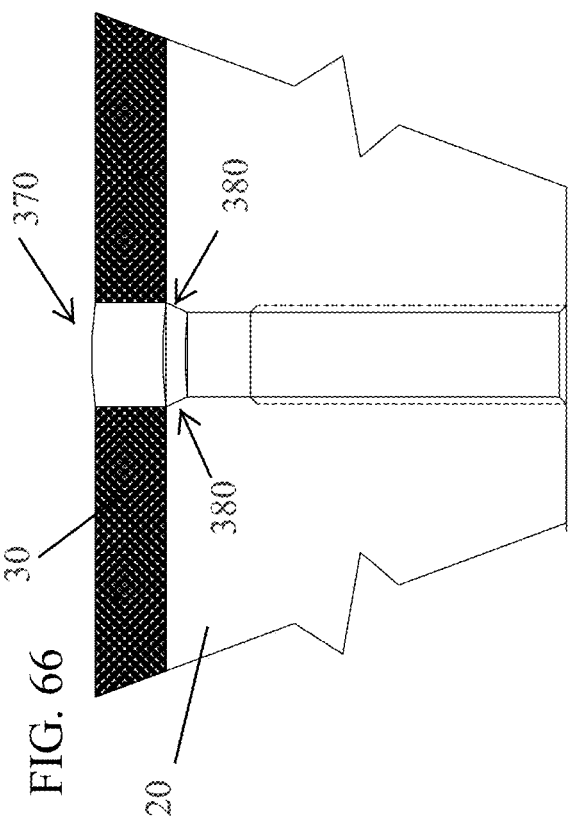

FIGS. 66 and 67 show various views electrode receptacle thruholes 370 of flow tube 20 so that holes 370 can be sized and shaped to accommodate for alternative embodiment of electrode 250. Holes 370 can have taper 380. A preferred method of modifying the spool or flow tube 20 to accommodate for electrode 250 includes 1) enlarging hole 370 in the ceramic liner 30, preferably to about a 0.463 inch hole, 2) adding a taper on each side to intersect tapped hole in tube 20, preferably about a 25 degree taper on each side, 3) boring threads out, preferably to a diameter of about 0.372 inches, and then reaming preferably to a diameter of about 0.375 inches, 4) polishing the seal zone 390, preferably to about 16 micro inches, and 5) tapping 7/16-20 UNF 3B, preferably to about a 1.3 inch depth. In a preferred embodiment of the present invention, seal zone 390 has a depth defined by top border 391 and bottom border 392, wherein top border 391 preferably abuts liner 30. In a preferred embodiment, the partial depth of a thruhole 370 measured from the interior of tube 20 to bottom border 392 of seal zone 390 is preferably about 0.60-0.72 inches, more preferably about 0.66-0.70 inches, and most preferably about, 0.685 inches.

Figure 70:
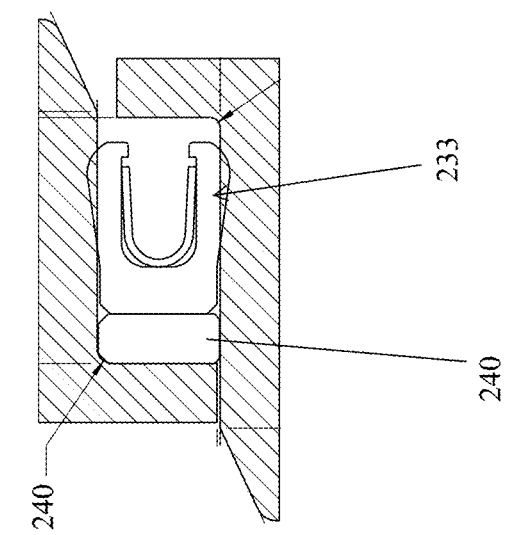
FIGS. 68-70 show various views of a preferred embodiment of the seal of the electrode of the present invention.
Figure 68:
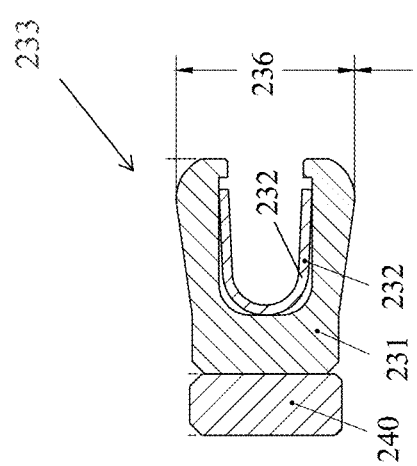
Figure 69:
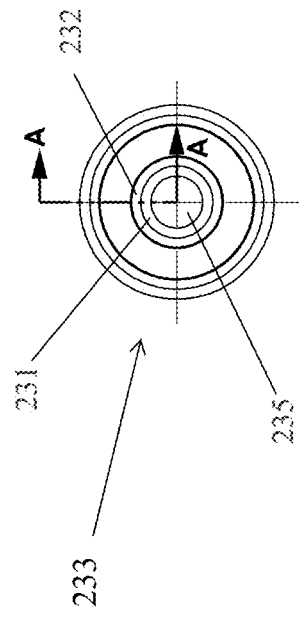

FIGS. 68-70 show various views of seal 233 and back up ring 240. In a preferred embodiment, seal 233 can include jacket 231 and spring 232. In a preferred embodiment, back up ring 240 is preferably generally round in shape, and is preferably fashioned from 300 series stainless steel. Jacket 231 can be generally round in shape, but when viewed in a partial cross-section, as seen in FIG. 68, for example, is generally U-shaped. In a preferred embodiment, spring 232 mimics the cross-sectional U-shape of jacket 231 and is preferably located concentrically within jacket 231. Jacket 231 can be fluoroloy A21, and spring 232 is preferably cobalt-nickel alloy. Seal 233 has central bore 235 that is sized and shaped to fit and accommodate electrode shaft 272. Seal 233 is preferably a pressure energized seal. In a preferred embodiment, the height of seal 233 is preferably about 0.175 inches. In a preferred embodiment, the length 236 in FIG. 68 is preferably about 0.145 inches.

Figure 71:
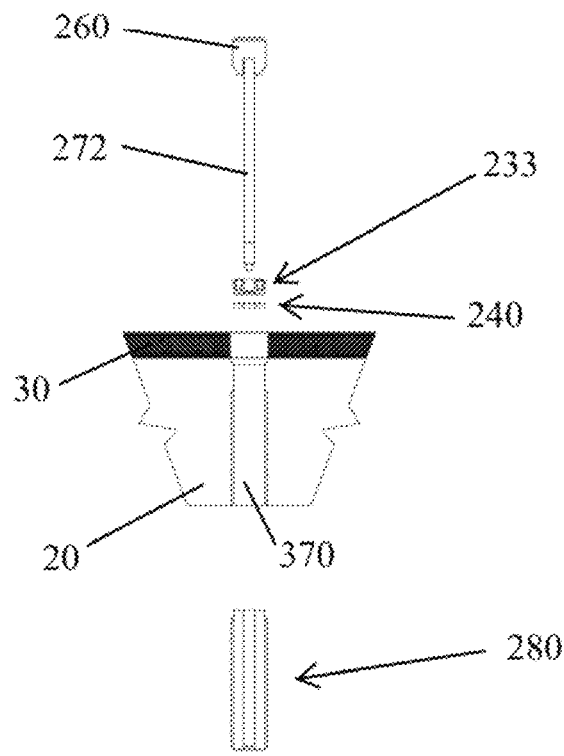
FIGS. 71-77 show an alternative embodiment of the method of assembly of an alternative embodiment of the electrode of the present invention.
Figure 72:
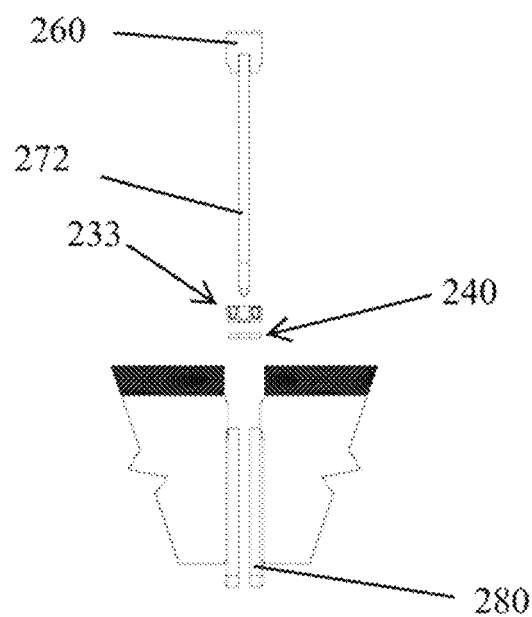
Figure 73:
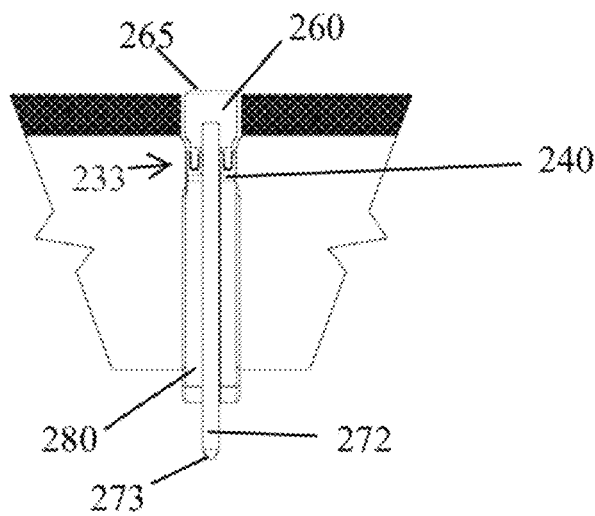
Figure 74:
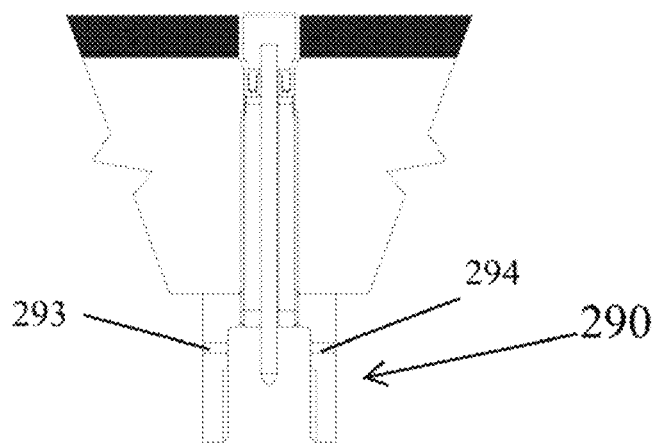
Figure 75:
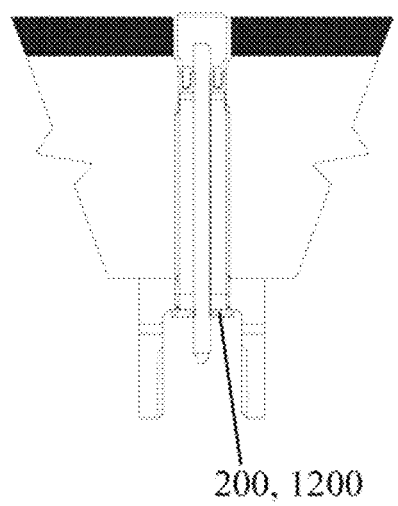
Figure 76:
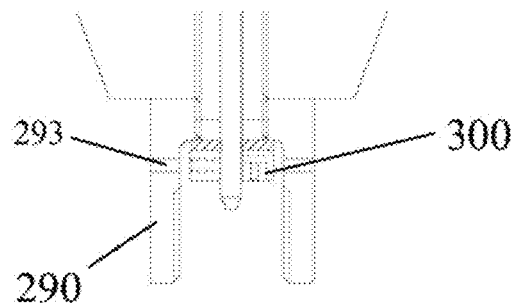
Figure 77:
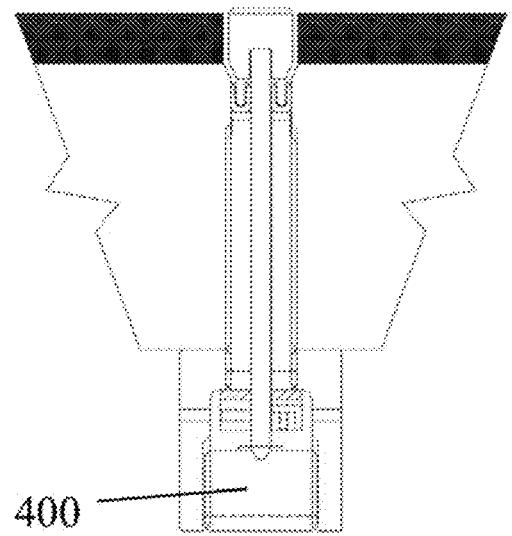

FIGS. 71-77 show a method of assembly and installation of electrode 250 into thruhole 370 in tube 20. This method can also be used to install electrode 1250 into tube 520, but the preferred method of installation of electrode 1250 into tube 520 is shown in FIGS. 83-92 and then in FIGS. 74-77 to install the shield, collar, electrode wire, and adjustment screw. FIG. 71 shows various components of the unassembled electrode before assembly begins (noting that preferably, electrode head 260 and shaft 272 have already been assembled). A preferred method of assembly of electrode 250 includes 1) threading backup screw 280 into electrode hole 370 from the exterior of tube 20 (as shown in FIG. 72), 2) placing seal 233 on electrode shaft 272, 3) placing backup ring 240 on shaft 272, 4) inserting the head-shaft-seal-backup ring conglomerate into thruhole 370 that has backup screw 280 in it (as shown in FIG. 73), 5) screwing shield 290 onto backup plug 280 and torqueing to a preferable lb. ft. (as shown in FIG. 74), 6) pressing insulating/insulator disk onto shaft 272 (as shown in FIG. 75), 7) placing collar 300 on shaft 272 (FIG. 76) and setting screw to hold shaft 272 in place and placing electrode wire in bore 303 and setting the screw to keep wire in place, and 8) installing electrode adjustment screw 400 (as shown in FIG. 77). In a preferred embodiment, the height of electrode head 260 can be adjusted for optimal spacing of electrode head to the back face of the seal which can effect meter performance.

Figure 82:
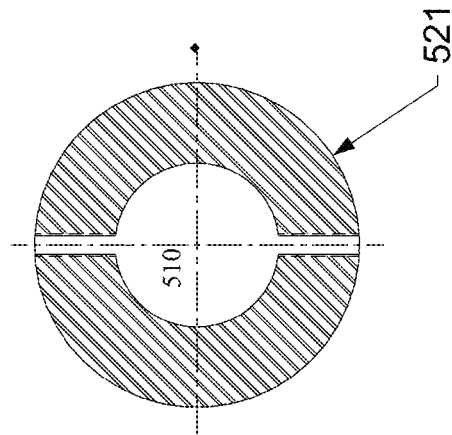
FIGS. 81 and 82 show various views of a preferred embodiment of the tube of the present invention.
Figure 81:
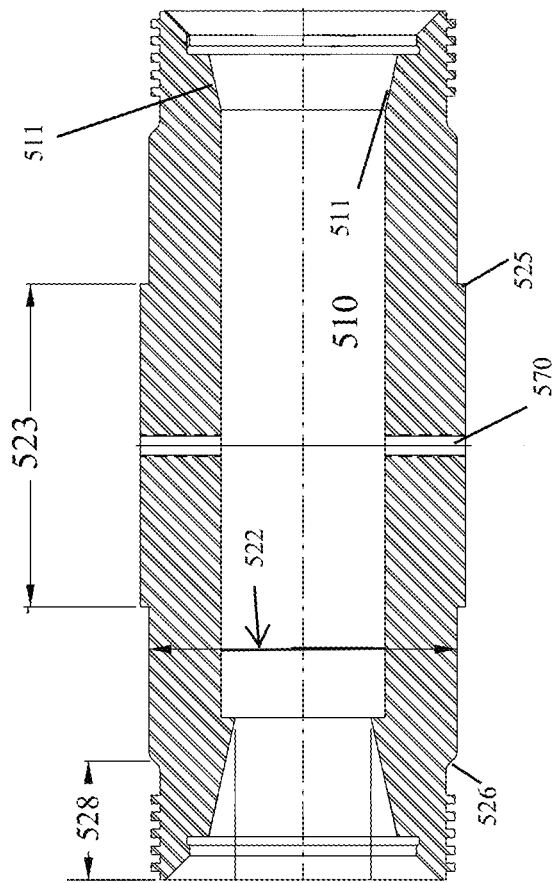
Figure 83:
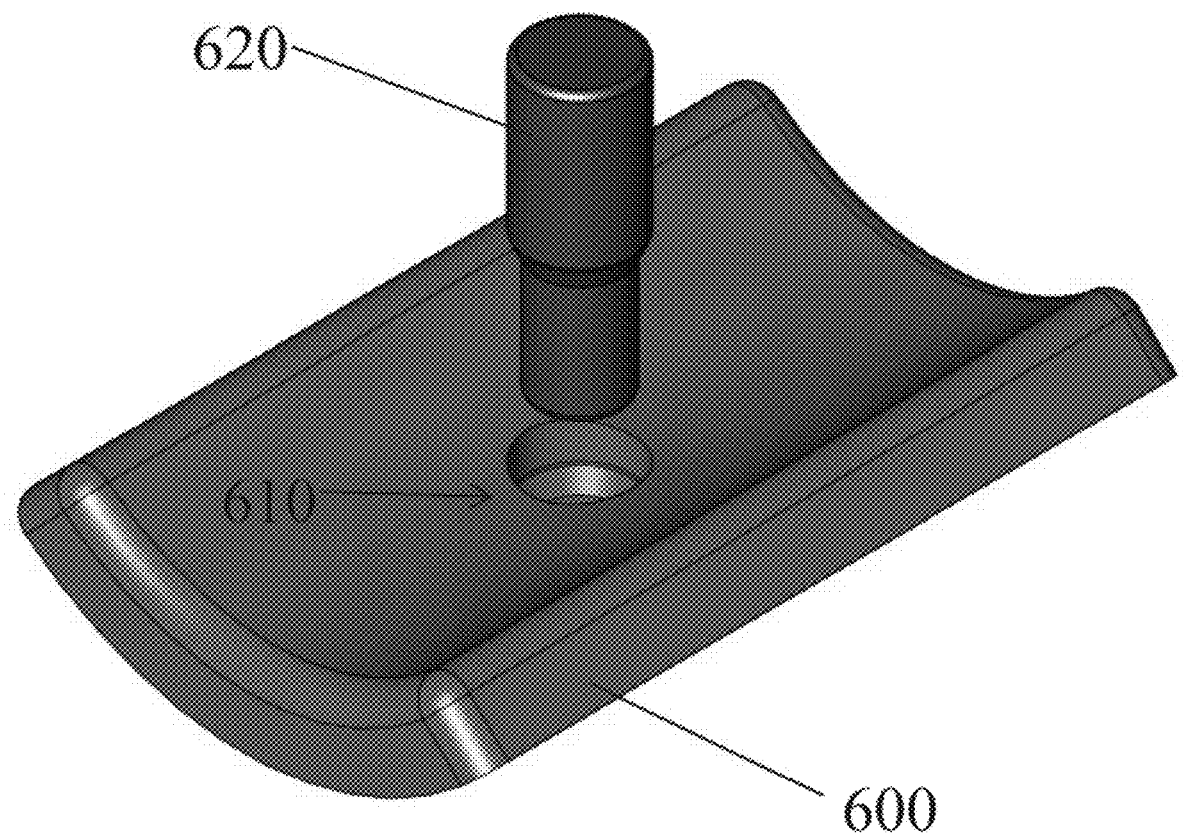
FIGS. 83-92 show a preferred method of installation of an electrode into the lined tube of the present invention.
Figure 84:
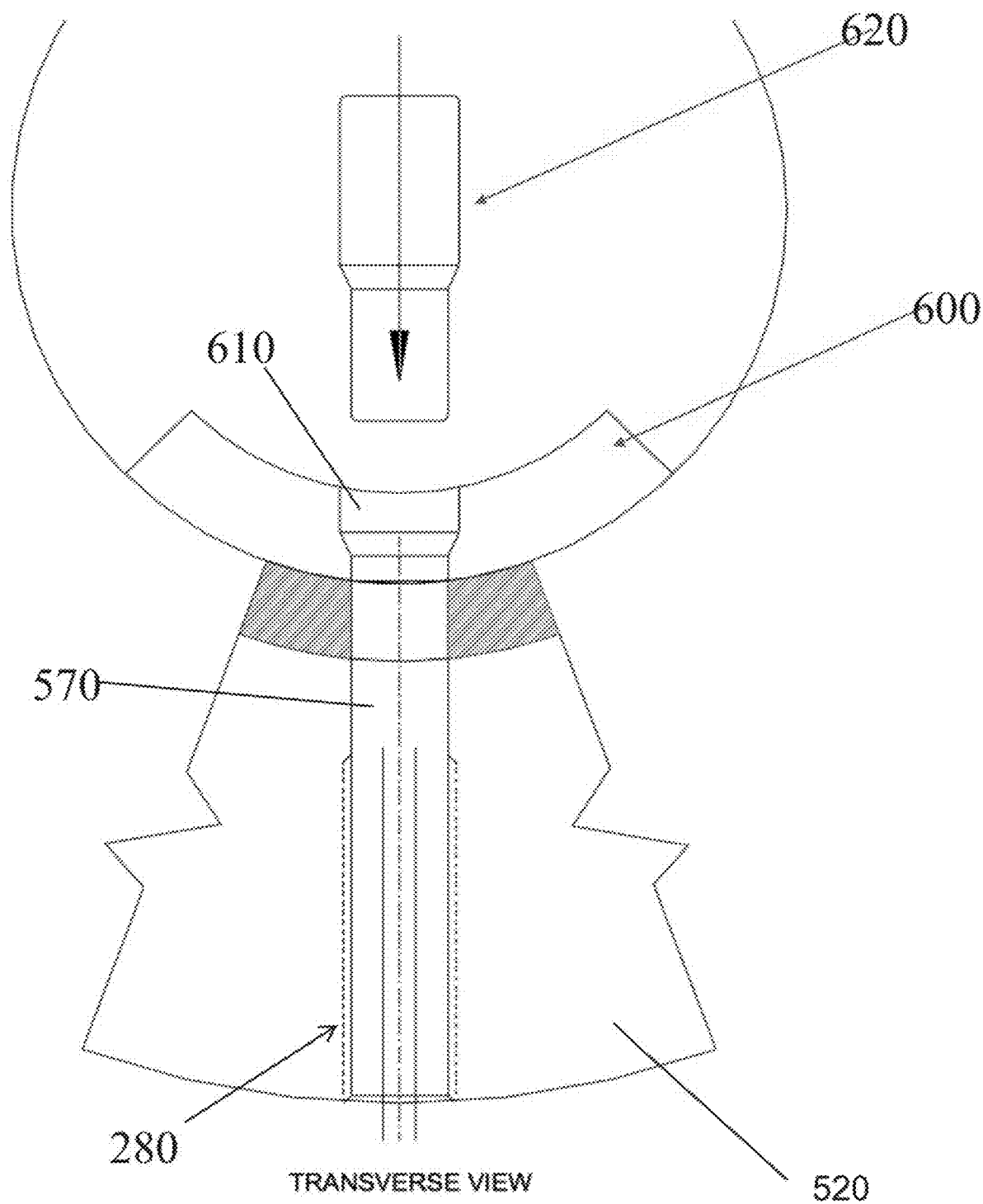
Figure 85:
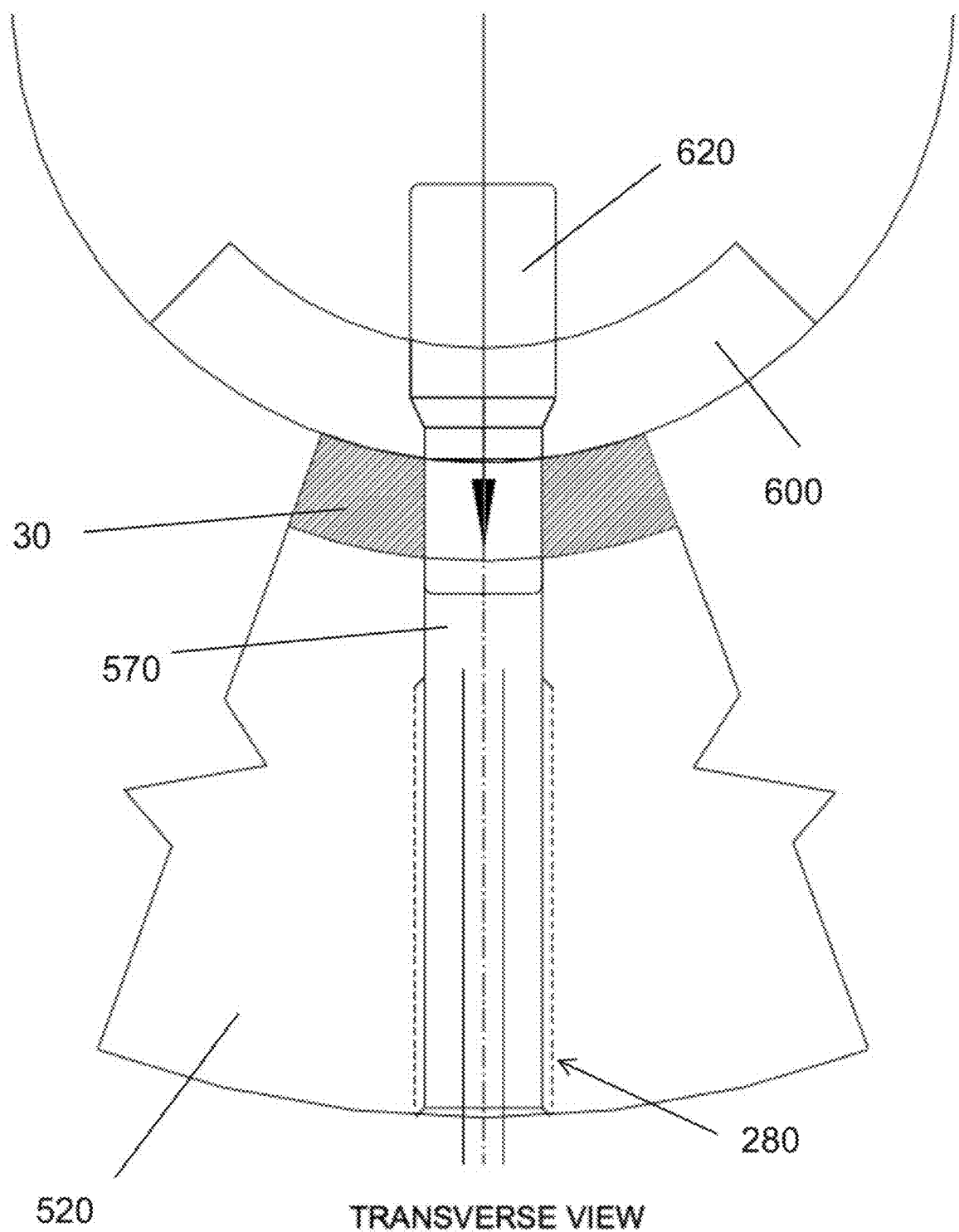

FIGS. 78-82 show various views of a preferred alternative embodiment of the flow tube/pipe 520 (shown unlined in FIGS. 81 and 82 and lined in FIGS. 78 and 80). In a preferred embodiment, tube 520 is preferably fashioned from Nitronic 50, more specifically, Nitronic 50 Anneal 1950 bar. In a preferred embodiment of the present invention, tube 520 has a length of preferably about 12-24 inches, more preferably about 17-21 inches, and most preferably about 19 inches.

FIGS. 78 and 80 show a preferred embodiment of flow tube 520 lined with liner 30. Liner 30 can be made of Izory® or magnesia partially stabilized zirconia (Mg-PSZ) and can be a single piece of partially stabilized magnesium zirconia ceramic, preferably mechanically affixed to tube 520 via heat shrink (no adhesives). A preferred method of lining flow tube 520 with liner 30 can include the following: lining includes a shrink fit that involves a tight tolerance on the inner diameter of tube 520 and outer diameter of liner 30. Tube 520 is heated, preferably to a temperature of around 700° F., preferably for several hours until the piece is fully and evenly heated. The piece is removed from the oven and liner 30 is dropped into tube 520. As the metal cools, it contracts around the ceramic, compressing it and increasing its strength.

In a preferred embodiment of the present invention tube 520 preferably has 3 different outer diameters. The outer surface of tube 520 preferably has transition areas or shoulders 525 and 526. First outer diameter 521 is preferably located in the middle portion of tube 520. In a preferred embodiment, first outer diameter 521 is preferably about 7.2 inches. Transition areas 525 are where first outer diameter 521 meets second outer diameter 522 and preferably define the length 523 of first diameter 521. Length 523 of first diameter 521 is preferably about 4-12 inches, more preferably about 5-9 inches, and most preferably about 7.125 inches. Second outer diameter 522 is preferably smaller than first diameter 521. In a preferred embodiment, second outer diameter 522 is preferably about 6.80 inches. Length 524 of second diameter 522 is preferably defined by shoulders 525 and transition areas or shoulders 526. In a preferred embodiment, length 524 is preferably about 3.4 inches. Shoulders 526 are preferably angled, as shown in FIG. 78. In a preferred embodiment, shoulders 526 are preferably a 45 degree transition. Third outer diameter 527 of tube 520 is preferably smaller than second outer diameter 522. In a preferred embodiment, third outer diameter 527 is preferably about 6.1 inches. Length 528 of third diameter 527 is defined by transitions areas 526 to the ends 540 of tube 520. Length 528 is preferably about 2.6 inches.

Preferably, central bore 510 of tube 520 generally has the same inner diameter 512 throughout the majority of the length of tube 520. In a preferred embodiment, central bore 510 has sloping or angled transition areas 511, located close to the ends 540 of tube 520, which allow for the increase of inner diameter 512 from areas 511 to ends 540. Inner diameter 512 of tube 520 is about 3.6 inches. The length of inner diameter 512 having a diameter of about 3.6 inches is about 12 inches long and is centrally located in tube 520 (as shown in FIG. 78). When liner 30 is in central bore 510, the inner diameter of tube 520 is preferably about 3 inches (designated by numeral 513).

As shown in FIGS. 78 and 80-82, each end of tube 520 preferably has threaded connection 535, which preferably has threads on the exterior of tube 520 and is preferably a 4" FIG. 1502 end connection thread specification.

FIG. 79 shows a close-up view of electrode thruhole 570 which extends through tube 520 and liner 30 into main bore 510. FIG. 78 shows the placement of thruholes 570, which are located about in the middle (lengthwise) of tube 520. In a preferred embodiment, each thruhole 570 has a diameter of about 0.1-1 inch, more preferably about 0.15-0.5 inches, and most preferably, about 0.375 inches. In a preferred embodiment, each thruhole 570 has a length of about 1-8 inches, more preferably about 1-5 inches, and most preferably, about 2.1 inches. Each thruhole 570 is sized and shaped to accommodate and fit plug 280, more preferably, sized and shaped to accommodate and fit 7/16-20 UNF 3B.

Figure 86:
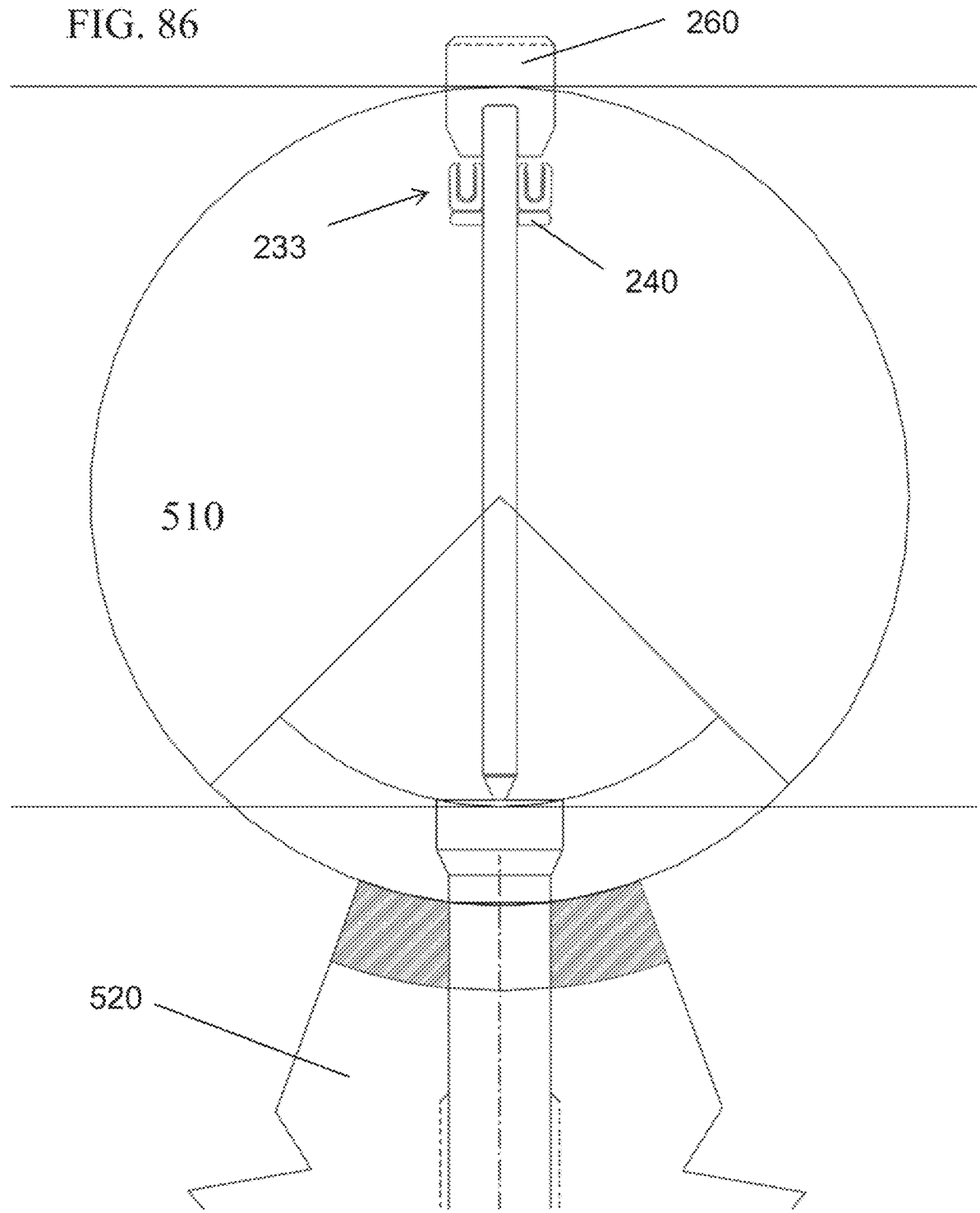
Figure 87:
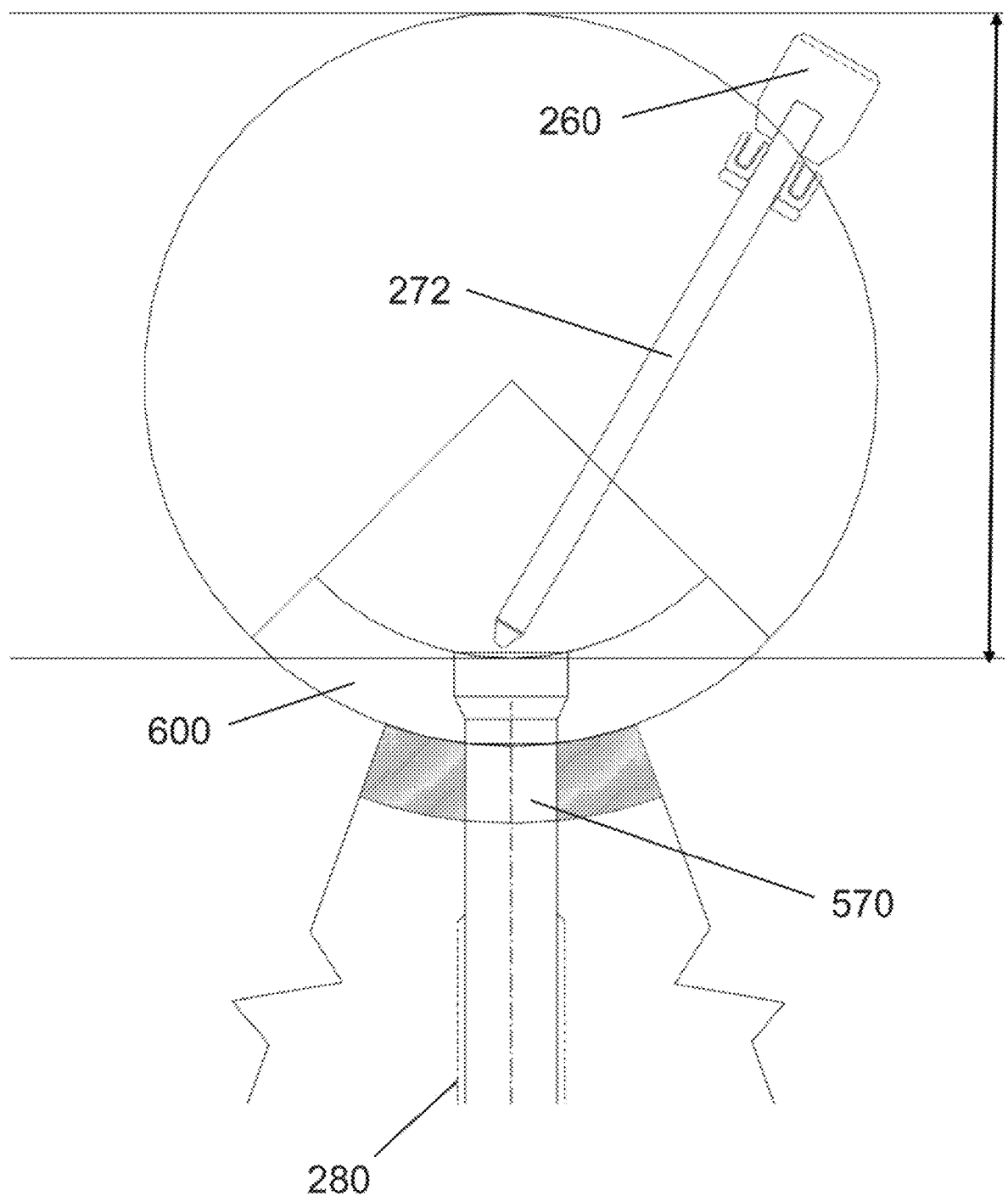
Figure 88:
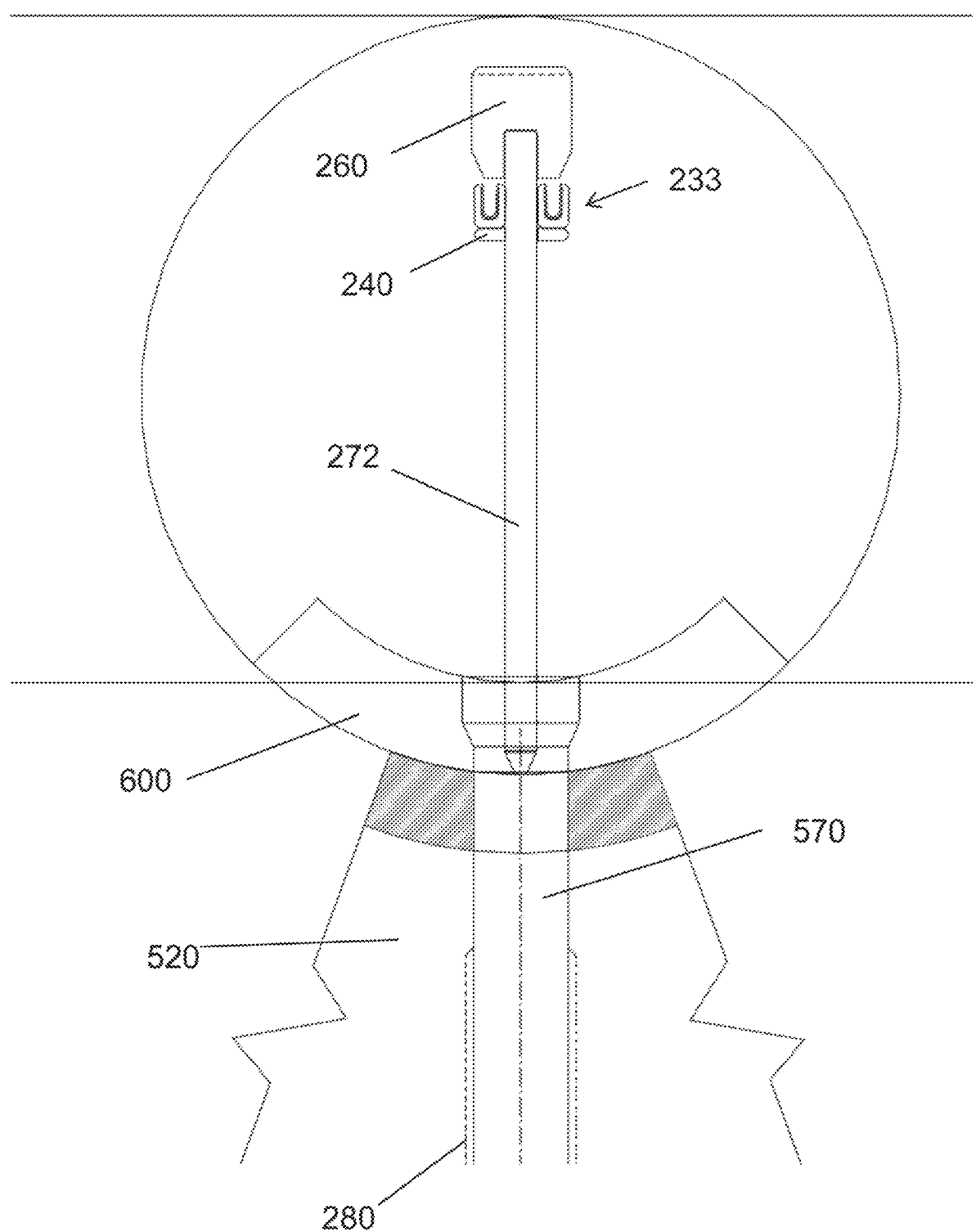
Figure 89:
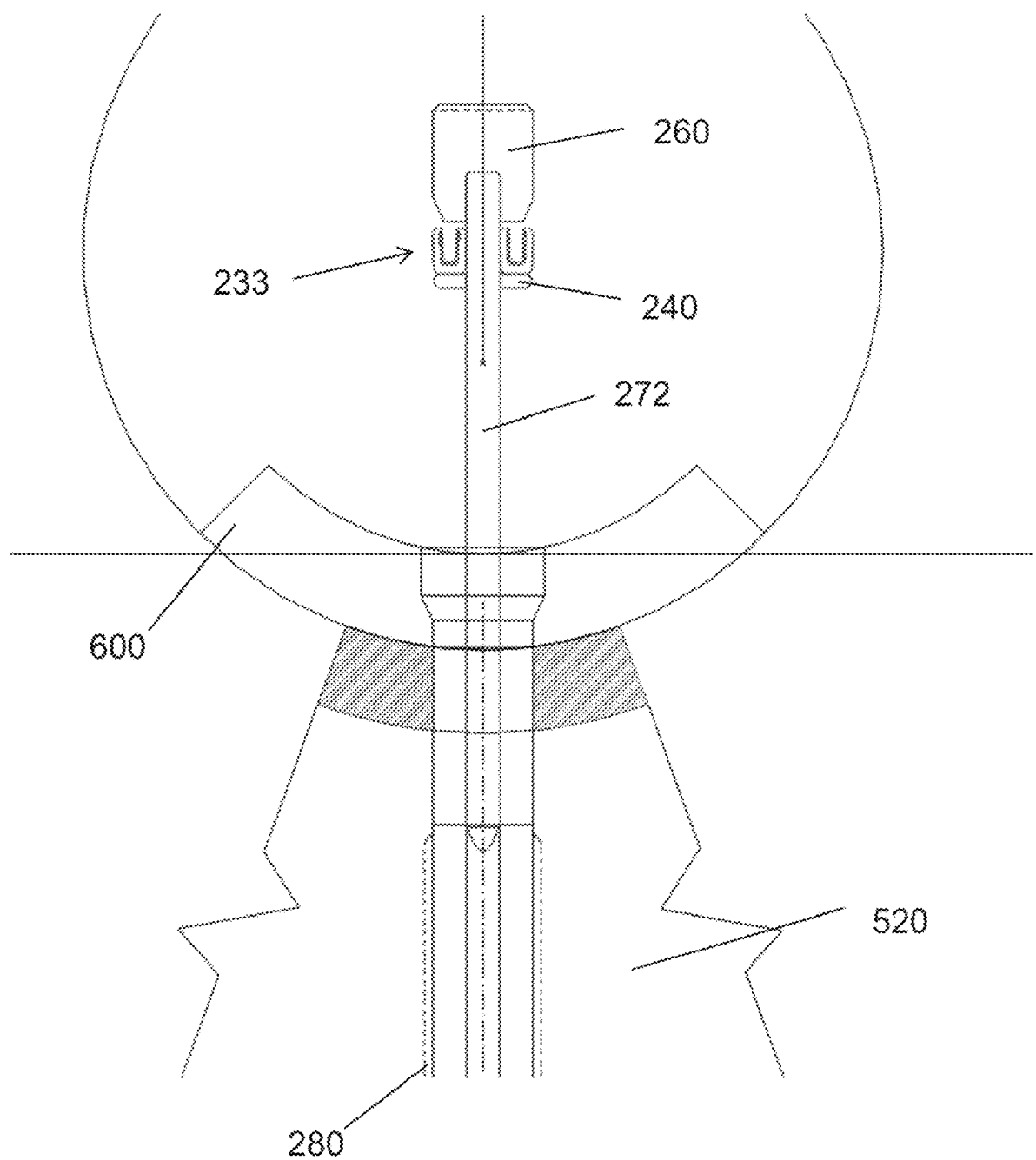
Figure 90:
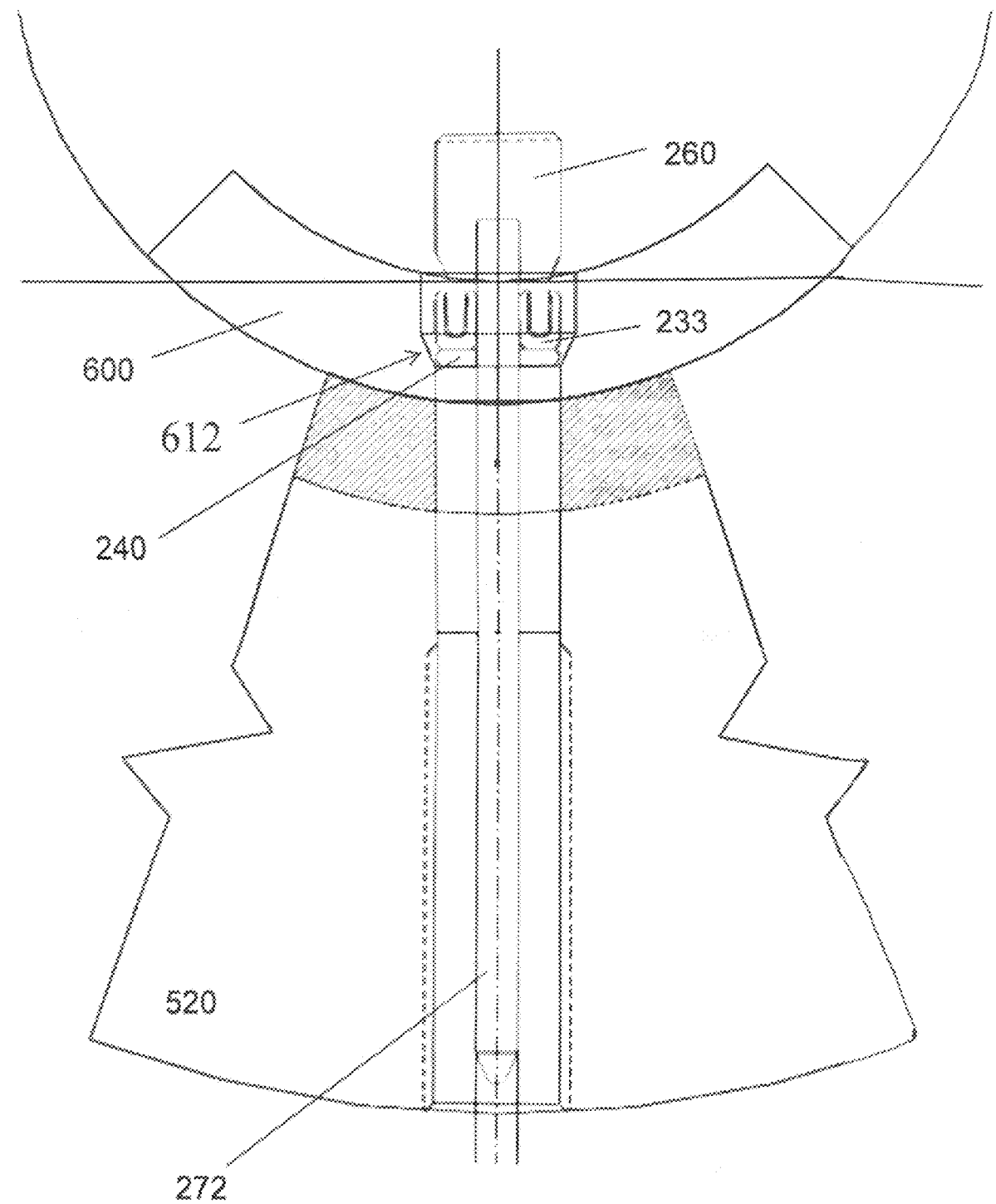
Figure 91:
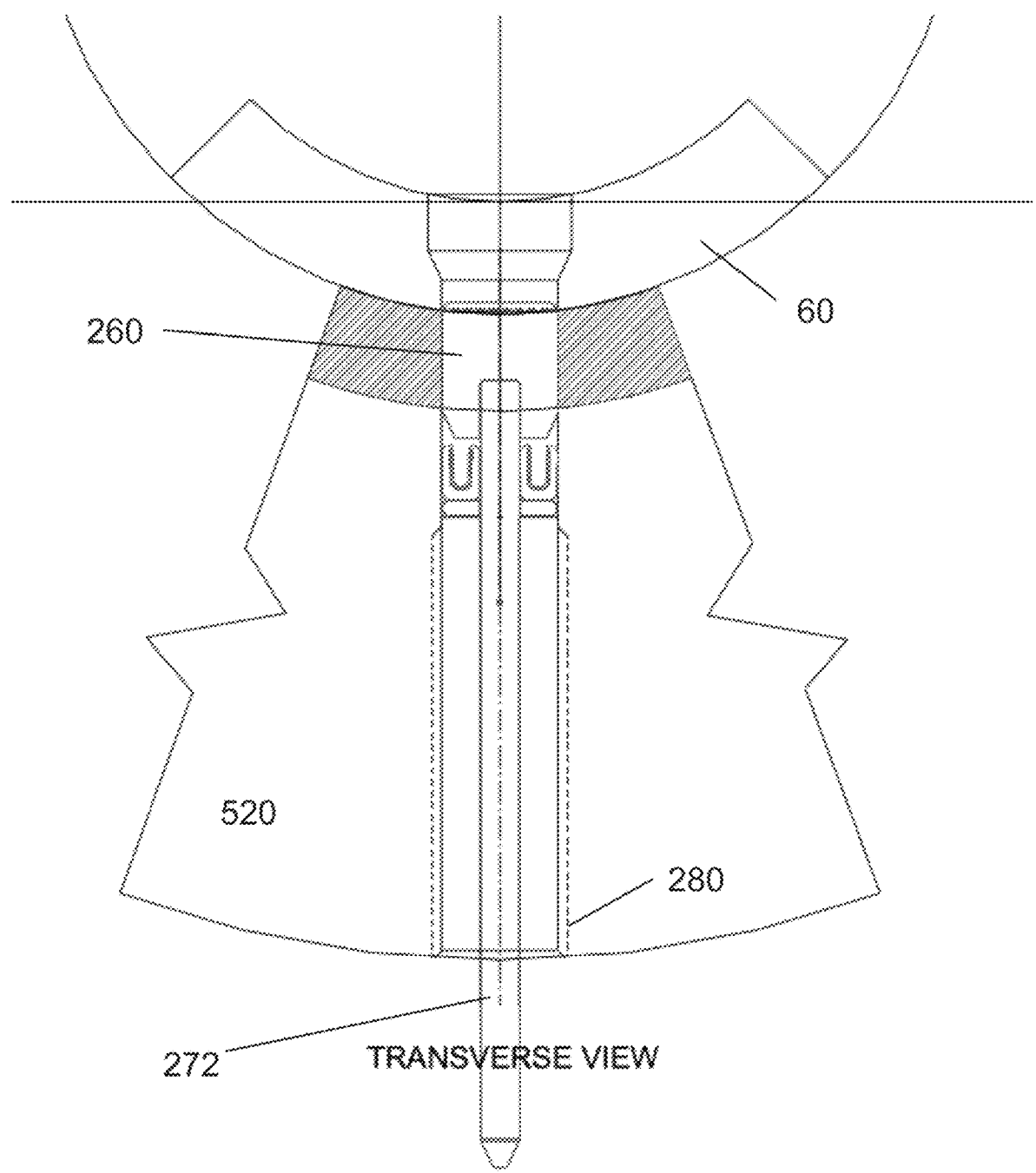
Figure 92:
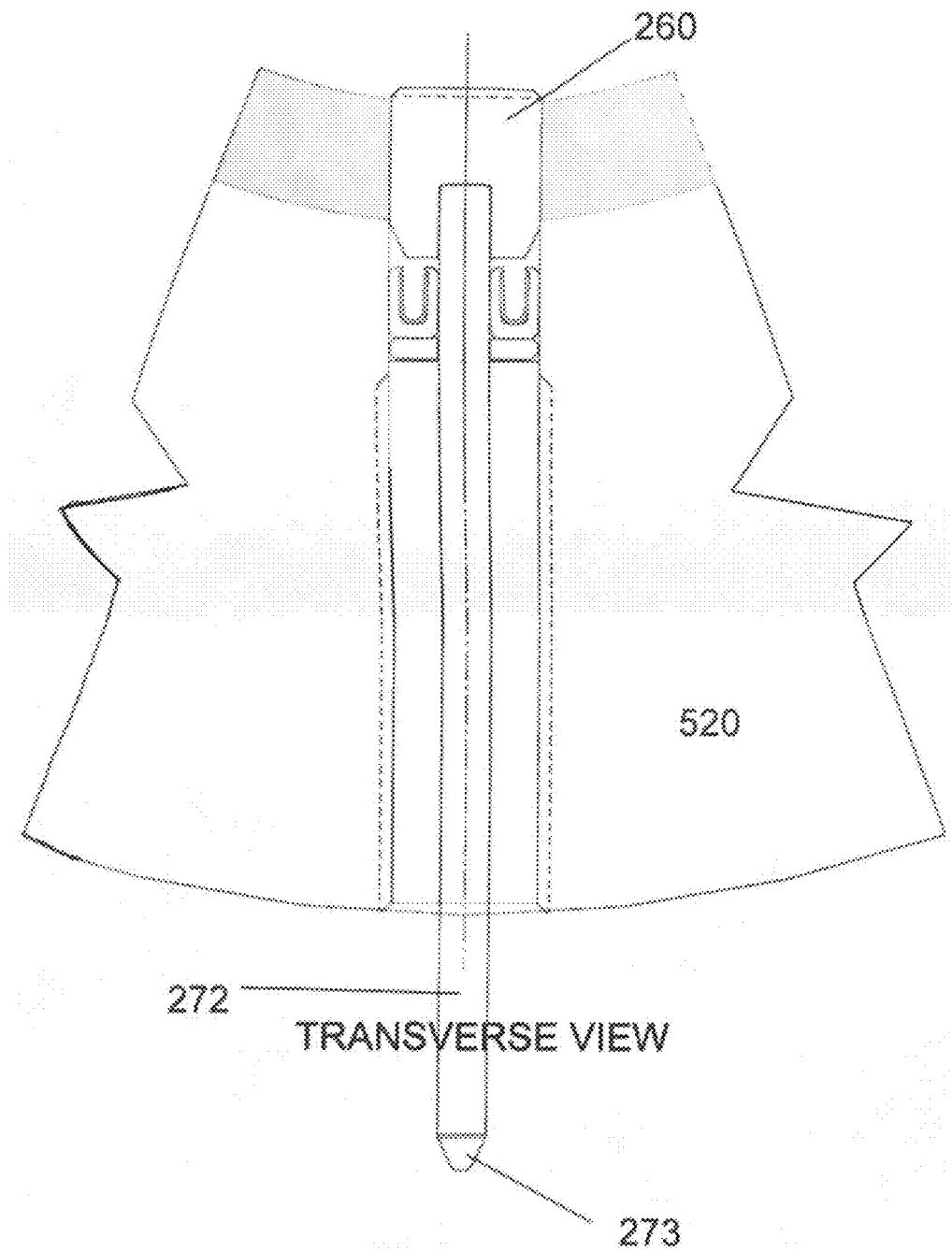

FIGS. 83-92 illustrate a preferred method of installing electrode 250 into tube 520. This preferred method of installation of electrode 250 includes the use of electrode insertion tool 600 and insertion tool alignment plug 620, shown in FIG. 83. This preferred method of installation of electrode 250 with tools 600 and 620 ensures proper/undamaged seating of pressure energized seal 233. The use of tool 600 and plug 620 provide the necessary diameter and taper for the seal 233 to be inserted into thruhole 570. This preferred method of installation of electrode 520 into thruhole 570 includes: placing electrode insertion tool 600 into central bore 510 of lined tube 520 (shown in FIG. 84). Tool 600 requires alignment with electrode hole 570. Insertion tool alignment plug 620 is inserted through opening 610 of tool 600, thereby aligning with electrode hole 570 (shown in FIG. 85). Insertion tool 600 is then clamped in place, and tool alignment plug 620 is removed. FIG. 86 shows an overlay, for comparison purposes, of the length of electrode head 260 assembled with shaft 272 compared to the diameter of central bore 510, showing how electrode has to be titled in order to place tip 273 of shaft 272 into insertion tool 600. FIG. 87 shows the tilting of electrode in bore 510 to allow for insertion. FIG. 88 shows tip 273 inserted in tool 600. FIG. 89 shows shaft 272 engaging with backup plug 280. FIG. 90 shows the progression of electrode installation, specifically the seal 233 and backup ring 240 engaging with the tapered section 612 of the opening 610 of tool 600. FIG. 91 shows electrode head and shaft in position in hole 570. FIG. 92 shows the removal of tool 600. Bottom 265 of head 260 slightly extends into bore 510. The installation process shown in FIGS. 74-77 occurs after removal of tool 600 (FIG. 92).

FIGS. 93-105 show various views of an alternative embodiment of electrode, designated generally by the numeral 1250, and its associated components. Electrode 1250 can be installed into tube 20 using the installation method in FIGS. 71-77, but is more preferably installed into tube 520 using the method in FIGS. 83-92.

Figure 93:
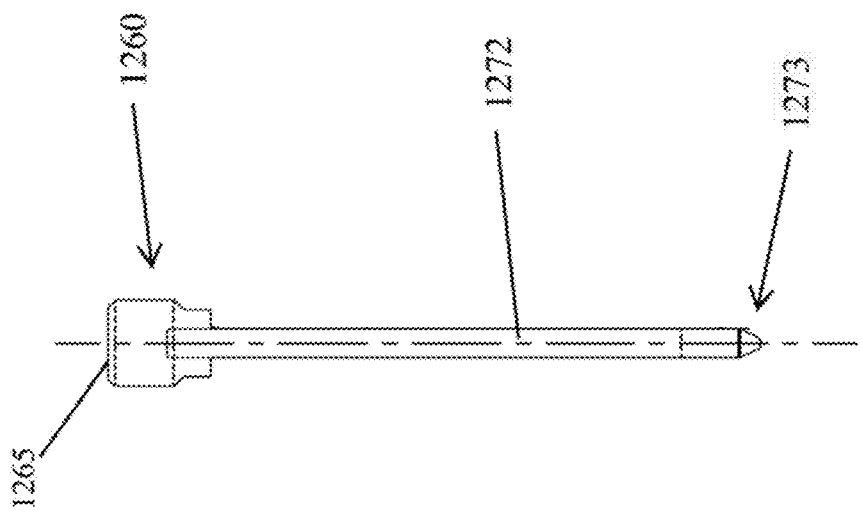

FIG. 93 shows a preferred embodiment of electrode shaft 1272 assembled with head 1260 with an angle of preferably about 90 degrees between shaft 1272 and head 1260. FIG. 93 shows shaft end 1274 within opening 1262 of head 1260. A preferred method of assembly of shaft 1272 with head 1260 includes 1) a fixture or spot welding to maintain, preferably a 90 degree/perpendicular orientation of shaft 1272 to head 1260 preferably within a +/−1° tolerance, 3) applying a filler metal, preferably a silver based filler metal, more preferably, Silvaloy 560 brazing alloy to shaft end 274 (a preferred method of assembly could include any alloy or conductive adhesive), 4) furnace brazing the alloy, 5) cleaning up any alloy migration, and 6) coating head 260 and shaft 272, wherein the coating is preferably alcadyne flourinox coating and is preferably 10 μm thick, and 7) letting the coating dry for about 24 hours. The alcadyne coating can be thicker than 10 μm and can range from about 10-50 μm.

FIGS. 94-96 shows various views of a preferred embodiment of electrode head 1260. In a preferred embodiment, electrode head 1260 is industrial grade tungsten carbide K10 (or different designation) with a nominal 10% cobalt binder. Electrode head 1260 is preferably ultrasonically cleaned after manufacture. FIGS. 94-96 show opening 1262 in electrode head 1260. Opening 1262 is sized and shaped to accommodate and fit the diameter of electrode shaft 1272 and a part of the length of shaft 1272. In a preferred embodiment of the present invention, opening 1262 is located at one end (tip/top 1264) of head 1260 with a chamfer located at the opposing end (tip/bottom 1265) of head 1260. The chamfer at tip 1265 of head 1260 is preferably about 0.04 inches. In a preferred embodiment, electrode head 1260 is generally cylindrically shaped, but has slight angled portions 1261 closer to end 1264 that create segment 1267 of head 1260. In a preferred embodiment, electrode head 1260 is preferably about 0.2-0.5 inches long, more preferably about 0.037-0.048 inches long, and most preferably, about 0.439 inches long. In a preferred embodiment of the present invention, the length of opening 1262 is about half the length of head 1260. In a preferred embodiment of the present invention, the angle of each angled portion 1261 is about 45° sloping inward toward segment 1267. In a preferred embodiment of the present invention, the diameter of head 1260 can be about 0.373 inches. In a preferred embodiment of the present invention, the diameter of opening 1262 can be about 0.126 inches. In a preferred embodiment of the present invention, the diameter of segment 1267 can be about 0.295 inches.

Figures 97, 98:
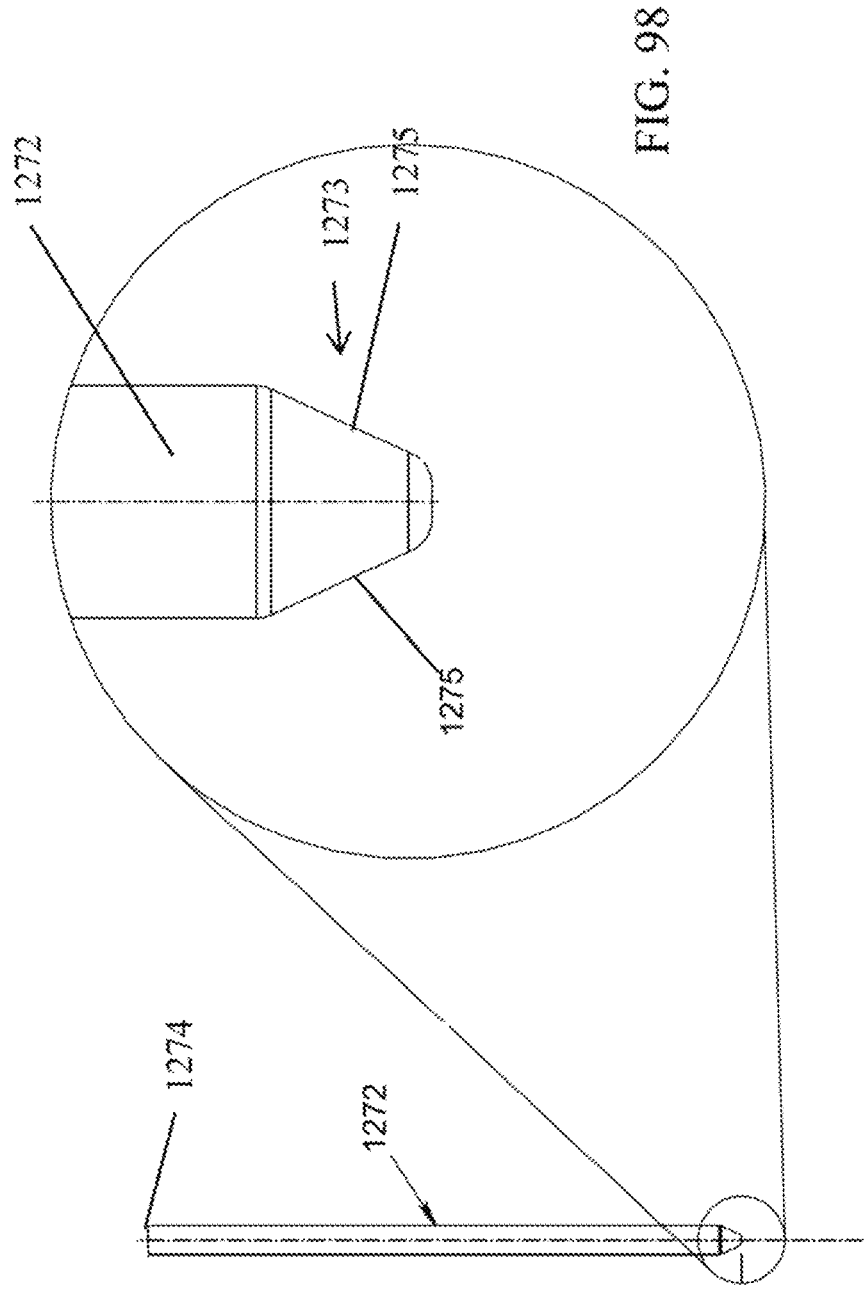

FIG. 97 shows a preferred embodiment of electrode shaft 1272 that has end 1274 and tip 1273. End 1274 is sized and shaped to fit into opening 1262 of electrode head 1260. FIG. 98 shows a close up of tip 1273. Electrode shaft 1272 is preferably a 304 Stainless Steel Rod, Full Hard UNS S30400. In a preferred embodiment, shaft 1272 preferably has a length of about 2.5-2.75 inches, more preferably about 2.52-2.62 inches, and most preferably, about 2.544 inches. In a preferred embodiment, tip 1273 has angled or tapered edges 1275 and has a generally rounded triangular shape, as seen in detail in FIG. 98. In a preferred embodiment, tip 1273 preferably has a length of about 0.09-0.11 inches, more preferably about 0.092-0.100 inches, and most preferably, a length of about 0.094 inches. In a preferred embodiment, shaft 1272 preferably has a diameter of about 0.123-0.125 inches, more preferably about 0.1235-0.1245 inches, and most preferably, a diameter of about 0.124 inches.

Figure 99:
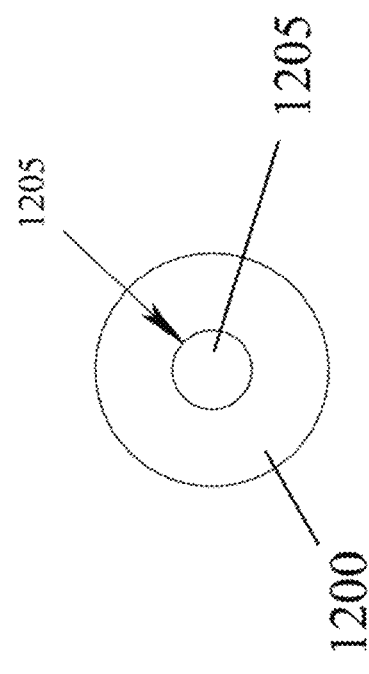
Figure 100:
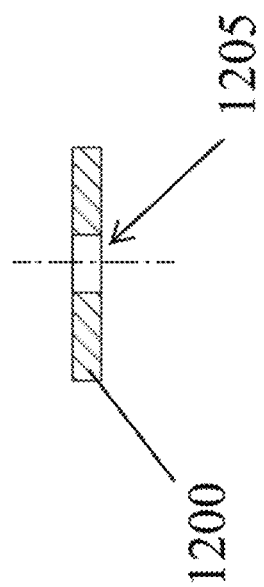

FIGS. 99-100 show various views of a preferred embodiments of insulation disk or spacer 1200. In a preferred embodiment, disk 1200 is generally circular in shape and can be made of ½" diameter unfilled PEEK or unfilled PVDF. In a preferred embodiment of the present invention, the center of disk 1200 has opening 1205, which is generally circular in shape. In a preferred embodiment, opening 1205 is sized and shaped to accommodate and fit shaft 1272. In a preferred embodiment, the diameter of spacer 200 is preferably about 0.1-0.5 inches, more preferably about 0.2-0.4 inches, and most preferably about 0.27 inches. In a preferred embodiment of the present invention, the diameter of opening 1205 is preferably about 0.03-0.3 inches, more preferably about 0.05-0.2 inches, and most preferably about 0.125 inches. In a preferred embodiment, the thickness of spacer 1200 is preferably about 0.03-0.3 inches, more preferably about 0.05-0.1 inches, and most preferably about 0.06 inches.

FIGS. 101-104 show various views of a preferred embodiment of electrode screw or backup plug 1280, which can be generally cylindrically shaped and can be a 309 stainless steel bar (7/16 stock). Electrode screw 1280 preferably has two ends 1281, 1282 and opening or bore 1285 that can extend substantially through the length of screw 1280. Portion 1283 of screw 1280 is slotted and is sized and shaped to fit and accommodate the head or tip of a screwdriver. In a preferred embodiment, screw 1280 is preferably 7/16-20 UNF 3A. In a preferred embodiment, opening 1285 is sized and shaped to accommodate and fit electrode shaft 1272. In a preferred embodiment, the length of screw 1280 is preferably about 1.67-1.7 inches, more preferably about 1.675-1.69 inches, and most preferably, about 1.679 inches. In a preferred embodiment, bore 1285 preferably has a diameter of about 0.06-0.15 inches, more preferably about 0.110-0.135 inches, and most preferably, a diameter of about 0.127 inches. In a preferred embodiment, plug or screw 1280 preferably has an outer diameter of about 0.370-0.374 inches and more preferably an outer diameter of about 0.372 inches.

Figure 105:
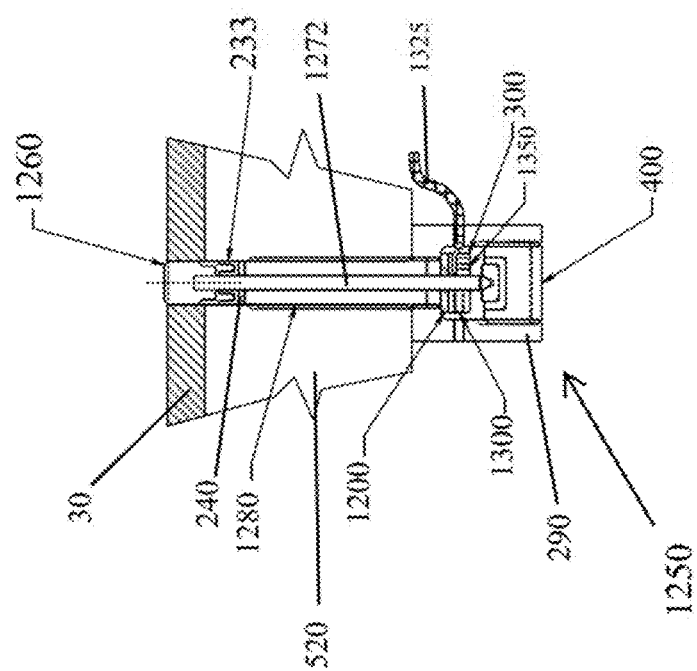

FIG. 105 shows a preferred embodiment of electrode 1250 assembled in thruhole 570 of tube 520 that has liner 30. Head 1260 protrudes slightly into main bore 510 of tube 520. Assembled electrode 1250 includes head 1260, shaft 1272, seal 233, backup ring 240, backup plug 1280 installed in thruhole 570, shield 290 screwed on plug 1280, insulator disk 1200 and collar 300 installed on shaft 1272, screw 1300 in bore 301 of collar, electrode wire 1325 coming out of bore 303 of collar 300, and then installation of electrode adjustment screw 400. A preferred method of installing this preferred electrode embodiment 1250 is shown and described in FIGS. 83-92 and then in FIGS. 74-77.

PARTS LIST

The following is a list of parts and materials suitable for use in the present invention:

| Parts Number | Description |
|---|---|
| 10 | high pressure Severe Application Meter (SAM)/magmeter |
| 16 | opening |
| 17 | mounting element |
| 18 | pipe/neck |
| 19 | plate |
| 20 | housing/flow tube/pipe |

| Parts Number | Description |
|---|---|
| 21 | first diameter |
| 22 | second diameter |
| 23 | length of first diameter 21 |
| 24 | length of second diameter 22 |
| 25 | shoulder/ridge |
| 26 | bore of tube 20 |
| 30 | liner |
| 35 | flange/threaded connection |
| 36 | hammer union |
| 37 | end of tube 20 |
| 40 | housing magnetic/shell |
| 44 | inner diameter of ring 45 |
| 45 | housing ring |
| 46 | outer diameter of ring 45 |
| 50 | junction box |
| 60 | return path iron |
| 61 | slot/opening of return path iron 60 |
| 80 | coil |
| 90 | armature plate |
| 91 | hole/slot/opening of armature plate 90 |
| 93 | hole/slot/opening of armature plate 90 |
| 150 | electrode |
| 160 | electrode head |
| 161 | gap |
| 162 | electrode head receptacle/opening |
| 163 | receptacle wall |
| 164 | top of electrode head 160 |
| 165 | bottom of electrode head 160 |
| 166 | length of head 160 |
| 170 | electrode wire |
| 175 | coating around electrode wire 170 |
| 180 | electrode screw/backup plug |
| 181 | head of screw 180 |
| 182 | top/end of screw 180 |
| 185 | electrode screw opening/bore |
| 200 | spacer/electrode UHP isolating disk/insulating disk |
| 205 | spacer opening/disk opening |
| 231 | jacket of seal 233 |
| 232 | spring of seal 233 |
| 233 | seal |
| 235 | central bore/opening of seal 233 |
| 236 | length |
| 240 | backup ring |
| 250 | electrode |
| 260 | electrode head |
| 261 | angled portion of head 260 |
| 262 | receptacle/opening of electrode head 260 |
| 263 | receptacle wall |
| 264 | top/tip of electrode head 260 |
| 265 | bottom/tip of electrode head 260 |
| 272 | shaft of electrode 250 |
| 273 | tip of shaft 272 |
| 274 | end of shaft 272 |
| 275 | angled/tapered edge of tip 273 |
| 280 | electrode screw/backup plug/backup screw |
| 281 | head of plug 280 |
| 282 | end of plug 280 |
| 283 | slotted portion of plug 280 |
| 285 | plug opening/bore |
| 290 | shield |
| 291 | head of shield 290 |
| 292 | end of shield 290 |
| 293 | first lateral bore/opening/hole of shield 290 |
| 294 | second lateral bore/opening/hole of shield 290 |
| 295 | central/main opening in shield 290 |
| 300 | electrode retention collar |
| 301 | first lateral bore/opening of collar 300 |
| 302 | main bore/opening/central bore of collar 300 |
| 303 | second lateral bore/opening of collar 300 |
| 304 | interior bore/opening of collar 300 |
| 305 | space of collar 300 |
| 370 | electrode receptacle thruhole |
| 380 | taper of thruhole 370 |
| 390 | seal zone |
| 391 | top border of seal zone 390 |
| 392 | bottom border of seal zone 390 |
| 400 | electrode adjustment screw |
| 410 | screw of electrode adjustment screw 400 |
| 412 | receptacle/opening/bore of screw 410 |
| 413 | head of screw 410 |
| 414 | end of screw 410 |
| 415 | slot of screw 410 |
| 420 | insulator of electrode adjustment screw 400 |
| 422 | receptacle/opening/bore of insulator 420 |
| 424 | end of insulator 420 |
| 430 | cup of electrode adjustment screw |
| 432 | opening/receptacle of cup 430 |
| 434 | end of cup 430 |
| 510 | main/central opening/bore of tube 520 |
| 511 | sloping/angled transition areas in bore 510 |
| 512 | inner diameter of main bore 510 |
| 513 | inner diameter of tube 520 when liner 30 is in central bore 510 |
| 520 | housing/flow tube/pipe |
| 521 | first outer diameter of tube 520 |
| 522 | second outer diameter of tube 520 |
| 523 | length of first diameter 521 |
| 524 | length of second diameter 522 |
| 525 | transition area/ridge/shoulder |
| 526 | transition area/ridge/shoulder |
| 527 | third outer diameter of tube 520 |
| 528 | length of third diameter |
| 535 | threaded connection |
| 540 | end of tube 520 |
| 570 | electrode receptacle thruhole |
| 600 | electrode insertion tool |
| 610 | opening of tool 600 |
| 612 | tapered section of opening 610 |
| 620 | insertion tool alignment plug |
| 1200 | spacer/electrode UHP isolating disk/insulating disk |
| 1205 | opening of disk/spacer 1200 |
| 1250 | electrode |
| 1260 | electrode head |
| 1261 | angled portion of head 1260 |
| 1262 | receptacle/opening of electrode head 1260 |
| 1264 | tip/top of head 1260 |
| 1265 | tip/bottom of electrode head 1260 |
| 1267 | segment/portion of electrode head 1260 |
| 1272 | electrode shaft |
| 1273 | tip of shaft 1272 |
| 1274 | end of shaft 1272 |
| 1275 | angled/tapered edge of tip 1273 |
| 1280 | electrode screw/backup plug/backup screw |
| 1281 | head of plug 1280 |
| 1282 | end of plug 1280 |
| 1283 | portion of screw 1280 |
| 1300 | set screw (can be an M2 SS cup point) |
| 1325 | electrode wire |
| 1350 | set screw (can be a M1.5 × 3 mm SS round point) |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A flow measurement system comprising a high-pressure severe application meter, with the high-pressure severe application meter comprising:
a flow tube having a wall, two opposing ends, each end having a threaded connection, a bore, and an interior surface,
a liner that is mechanically affixed to the interior surface of the flow tube via heat shrink and without adhesives, wherein the liner comprises partially stabilized magnesium zirconia with an abrasion resistant ceramic trim;

wherein there is a portion of the interior surface of the flow tube that is not lined with the liner, said portion is in contact with fluid during operation of the meter, and serves to ground the fluid;

at least one electrode installed in the wall of the flow tube that senses a voltage signal, wherein each said electrode is tungsten carbide; and a fitting on each end of the flow tube, wherein each said fitting is a high pressure hammer union.

2. The system of claim 1, wherein the flow tube is made of Nitronic 50.

3. The system of claim 1, wherein the system can operate from a full vacuum to a pressure of 15,000 psi.

4. The system of claim 1, wherein the system can withstand pressures as high as 22,500 psi.

5. The system of claim 1, wherein the system operates at a pressure of between 6,000-12,000 psi.

6. The system of claim 1, wherein at least one of the fittings on either end of the flow tube is a high pressure winged-type male hammer union.

7. A method of measuring flow using the system of claim 1.

8. The system of claim 1, wherein the wall of said flow tube has a thickness of 1" (one inch).

9. The system of claim 1, wherein each said electrode comprises a head and a shaft with the head connected to the shaft and with a pressure energized seal surrounding said connection between said head and said shaft.

10. The system of claim 6, wherein the at least one high pressure winged-type male hammer union is a model 1502 male hammer union.

11. The system of claim 2, wherein the flow tube is made of Nitronic 50 Anneal 1950 bar.

12. The flow measurement system of claim 1, wherein the flow tube has a length of 12-24" (inches).

13. The system of claim 2, wherein at least one of the fittings on either end of the flow tube is a high pressure winged-type male hammer union.

14. The system of claim 13, wherein the wall of said flow tube has a thickness of 1" (one inch).

15. The system of claim 13, wherein each said electrode comprises a head and a shaft with the head connected to the shaft and with a pressure energized seal surrounding said connection between said head and said shaft.

16. A method of measuring flow using the system of claim 13.

17. A method of measuring flow using the system of claim 14.

18. The system of claim 13, wherein the system operates at a pressure of between 6,000-15,000 psi.

19. The system of claim 13, wherein the system can withstand pressures as high as 22,500 psi.

20. The system of claim 14, wherein the flow tube has a length of 17-21" (inches).

* * * * *